US012056936B2

(12) United States Patent
Hashimoto et al.

(10) Patent No.: US 12,056,936 B2
(45) Date of Patent: Aug. 6, 2024

(54) MODEL GENERATING APPARATUS, METHOD AND PROGRAM, AND PREDICTION APPARATUS

(71) Applicants: OMRON Corporation, Kyoto (JP); KYOTO UNIVERSITY, Kyoto (JP)

(72) Inventors: Atsushi Hashimoto, Tokyo (JP); Yuta Kamikawa, Tokyo (JP); Yoshitaka Ushiku, Tokyo (JP); Masaaki Iiyama, Kyoto (JP); Motoharu Sonogashira, Kyoto (JP)

(73) Assignees: OMRON Corporation, Kyoto (JP); KYOTO UNIVERSITY, Kyoto (JP)

( * ) Notice: Subject to any disclaimer, the term of this patent is extended or adjusted under 35 U.S.C. 154(b) by 413 days.

(21) Appl. No.: 17/429,197

(22) PCT Filed: Jan. 23, 2020

(86) PCT No.: PCT/JP2020/002391
§ 371 (c)(1),
(2) Date: Aug. 6, 2021

(87) PCT Pub. No.: WO2020/166303
PCT Pub. Date: Aug. 20, 2020

(65) Prior Publication Data
US 2022/0139092 A1     May 5, 2022

(30) Foreign Application Priority Data
Feb. 15, 2019   (JP) ................. 2019-026013

(51) Int. Cl.
*G06V 20/58*   (2022.01)
*G06T 7/20*    (2017.01)
*G06V 10/774*  (2022.01)

(52) U.S. Cl.
CPC ............... *G06V 20/58* (2022.01); *G06T 7/20* (2013.01); *G06V 10/7747* (2022.01);
(Continued)

(58) Field of Classification Search
CPC .... G06V 20/58; G06V 10/7747; G06V 10/74; G06V 10/774; G06V 10/82; G06T 7/20;
(Continued)

(56) References Cited

U.S. PATENT DOCUMENTS

2016/0189210 A1   6/2016  Lacey et al.
2016/0314411 A1   10/2016 Kumar et al.
(Continued)

FOREIGN PATENT DOCUMENTS

CN      103154845 A    6/2013
JP      2005141459 A   6/2005
(Continued)

OTHER PUBLICATIONS

Dong Qi et al: "Imbalanced Deep Learning by Minority Class Incremental Rectification", IEEE Transactions on Pattern Analysis and Machine Intelligence, IEEE Co~v1puter Society, USA, vol. 4i, No. 6, May 3, 2018 (May 3, 2018), pp. 1367-1381 (Year: 2018).*
(Continued)

*Primary Examiner* — Umair Ahsan
(74) *Attorney, Agent, or Firm* — METROLEX IP LAW GROUP, PLLC

(57) ABSTRACT

A model generation apparatus according to one aspect of the present invention acquires a plurality of learning datasets each constituted by a first sample of a first time of predetermined data obtained in time series and feature information included in a second sample of the predetermined data of a future second time relative to the first time, and trains a prediction model, by machine learning, to predict feature information of the second time from the first sample of the
(Continued)

first time, for each learning dataset. In the model generation apparatus, a rarity degree for is set each learning dataset, and, in the machine learning, the model generation apparatus trains more preponderantly on learning datasets having a higher rarity degree.

14 Claims, 30 Drawing Sheets

(52) U.S. Cl.
CPC .............. *G06T 2207/20081* (2013.01); *G06T 2207/20084* (2013.01); *G06T 2207/30252* (2013.01)

(58) Field of Classification Search
CPC . G06T 2207/20081; G06T 2207/20084; G06T 2207/30252; G06N 3/045; G06N 3/084
See application file for complete search history.

(56) References Cited

U.S. PATENT DOCUMENTS

| | | | |
|---|---|---|---|
| 2018/0096253 A1 | 4/2018 | Goldstein et al. | |
| 2018/0107935 A1 | 4/2018 | Jeon | |
| 2018/0137389 A1 | 5/2018 | Mathieu et al. | |
| 2018/0314954 A1 | 11/2018 | Subramanian et al. | |
| 2018/0373963 A1 | 12/2018 | Lo et al. | |
| 2019/0122077 A1 | 4/2019 | Tsishkou et al. | |
| 2019/0318207 A1 | 10/2019 | Lo et al. | |
| 2020/0342267 A1* | 10/2020 | Usuda | G06V 10/82 |

FOREIGN PATENT DOCUMENTS

| | | |
|---|---|---|
| JP | 2017033526 A | 2/2017 |
| JP | 2018169819 A | 11/2018 |
| WO | 2012009724 A1 | 1/2012 |
| WO | 2017/158058 A1 | 9/2017 |
| WO | 2019/150813 A1 | 8/2019 |

OTHER PUBLICATIONS

Lin Tsung-Yi et al: "Focal Loss for Dense Object Detection", Feb. 7, 2018 (Feb. 7, 2018), pp. -1-rn, XP055964765, Retrieved from the Internet: URL:https://arxiv.org/abs/1708.02002 (Year: 2018).*

Buda Mateusz et al: "A systematic study of the class imbalance problem in convolutional neural networks", , i 3 Oct. 2018 (20i 8-'10-13), pp. 1-21, XP055964760, Retrieved from the Internet: URL:https://arxiv.org/abs/'17i 0.05381 (Year: 2018).*

Byravan Arunkumar et al: "SE3-Pose-Nets: Structured Deep Dynamics Models for Visuomotor Control", 2018 IEEE International Conference on Robotics and Automation(ICRA), May 21, 2018, pp. 1-8; Cited in EESR issued on Oct. 10, 2022.

Buda Mateusz et al, "A systematic study of the class imbalance problem in convolutional neural networks", Oct. 13, 2018, pp. 1-21; Cited in EESR issued on Oct. 10, 2022.

Lin Tsung-Yi et al, "Focal Loss for Dense Object Detection", Feb. 7, 2018, pp. 1-10; Cited in EESR issued on Oct. 10, 2022.

Dong Qi et al: "Imbalanced Deep Learning by Minority Class Incremental Rectification", IEEE Transactions on Pattern Analysis and Machine Intelligence, IEEE Computer Society, USA, vol. 41, No. 6, May 3, 2018, pp. 1367-1381; Cited in EESR issued on Oct. 10, 2022.

An Extended European Search Report (EESR) issued on Oct. 10, 2022 of the counterpart European Patent Application No. 20756264.6.

Lotter W. et al., Deep predictive coding networks for video prediction and unsupervised learning, arXiv[online], Mar. 1, 2017, p. 1-18, Published as a conference paper at ICLR 2017.

The International Search Report ("ISR") of PCT/JP2020/002391 mailed on Mar. 10, 2020.

The Written Opinion ("WO") of PCT/JP2020/002391 mailed on Mar. 10, 2020.

Wu et al: "Fault Prediction Technology Based on Deep Learning", 2018, pp. 9-12; China Institute of Marine Technology & Economy (Beijing, China); Cited in the CNOA issued on Jan. 17, 2024.

The Office Action (CNOA) issued on Jan. 17, 2024, in a counterpart Chinese Patent Application.

* cited by examiner

MODEL GENERATING APPARATUS, METHOD AND PROGRAM, AND PREDICTION APPARATUS

TECHNICAL FIELD

The present invention relates to a model generation apparatus, a prediction apparatus, a model generation method, and a model generation program.

BACKGROUND ART

In recent years, development of technologies for predicting an image of a future time from an image of a given time has been ongoing. For example, PTL 1 proposes a technology for predicting an image sample of a future time from an image sample of a given time utilizing a convolutional neural network. Specifically, a convolutional neural network is trained, by machine learning, to output a frame of time (t+1) when a frame of time t of a video sequence is input. A convolutional neural network can thereby be equipped with the capability to predict a frame of a future time from an input frame of a given time. Thus, an image sample of a future time can be predicted from an image sample of a given time if a trained convolutional neural network is utilized.

This technology for predicting images can be beneficially utilized in various fields. For example, in a scenario where the situation outside a vehicle such as a car is monitored with a camera, by predicting future situations from images outside the vehicle obtained by the camera, accidents that could happen to the vehicle such as colliding with obstacles can be prevented before they happen. Also, for example, in a scenario where the state of a machine is monitored with a camera, by predicting future states of the machine from images obtained by the camera, failures that could occur in the machine can be detected beforehand.

CITATION LIST

Patent Literature

Patent Literature 1: Specification of US 2018/0137389A

SUMMARY OF INVENTION

Technical Problem

The inventors of the present invention found the following problems with conventional technologies that provide a prediction model constituted by a neural network or the like such as described above with the capability to predict an image sample of a future time from an image sample of a given time by machine learning. That is, events that appear in images include events that continue for a comparatively long time and events that bring about a rapid change in a comparatively short time. Events that continue for a long time are events having regularity such as a person moving in a given direction, for example. Events that bring about a rapid change in a short time are events that can occur irregularly such as an object entering the shooting range of a camera from outside the shooting range or movement of an object that was stationary, for example. The future of an event that continues for a comparatively long time can be easily predicted from the regularity of the event, even without utilizing a prediction technology such as the above. On the other hand, since events that bring about a rapid change in a comparatively short time can occur irregularly, it is difficult to predict the future of these events. Thus, with image prediction technologies such as the above, predicting rare events that bring about a rapid change in a short time is more useful than predicting the future of events that continue for a comparatively long time.

However, image data that is obtained in time series as learning data mostly relates to continuous events, and it is difficult to acquire large amounts of image data relating to rare events. Thus, when machine learning is executed using obtained learning data, learning data relating to rare events gets buried among the plentiful learning data relating to continuous events, and there is a possibility of not being able to appropriately reflect the results of training on learning data relating to rare events in the prediction model. Accordingly, the inventors found that, with conventional methods, there is a problem in that, even though it is possible to build a prediction model capable of predicting continuous events with high accuracy, it is difficult to build a prediction model capable of predicting rare events with high accuracy.

Note that this problem is not particular to a scenario where events that can occur at a future time are predicted from image samples of a given time in image data that is obtained in time series. A similar problem arises with all scenarios where events that can occur at a future time are predicted from samples of a given time in predetermined data that is obtained in time series. Scenarios where events that can occur at a future time are predicted from samples of a given time include, for example, scenarios such as where the state of a subject is predicted from vital sign data, where the amount of people flow is predicted from people flow data, where the cultivation condition is predicted from sensing data obtained by a sensor that measures the cultivation condition, and where the amount of power generated by a power generation apparatus is predicted from data relating to the weather. Predetermined data that is obtained in these scenarios includes, for example, image data, sound data, numerical data, text data, and measurement data that is obtained by a sensor. Acquiring a large amount of learning data relating to rare events is also difficult in these scenarios. Thus, it is difficult to build a prediction model capable of predicting rare events with high accuracy.

The present invention, in one aspect, was made in view of such circumstances, and an object thereof is to provide a technology for enhancing prediction accuracy with respect to rare events.

Solution to Problem

The present invention adopts the following configuration, in order to solve the above-mentioned problems.

That is, a model generation apparatus according to one aspect of the present invention includes a data acquisition unit configured to acquire a plurality of learning datasets each constituted by a first sample of a first time of predetermined data obtained in time series and feature information included in a second sample of the predetermined data of a future second time relative to the first time, with a rarity degree indicating a degree of rarity of the learning dataset being set for each of the learning dataset, and a learning processing unit configured to build, by machine learning, a prediction model trained to predict, from the first sample of the first time, the corresponding feature information of the second time, for each of the learning datasets, with learning datasets having a higher rarity degree being trained on more preponderantly in the machine learning.

In this configuration, the rarity degree is set for each learning dataset that is used in the machine learning of a prediction model. The rarity degree indicates the degree of rarity of each learning dataset. The extent of machine learning of each learning dataset is adjusted, according to this rarity degree. Specifically, in machine learning of a prediction model, learning datasets having a higher rarity degree are trained on more preponderantly. Learning datasets having a higher rarity degree can thereby be prevented from getting buried among learning datasets having a lower rarity degree, and the results of training on learning datasets having a higher rarity degree can be appropriately reflected in the acquired predictive capability of the prediction model. Accordingly, with this configuration, the prediction accuracy of the prediction model with respect to rare events can be enhanced.

Note that "obtained in time series" indicates that target data is obtained at a plurality of points in time during the lapse of time. The timing at which data is obtained is not particularly limited, and may be selected as appropriate according to the embodiment. The timing at which data is obtained may be regular or may be irregular. The "predetermined data" is not particularly limited in terms of type as long as it is data that can include a feature of some sort, and may be selected as appropriate according to the embodiment. Predetermined data may be image data, sound data, numerical data, text data, or measurement data that is obtained by various sensors, for example. Hereinafter, measurement data that is obtained by a sensor will also be referred to as "sensing data". Predetermined data may also be sensing data obtained by observing a target of some sort with a sensor, for example. The sensor may be a camera, a microphone, an encoder, a LiDAR (light detection and ranging) sensor, a vital sign sensor, a motion sensor, or an environmental sensor, for example. The camera may be a general digital camera configured to acquire RGB images, a depth camera configured to acquire depth images, or an infrared camera configured to convert amounts of infrared light into images, for example. The vital sign sensor may be a thermometer, a sphygmomanometer, or a pulse monitor, for example. The environmental sensor may be a photometer, a temperature gauge, or a hygrometer, for example.

The type and data format of "feature information" are various and not particularly limited as long as it is information relating to a feature that can be included in the predetermined data, and may be selected as appropriate according to the embodiment. The "feature" may include all elements that can be estimated from the predetermined data. In the case where the present invention is utilized in prediction relating to a moving body, the feature may also relate to a route along which the moving body travels or an object that is present in the direction of travel of the moving body, for example. The moving body may be a flying body (drone, etc.) or a vehicle (car, etc.), for example. The route along which the moving body travels may be a road along which the vehicle can travel, for example. An object that is present in the direction of travel of the moving body may also, for example, be a traffic signal or an obstacle (person, thing). Additionally, the feature may also relate to the state of a machine (whether or not there is a failure, etc.), the state of a subject (level of drowsiness, level of fatigue, level of reserve, state of health, etc.), the flow of people, the flow of things, the cultivation condition, or the amount of power generation, for example.

"Time" indicates an arbitrary point during the lapse of time. "First time" and "second time" are respectively used in order to indicate the sequential relationship of the lapse of time. The respective data of the first time and second time may be constituted by data of only a target time, or may be constituted by data of a predetermined time interval including the target time. The "rarity degree" may be set manually by an operator or the like, and may be set automatically based on an indicator of some sort. "Train more preponderantly" indicates using learning datasets in machine learning such that learning datasets having a higher rarity degree affect the predictive capability that the prediction model is provided with to a greater extent than learning datasets having a lower rarity degree.

The prediction model is a learning model capable of acquiring a capability of some sort by machine learning, and the type thereof is not particularly limited, and may be selected as appropriate according to the embodiment. The learning model may be constituted to include computational parameters that are utilized in computational processing for exhibiting a predetermined capability. A neural network, for example, may be used for the prediction model. In this case, the computational parameters are weights of the connection between neurons or threshold values of respective neurons, for example.

In the model generation apparatus according to the above aspect, the learning processing unit may train more preponderantly on the learning datasets having a higher rarity degree, by increasing a sampling frequency, in the machine learning, of the learning datasets having a higher rarity degree. In other words, the degree of learning may be controlled based on the frequency with which a sample of each learning dataset is extracted. In this case, learning datasets having a higher rarity degree are used more frequently in updating the values of the computational parameters of the prediction model. According to this configuration, processing for training more preponderantly on learning datasets having a higher rarity degree can be suitably realized, thus enabling the prediction accuracy of the prediction model with respect to rare events to be appropriately enhanced.

In the model generation apparatus according to the above aspect, the learning processing unit may train more preponderantly on learning datasets having a higher rarity degree, by increasing weighting, in the machine learning, of the learning datasets having a higher rarity degree. According to this configuration, processing for training more preponderantly on learning datasets having a higher rarity degree can be suitably realized, thus enabling the prediction accuracy of the prediction model with respect to rare events to be appropriately enhanced. Note that weighting in machine learning may be controlled by a learning ratio, for example. The learning ratio determines the degree of updating of the values of the computational parameters of the prediction model in machine learning. The computational parameters are updated more as the learning ratio increases, and the computational parameters are updated less as the learning ratio decreases. In this case, a configuration may be adopted in which learning datasets having a higher rarity degree are trained on more preponderantly, by increasing the learning ratio of learning datasets having a higher rarity degree and reducing the learning ratio of learning datasets having a lower rarity degree.

In the model generation apparatus according to the above aspect, the rarity degree of each of the learning datasets may be set according to an extent of irregularity with which the feature information appears in the predetermined data. According to this configuration, the rarity degree of each learning dataset can be precisely set, thus enabling the prediction accuracy of the prediction model with respect to rare events to be appropriately enhanced. Note that irregularity may be represented by the extent to which the target feature appears in the predetermined data, and may be evaluated by an indicator such as the frequency of appearance or the probability of appearance.

The model generation apparatus according to the above aspect may further include a rarity degree setting unit configured to set the rarity degree of each of the learning datasets. The rarity degree setting unit may include a discordance predictor configured to predict a discordance of the prediction by the prediction model from the first sample of the first time, for each of the learning datasets, and the rarity degree setting unit may set the rarity degree of each of the learning datasets, according to a result of predicting the discordance of the prediction by the prediction model with the discordance predictor. By utilizing a discordance predictor, the time and effort involved in setting the rarity degree of each learning dataset can be reduced. Note that discordance indicates a discrepancy in the prediction of the prediction model with respect to the first sample. The difference value between the output value of the prediction model and the correct answer or error that is utilized in adjusting the computational parameters of the prediction model, for example, may be used as an indicator for evaluating this discordance.

The model generation apparatus according to the above aspect may further include a discordance data acquisition unit configured to acquire a plurality of discordance learning datasets each constituted by a combination of the first sample of the corresponding learning dataset and the discordance of the prediction by the prediction model, and a discordance learning processing unit configured to build, by machine learning, the discordance predictor trained to predict, from the first sample of the first time, the corresponding discordance of the prediction by the prediction model, for each discordance learning dataset. Also, training of the prediction model by the learning processing unit and training of the discordance predictor by the discordance learning processing unit may be executed alternately. According to this configuration, the prediction accuracy of the prediction model with respect to rare events can be appropriately enhanced.

In the model generation apparatus according to the above aspect, the discordance learning processing unit may, in the machine learning of the discordance predictor, train uniformly on each discordance learning dataset regardless of the rarity degree. When learning data is trained on uniformly, the results of training on learning data relating to rare events can get buried among the results of training on learning data relating to plentiful events (e.g., continuous events). Thus, when discordance learning datasets are trained on uniformly regardless of the rarity degree, the trained discordance predictor is built such that the accuracy of prediction of discordance deteriorates as the rarity of the sample increases. That is, the trained discordance predictor is built to predict that the prediction model will make increasingly erroneous predictions, or in other words, that discordance will increase, as the rarity of the sample increases. Thus, according to this configuration, the rarity degree of each learning dataset can be appropriately set by the trained discordance predictor that is built.

In the model generation apparatus according to the above aspect, the feature information may include a feature amount of the second sample. According to this configuration, a prediction model that accurately predicts the feature amount of predetermined data of a future time from predetermined data of an arbitrary time can be built. Note that the feature amount is obtained by converting features extracted from the predetermined data into numerical values. The feature that is targeted and the technique for numerical value conversion are not particularly limited, and may be selected as appropriate according to the embodiment.

The model generation apparatus according to the above aspect may hold an estimator provided with an encoder configured to convert a third sample of the predetermined data into a feature amount and a decoder configured to restore the third sample from the feature amount and to estimate a feature included in the third sample, and the feature amount of the feature information may be provided by converting the second sample with the encoder of the estimator. According to this configuration, a prediction estimator capable of accurately predicting rare features that will be included in predetermined data of a future time from predetermined data of an arbitrary time with a prediction model and a decoder can be built.

In the above modes, a prediction model is trained to predict, from a first sample of a first time, feature information that is included in a second sample of a future second time relative to the first time. However, the predictive capability with which the prediction model is provided is not limited to such an example. The above modes may also be revised to train the prediction model to predict at least one of the second sample and feature information of the second time from the first sample of the first time.

For example, a model generation apparatus according to one aspect of the present invention may include a data acquisition unit configured to acquire a plurality of learning datasets each constituted by a first sample of a first time of predetermined data obtained in time series and at least one of a second sample of the predetermined data of a future second time relative to the first time and feature information included in the second sample, with a rarity degree indicating a degree of rarity of the learning dataset being set for each of the learning datasets, and a learning processing unit configured to build, by machine learning, a prediction model trained to predict, from the first sample of the first time, at least one of the corresponding second sample and feature information of the second time, for each of the learning datasets, with learning datasets having a higher rarity degree being trained on more preponderantly in the machine learning.

The above modes are applicable to all scenarios where events that can occur at a future time are predicted from samples of a given time in predetermined data that are obtained in time series. The predetermined data may be image data, sound data, numerical data, text data, or measurement data obtained by various sensors, for example. Scenarios where events that can occur at a future time are predicted from samples of a given time may be scenarios such as where the situation outside a vehicle is predicted from sensing data of the vehicle, where the state of a machine is predicted from sensing data of the machine, where the state of a subject is predicted from at least one of image data and vital sign data, where the amount of people flow is predicted from people flow data, where the cultivation condition is predicted from sensing data obtained by a sensor that measures the cultivation condition, and where the amount of power generation of a power generation apparatus is predicted from data relating to the weather, for example. The above modes may be applied to these scenarios.

For example, in the model generation apparatus according to the above aspect, the predetermined data may be image data, and the feature information may relate to a feature included in image data. The feature included in the image data may be the result of estimating an attribute of an object that appears in image data, for example. According to this configuration, a prediction model capable of accurately predicting future rare events that can appear in image data can be built.

Also, for example, in the model generation apparatus according to the above aspect, the predetermined data may be sensing data that is obtained by a sensor, and the feature information may relate to a feature included in the sensing data. According to this configuration, a prediction model capable of accurately predicting future rare events that can appear in sensing data can be built.

Also, for example, in the model generation apparatus according to the above aspect, the predetermined data may be image data obtained by a camera disposed to monitor a situation outside a vehicle, and the feature information may relate to an attribute of an object that appears in the image data. According to this configuration, a prediction model capable of accurately predicting future situations outside a vehicle from image data can be built.

Also, for example, in the model generation apparatus according to the above aspect, the predetermined data may be sensing data obtained by a sensor that monitors a state of a machine constituting a production line, and the feature information may relate to the state of the machine. According to this configuration, a prediction model capable of accurately predicting future states of a machine from sensing data can be built.

Also, for example, in the model generation apparatus according to the above aspect, the predetermined data may be at least one of vital sign data of a subject and image data in which the subject appears, and the feature information may relate to a state of the subject. According to this configuration, a prediction model capable of accurately predicting future states of a subject from at least one of vital sign data and image data can be built.

Also, for example, in the model generation apparatus according to the above aspect, the predetermined data may be people flow data related to a flow of people, and the feature information may relate to an amount of the flow of people. According to this configuration, a prediction model capable of accurately predicting future amounts of the flow of people from people flow data can be built.

Note that "the flow of people" may include at least one of the flow of pedestrians and the flow of moving bodies that people can ride in. The flow of pedestrians may be represented by the flow of people who are in a predetermined area (as an example, the flow of participants in a given venue), for example. Also, the flow of moving bodies may be represented by the flow of vehicle traffic or the like, for example. The people flow data is not particularly limited in terms of type as long as it is data that is related to the flow of people, and may be selected as appropriate according to the embodiment. The people flow data may be obtained by a motion sensor configured to detect people who passes through an arbitrary location, a sensor configured to detect opening and closing of a gate, a sensor configured to detect people who pass through a gate, a sensor configured to detect the amount of passing vehicle traffic, a microphone installed to measure sound relating to at least one of moving people and vehicles, or a camera installed to shoot images of at least one of moving people and vehicles, for example. The motion sensor may be an infrared sensor, for example. The gate may be an automatic ticket gate, agate (door, etc.) installed in a building, a gate installed at the entrance to a highway, or a gate installed at the entrance of a predetermined site such as a parking lot, for example. The people flow data may also include position data of a device for holding people or vehicles or communication data of the device, for example. The position data may be measured by a GPS (Global Positioning System) measuring device, for example. The people flow data may also include data relating to a history of people (e.g., purchase history of a store).

Also, a prediction apparatus may be constituted that predicts, from predetermined data of an arbitrary time, various types of features that will appear in the predetermined data of a future time, utilizing a trained prediction model built by the model generation apparatus of the above modes. For example, a prediction apparatus according to one aspect of the present invention includes a target data acquisition unit configured to acquire a target sample of the predetermined data, a prediction unit configured to predict, from the acquired target sample, a feature that will appear in the predetermined data at a future time relative to a time at which the target sample is acquired, using the prediction model built by the model generation apparatus according to any one of the above modes, and an output unit configured to output information relating to a result of predicting the feature.

One aspect of the present invention, as other modes of the model generation apparatus and the prediction apparatus according to the above modes, may also be an information processing method that realizes each of the above configurations, a program, or a storage medium storing such a program and readable by a computer or the like. Here, the storage medium readable by a computer or the like is a medium for storing programs and other information by an electrical, magnetic, optical, mechanical or chemical action. Also, a prediction system according to one aspect of the present invention may be constituted by the model generation apparatus and prediction apparatus according to one of the above modes.

For example, a model generation method according to one aspect of the present invention is an information processing method in which a computer is configured to execute a step of acquiring a plurality of learning datasets each constituted by a first sample of a first time of predetermined data obtained in time series and feature information included in a second sample of the predetermined data of a future second time relative to the first time, with a rarity degree indicating a degree of rarity of the learning dataset being set for each of the learning dataset, and a step of building, by machine learning, a prediction model trained to predict, from the first sample of the first time, the corresponding feature information of the second time, for each of the learning datasets, with learning datasets having a higher rarity degree being trained on more preponderantly in the machine learning.

Also, for example, a model generation program according to one aspect of the present invention is a program for causing a computer to execute a step of acquiring a plurality of learning datasets each constituted by a first sample of a first time of predetermined data obtained in time series and feature information included in a second sample of the predetermined data of a future second time relative to the first time, with a rarity degree indicating a degree of rarity of the learning dataset being set for each of the learning dataset, and a step of building, by machine learning, a prediction model trained to predict, from the first sample of the first time, the corresponding feature information of the second time, for each of the learning datasets, with learning datasets having a higher rarity degree being trained on more preponderantly in the machine learning.

Advantageous Effects of Invention

According to the present invention, prediction accuracy with respect to rare events can be enhanced.

DESCRIPTION OF EMBODIMENTS

Hereinafter, an embodiment (hereinafter, also referred to as "the present embodiment") according to one aspect of the present invention will be described based on the drawings. The present embodiment which will be described below is, however, merely an illustrative example of the present invention in all respects. Needless to say, various improvements and modifications can be made without departing from the scope of the invention. In other words, in carrying out the invention, a specific configuration that depends on the embodiment may also be adopted as appropriate. Note that data appearing in the present embodiment is described using natural language, but is, more specifically, designated by pseudo-language, commands, parameters, machine language and the like recognizable by a computer.

1. Application Example

Figure 1:
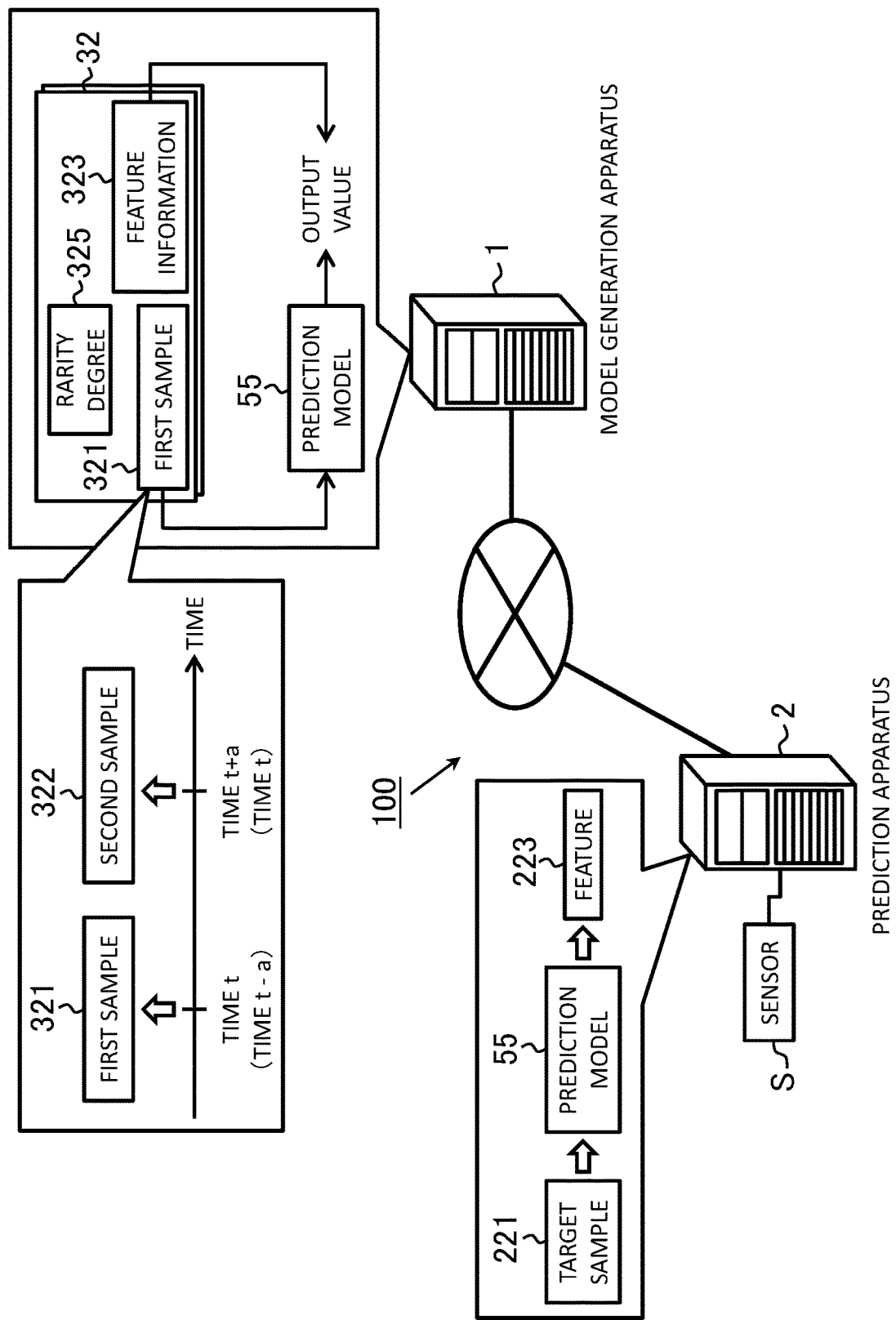
FIG. 1 schematically illustrates an example of a scenario in which the present invention is applied.

First, an example of a scenario in which the present invention is applied will be described, using FIG. 1. FIG. 1 schematically illustrates an example of a scenario in which the present invention is applied. As shown in FIG. 1, a prediction system 100 according to the present embodiment is provided with a model generation apparatus 1 and a prediction apparatus 2. The model generation apparatus 1 and the prediction apparatus 2 may be connected to each other via a network. The type of network may be selected as appropriate from the Internet, a wireless communication network, a mobile communication network, a telephone network, and a dedicated network, for example.

The model generation apparatus 1 according to the present embodiment is a computer configured to build, by machine learning, a prediction model 55 trained to be capable of predicting, from predetermined data of an arbitrary time, features that will appear in the predetermined data of a future time relative to the arbitrary time. Specifically, the model generation apparatus 1 acquires a plurality of second learning datasets 32 each constituted by a combination of a first sample 321 of a first time of predetermined data that is obtained in time series and feature information 323 that is included in a second sample 322 of the predetermined data of a future time relative to the first time. The second learning datasets 32 are an example of "learning datasets" of the present invention.

"Obtained in time series" indicates that target data is obtained at a plurality of points in time during the lapse of time. The timing at which data is obtained is not particularly limited, and may be selected as appropriate according to the embodiment. The timing at which data is obtained may be regular or may be irregular. "Time" indicates an arbitrary point during the lapse of time. In the example of FIG. 1, time t is an example of the first time and time (t+a) is an example of the second time. Also, time (t−a) is an example of the first time, and the time t is an example of the second time. In this way, "first time" and "second time" are respectively used in order to show the sequential relationship of the lapse of time. Note that an interval a between the first time and the second time is not particularly limited, and may be set as appropriate according to the embodiment. The respective samples (321, 322) of the first time and the second time may be constituted by data of only the first time and the second time, or may be constituted by data of predetermined time intervals that respectively include the times of the first time and the second time.

The "predetermined data" is not particularly limited in terms of type as long as it is data that can include a feature of some sort, and may be selected as appropriate according to the embodiment. The predetermined data may be image data, sound data, numerical data, text data, or measurement data obtained by various sensors, for example. The predetermined data may also be data obtained by observing a target of some sort with a sensor, for example. In the present embodiment, the predetermined data is sensing data acquirable by a sensor S.

The feature information 323 is not particularly limited in terms of type and data format, as long as it is information relating to a feature that can be included in the predetermined data, and may be selected as appropriate according to the embodiment. "Feature" may include any element estimatable from the predetermined data. In the case of utilizing the present invention in prediction relating to a moving body, the feature may also relate to an attribute of an object such as a route along which the moving body travels or a physical object that is present in the direction of travel of the moving body, for example. The moving body may be a flying body (drone, etc.) or a vehicle (car, etc.), for example. The route along which the moving body travels may be a road travelable by vehicle, for example. The physical object that is present in the direction of travel of the moving body may be a traffic signal or an obstacle (person, thing), for example. Additionally, the feature may also relate to the state of a machine (whether there is a failure, etc.), the state of a subject (level of drowsiness, level of fatigue, level of reserve, state of health, etc.), the flow of people, the flow of things, cultivation condition, or the amount of power generation, for example.

The model generation apparatus 1 according to the present embodiment builds, by machine learning, the prediction model 55 trained to predict the feature information 323 of the second time from the first sample 321 of the first time, for each second learning dataset 32. The prediction model 55 is constituted by a learning model capable of acquiring a capability of some sort by machine learning. As will be discussed later, in the present embodiment, the prediction model 55 is constituted by a neural network.

A rarity degree 325 is set for each second learning dataset 32. The rarity degree 325 indicates the degree of rarity of each second learning dataset 32. The model generation apparatus 1 according to the present embodiment adjusts the extent of machine learning of each second learning dataset 32, according to this rarity degree 325. That is, in machine learning, second learning datasets 32 having a higher rarity degree 325 are trained on more preponderantly. "Training more preponderantly" indicates using second learning datasets 32 in machine learning such that second learning datasets 32 having a higher rarity degree 325 affect the predictive capability with which the prediction model 55 is provided to a greater extent than second learning datasets 32 having a lower rarity degree 325.

On the other hand, the prediction apparatus 2 according to the present embodiment is a computer configured to predict, from predetermined data of an arbitrary time, a feature that will appear in the predetermined data of a future time relative to the arbitrary time, utilizing the trained prediction model 55 built by the model generation apparatus 1. Specifically, the prediction apparatus 2 according to the present embodiment acquires a target sample 221 of the predetermined data. In the present embodiment, the prediction apparatus 2 is connected to the sensor S. The prediction apparatus 2 acquires the target sample 221 of the predetermined data from the sensor S.

The type of sensor S is not particularly limited, and may be selected as appropriate according to the embodiment. The sensor S may be a camera, a microphone, an encoder, a LiDAR sensor, a vital sign sensor, a motion sensor, or an environmental sensor, for example. The camera may be a general digital camera configured to acquire RGB images, a depth camera configured to acquire depth images, or an infrared camera configured to convert amounts of infrared light into images, for example. The vital sign sensor may be a thermometer, a sphygmomanometer, or a pulse meter, for example. The environmental sensor may be a photometer, a temperature gauge, or a hygrometer, for example.

Next, the prediction apparatus 2 according to the present embodiment predicts, from the acquired target sample 221, the feature 223 that will appear in the predetermined data at a future time relative to the time at which the target sample 221 was acquired, using the trained prediction model 55 built by the above model generation apparatus 1. The prediction apparatus 2 then outputs information relating to the result of predicting the feature 223.

As described above, in the present embodiment, second learning datasets 32 having a higher rarity degree 325 are trained on more preponderantly, in machine learning of the prediction model 55. Second learning datasets 32 having a higher rarity degree 325 can thereby be prevented from getting buried among second learning datasets 32 having a lower rarity degree 325, and the results of training on second learning datasets 32 having a higher rarity degree 325 can be appropriately reflected in the predictive capability with which the prediction model 55 is provided. Accordingly, with the present embodiment, the prediction model 55 capable of accurately predicting rare events can be built. Also, in the prediction apparatus 2, the accuracy with which the feature 223 is predicted can be enhanced, by utilizing the prediction model 55 built in such a manner.

2. Example Configuration

Hardware Configuration

Model Generation Apparatus

Figure 2:
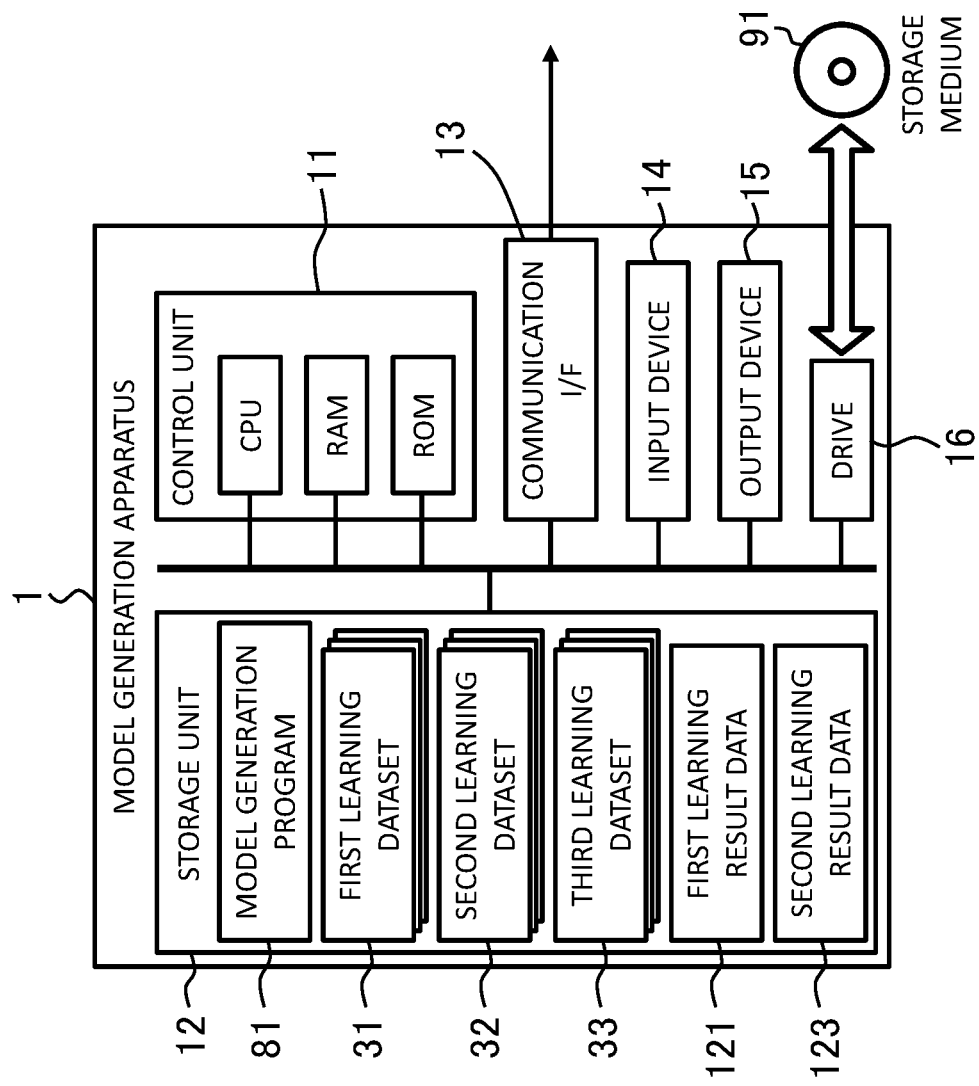
FIG. 2 schematically illustrates an example of the hardware configuration of a model generation apparatus according to an embodiment.

Next, an example of the hardware configuration of the model generation apparatus 1 according to the present embodiment will be described, using FIG. 2. FIG. 2 schematically illustrates an example of the hardware configuration of the model generation apparatus 1 according to the present embodiment.

As shown in FIG. 2, the model generation apparatus 1 according to the present embodiment is a computer in which a control unit 11, a storage unit 12, a communication interface 13, an input device 14, an output device 15 and a drive 16 are electrically connected. Note that, in FIG. 2, the communication interface is shown as "communication I/F".

The control unit 11 includes a CPU which is a hardware processor (Central Processing Unit), a RAM (Random Access Memory), a ROM (Read Only Memory) and the like, and is configured to execute information processing based on a program and various data. The storage unit 12 is an example of a memory, and is constituted by a hard disk drive or a solid-state drive, for example. In the present embodiment, the storage unit 12 stores various information such as a model generation program 81, a plurality of first learning datasets 31, a plurality of second learning datasets 32, a plurality of third learning datasets 33, first learning result data 121, and second learning result data 123.

The model generation program 81 is a program for causing the model generation apparatus 1 to execute information processing (FIGS. 6, 7), discussed later, relating to machine learning. The model generation program 81 includes a series of commands of this information processing. The plurality of first learning datasets 31 are utilized in machine learning of an estimator discussed later. The plurality of second learning datasets 32 are utilized in machine learning of the prediction model 55. The plurality of third learning datasets 33 are utilized in the machine learning of a discordance predictor discussed later. The first learning result data 121 indicates information relating to the estimator, discussed later, built by machine learning that uses the plurality of first learning datasets 31. The second learning result data 123 indicates information relating to the trained prediction model 55 built by machine learning that uses the plurality of second learning datasets 32. The first learning result data 121 and the second learning result data 123 are obtained as a result of executing the model generation program 81. A detailed description will be given later.

The communication interface 13 is an interface for performing wired or wireless communication via a network, such as a cable LAN (Local Area Network) module or a wireless LAN module, for example. The model generation apparatus 1 is able to perform data communication via a network with other information processing apparatuses (e.g., prediction apparatus 2), by utilizing this communication interface 13.

The input device 14 is a device for performing input such as a mouse or a keyboard, for example. Also, the output device 15 is a device for performing output such as a display or a speaker, for example. The operator is able to operate the model generation apparatus 1, by utilizing the input device 14 and the output device 15.

The drive 16 is a drive device for reading programs stored in a storage medium 91, such as a CD drive or a DVD drive, for example. The type of drive 16 may be selected as appropriate according to the type of storage medium 91. At least one of the above model generation program 81, plurality of first learning datasets 31, plurality of second learning datasets 32 and plurality of third learning datasets 33 may also be stored in this storage medium 91.

The storage medium 91 is a medium for storing recorded programs and other information by an electrical, magnetic, optical, mechanical or chemical action, such that the programs and other information is readable by a computer or other device, machine or the like. The model generation apparatus 1 may also acquire at least one of the above model generation program 81, plurality of first learning datasets 31, plurality of second learning datasets 32 and plurality of third learning datasets 33 from this storage medium 91.

Here, in FIG. 2, a disk storage medium such as a CD or a DVD is illustrated as an example of the storage medium 91. However, the type of storage medium 91 is not limited to a disk storage medium, and may also be other than a disk storage medium. A semiconductor memory such as a flash memory is given as an example of a storage medium other than a disk storage medium.

Note that, in relation to the specific hardware configuration of the model generation apparatus 1, omission, substitution and addition of constituent elements are possible as appropriate, according to the embodiment. For example, the control unit 11 may also include a plurality of hardware processors. The hardware processors may be constituted by a microprocessor, an FPGA (field-programmable gate array), a DSP (digital signal processor), or the like. The storage unit 12 may also be constituted by the RAM and ROM that are included in the control unit 11. At least one of the communication interface 13, the input device 14, the output device 15 and the drive 16 may also be omitted. The model generation apparatus 1 may also be constituted by a plurality of computers. In this case, the respective hardware configurations of the computers may coincide or may not coincide. The model generation apparatus 1 may also be a general-purpose server device, PC (Personal Computer) or the like, other than an information processing apparatus designed exclusively for the service that is provided.

Prediction Apparatus

Figure 3:
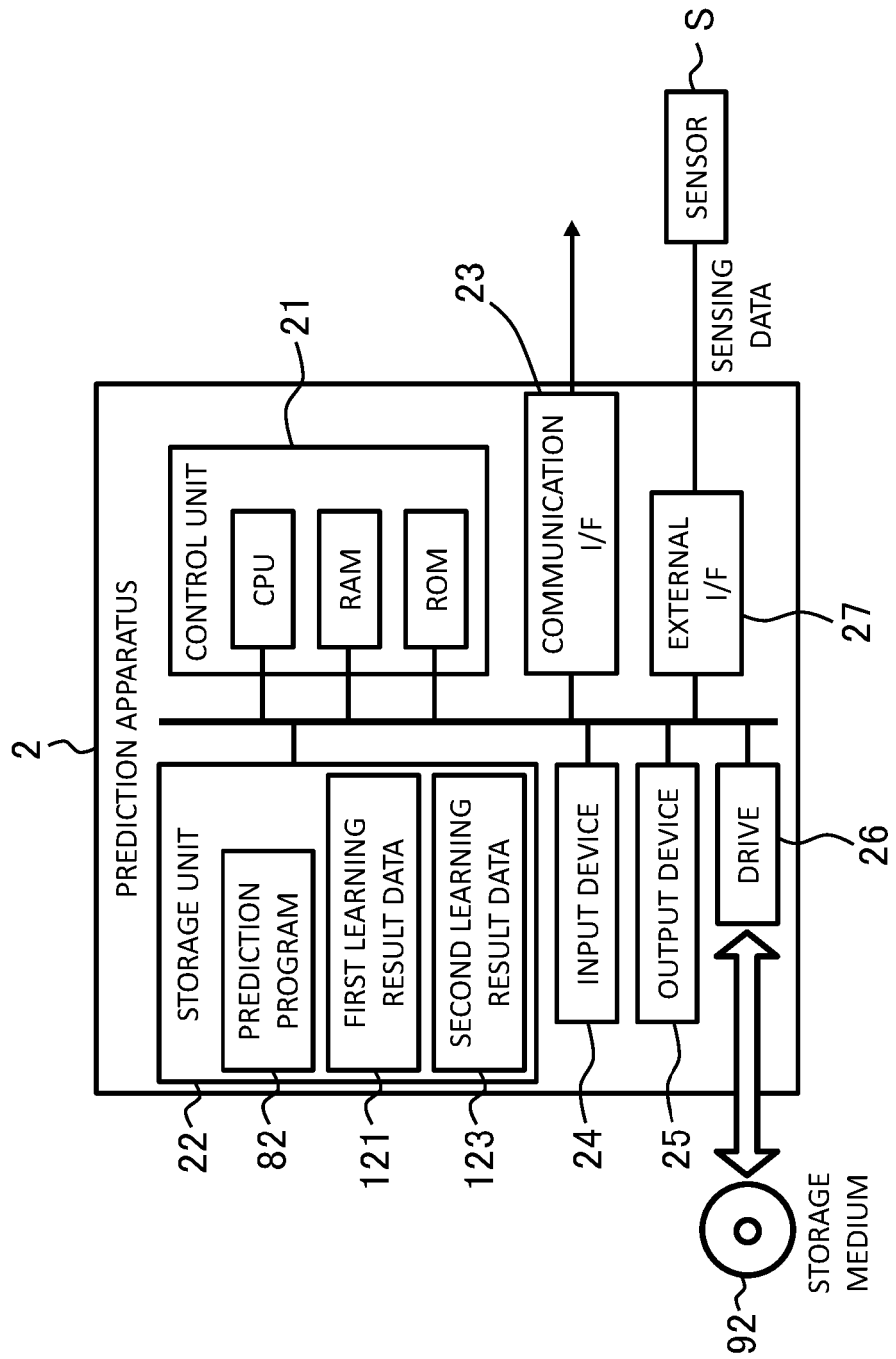
FIG. 3 schematically illustrates an example of the hardware configuration of a prediction apparatus according to the embodiment.

Next, an example of the hardware configuration of the prediction apparatus 2 according to the present embodiment will be described, using FIG. 3. FIG. 3 schematically illustrates an example of the hardware configuration of the prediction apparatus 2 according to the present embodiment.

As shown in FIG. 3, the prediction apparatus 2 according to the present embodiment is a computer in which a control unit 21, a storage unit 22, a communication interface 23, an input device 24, an output device 25, a drive 26 and an external interface 27 are electrically connected. Note that, in FIG. 3, the communication interface and the external interface are respectively shown as "communication I/F" and "external I/F".

The control unit 21 to drive 26 of the prediction apparatus 2 may respectively be constituted similarly to the control unit 11 to drive 16 of the above model generation apparatus 1. That is, the control unit 21 includes a CPU which is a hardware processor, a RAM, a ROM and the like, and is configured to execute various information processing based on programs and data. The storage unit 22 is constituted by a hard disk drive or a solid-state drive, for example. The storage unit 22 stores various information such as a prediction program 82, the first learning result data 121, and the second learning result data 123.

The prediction program 82 is a program for causing the prediction apparatus 2 to execute information processing (FIG. 8), discussed later, relating to prediction of a feature that appears in the predetermined data utilizing the prediction model 55. The prediction program 82 includes a series of commands of this information processing. A detailed description will be given later.

The communication interface 23 is an interface for performing wired or wireless communication via a network, such as a cable LAN module or a wireless LAN module, for example. The prediction apparatus 2 is able to perform data communication via a network with other information processing apparatuses (e.g., model generation apparatus 1), by utilizing this communication interface 23.

The input device 24 is a device for performing input such as a mouse or a keyboard, for example. Also, the output device 25 is a device for performing output such as a display or a speaker, for example. The operator is able to operate the prediction apparatus 2, by utilizing the input device 24 and the output device 25.

The drive 26 is a drive device for reading programs stored in the storage medium 92, such as a CD drive or a DVD drive, for example. At least one of the above prediction program 82, first learning result data 121 and second learning result data 123 may also be stored in the storage medium 92. The prediction apparatus 2 may also acquire at least one of the above prediction program 82, first learning result data 121 and second learning result data 123 from the storage medium 92.

The external interface 27 is an interface for connecting to an external device, such as a USB (Universal Serial Bus) port or a dedicated port, for example. The type and number of external interfaces 27 may be selected as appropriate according to the type and number of external devices to be connected. In the present embodiment, the prediction apparatus 2 is connected to the sensor S, via the external interface 27. The prediction apparatus 2 is thereby configured to be capable of acquiring sensing data (target sample 221) to be used in execution of prediction processing from the sensor S. The configuration for acquiring sensing data is not, however, limited to such an example, and may be determined as appropriate according to the embodiment. In the case of the sensor S being provided with a communication interface, for example, the prediction apparatus 2 may also be connected to the sensor S via the communication interface 23, rather than the external interface 27.

Note that, in relation to the specific hardware configuration of the prediction apparatus 2, omission, substitution and addition of constituent elements are possible as appropriate, according to the embodiment. For example, the control unit 21 may also include a plurality of hardware processors. The hardware processors may be constituted by a microprocessor, an FPGA, a DSP, or the like. The storage unit 22 may also be constituted by the RAM and ROM that are included in the control unit 21. At least one of the communication interface 23, the input device 24, the output device 25, the drive 26 and the external interface 27 may also be omitted. The prediction apparatus 2 may also be constituted by a plurality of computers. In this case, the respective hardware configurations of the computers may coincide or may not coincide. The prediction apparatus 2 may also be a general-purpose server device, a general-purpose PC or the like, other than an information processing apparatus designed exclusively for the service that is provided.

Software Configuration
Model Generation Apparatus

Figure 4A:
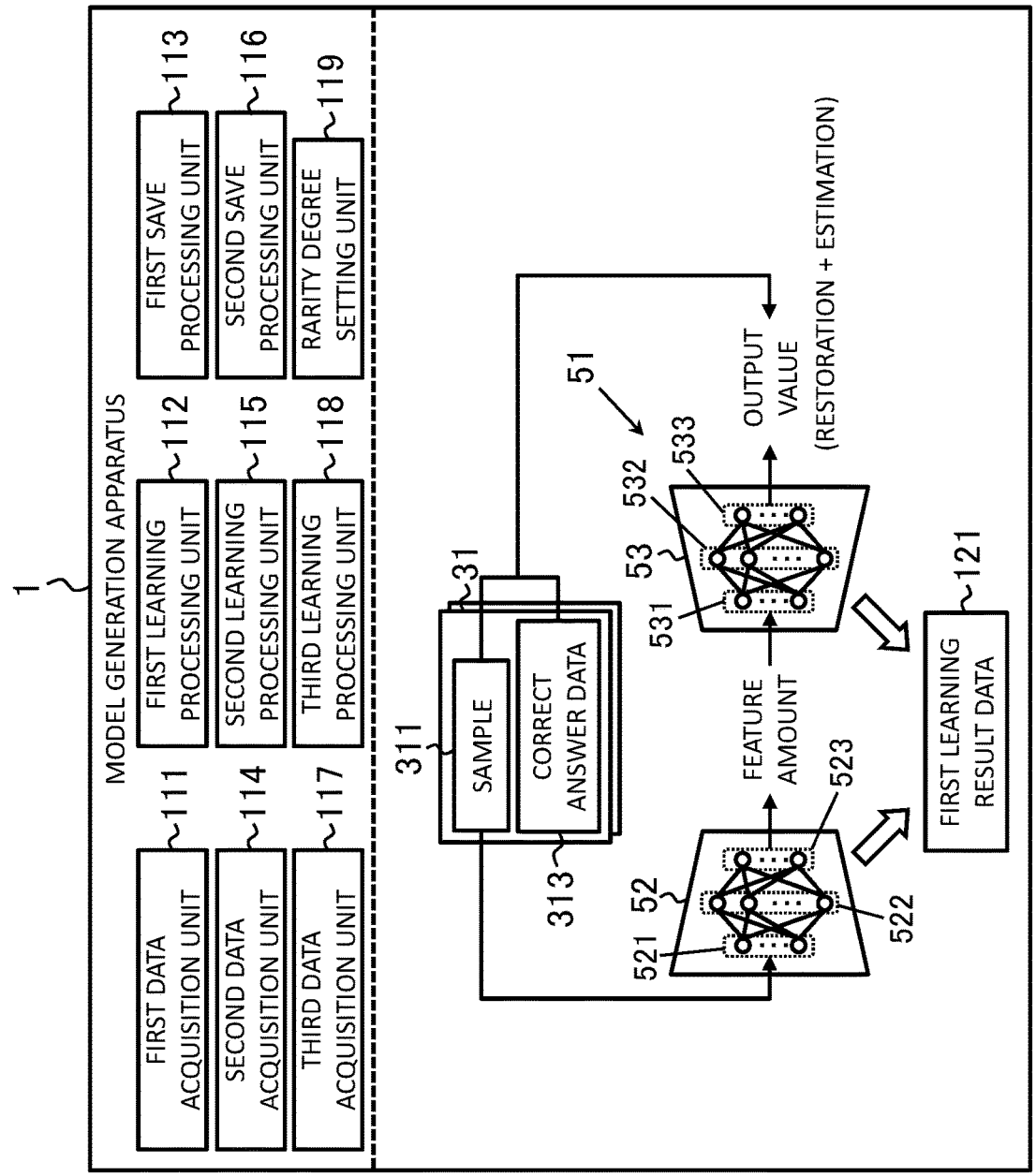
FIG. 4A schematically illustrates an example of the software configuration of the model generation apparatus according to the embodiment.
Figure 4B:
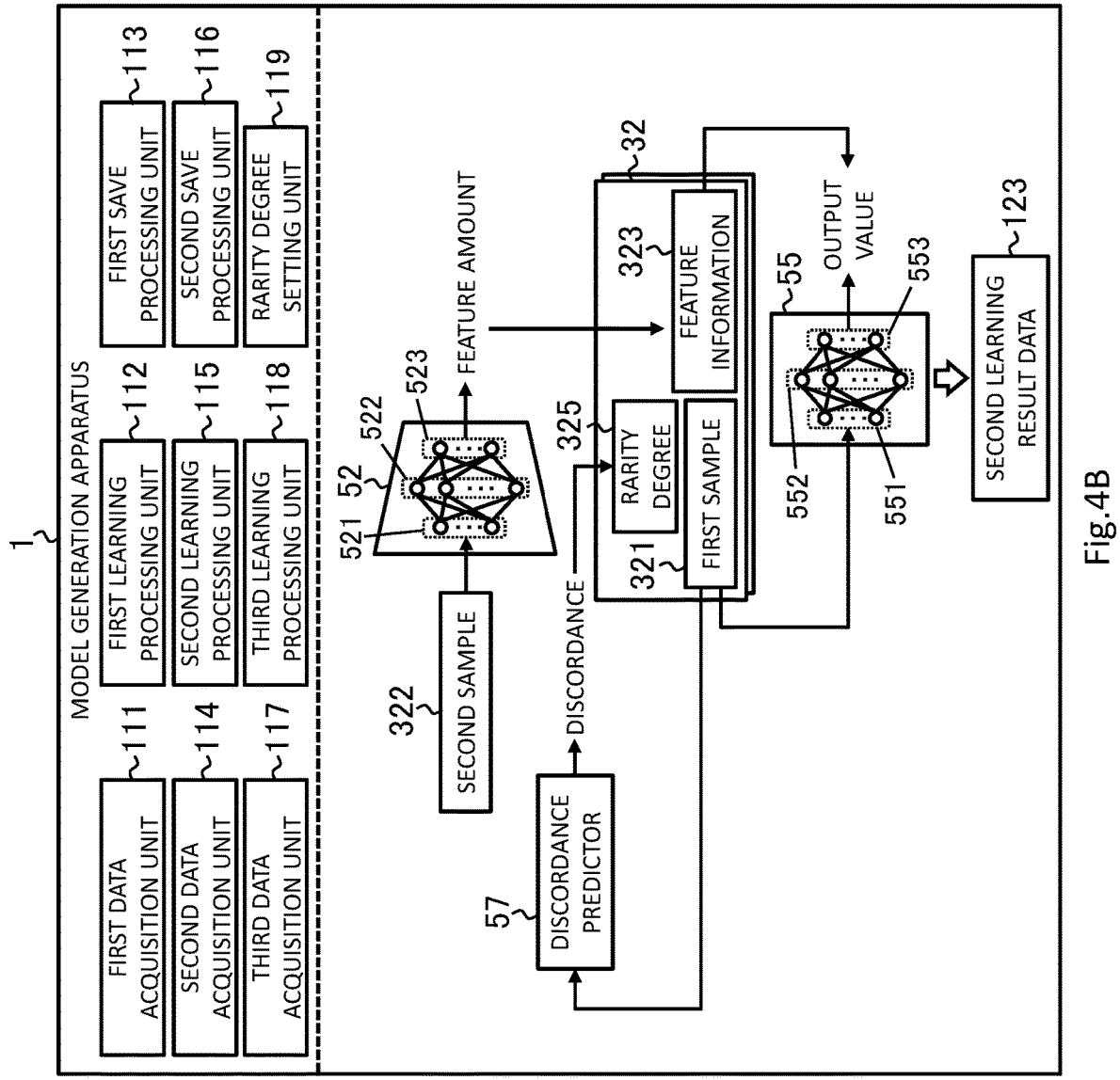
FIG. 4B schematically illustrates an example of the software configuration of the model generation apparatus according to the embodiment.
Figure 4C:
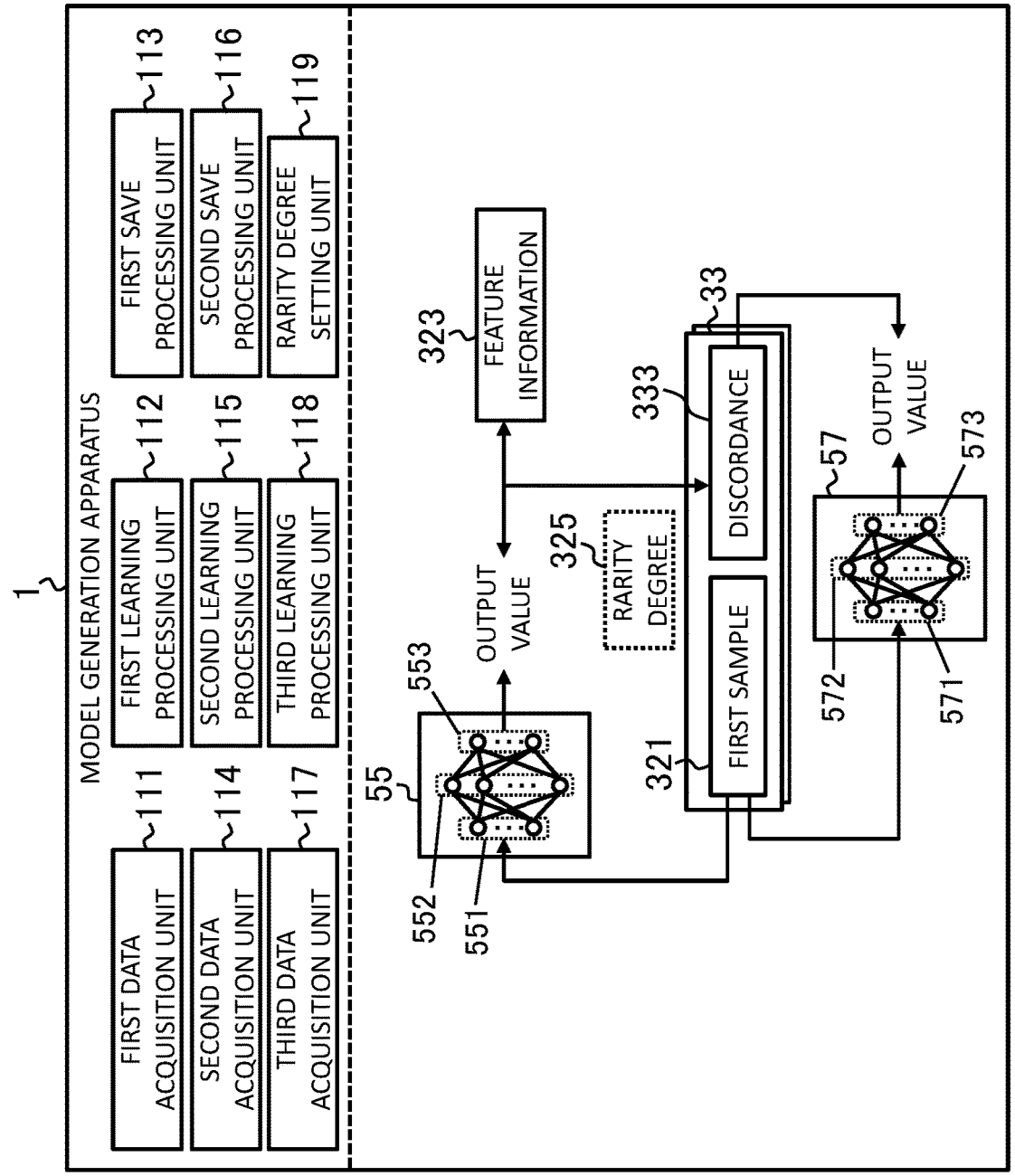
FIG. 4C schematically illustrates an example of the software configuration of the model generation apparatus according to the embodiment.

Next, an example of the software configuration of the model generation apparatus 1 according to the present embodiment will be described using FIGS. 4A to 4C. FIGS. 4A to 4C schematically illustrate an example of the software configuration of the model generation apparatus 1 according to the present embodiment.

The control unit 11 of the model generation apparatus 1 unpacks the model generation program 81 stored in the storage unit 12 into the RAM. The control unit 11 then controls the constituent elements, by interpreting and executing the model generation program 81 unpacked into the RAM with the CPU. As shown in FIGS. 4A to 4C, the model generation apparatus 1 according to the present embodiment thereby operates as a computer provided with a first data acquisition unit 111, a first learning processing unit 112, a first save processing unit 113, a second data acquisition unit 114, a second learning processing unit 115, a second save processing unit 116, a third data acquisition unit 117, a third learning processing unit 118 and a rarity degree setting unit 119 as software modules. That is, in the present embodiment, the software modules of the model generation apparatus 1 are realized by the control unit 11 (CPU).

In the present embodiment, the model generation apparatus 1 holds respective data of the estimator 51, the prediction model 55 and a discordance predictor 57 in a memory such as the storage unit 12 or RAM. The model generation apparatus 1 then executes the respective machine learning of the estimator 51, the prediction model 55 and the discordance predictor 57. Hereinafter, the software modules of the model generation apparatus 1 will be described in association with the respective machine learning.

(A) Modules Relating to Estimator

First, the software modules relating to machine learning of the estimator 51 will be described, with reference to FIG. 4A. The first data acquisition unit 111, the first learning processing unit 112 and the first save processing unit 113, out of the above software modules, relate to machine learning of the estimator 51.

The first data acquisition unit 111 acquires a plurality of first learning datasets 31 to be used in machine learning of the estimator 51. In the present embodiment, each first learning dataset 31 is constituted by a combination of a sample 311 of predetermined data and correct answer data 313 indicating a feature (correct answer) that appears in the sample 311. The sample 311 is utilized as training data (input data) of machine learning. The correct answer data 313 is utilized as teaching data of machine learning.

The first learning processing unit 112 builds the trained estimator 51 that has acquired the capability to estimate features that appear in predetermined data, by machine learning that uses the plurality of first learning datasets 31. In the present embodiment, the first learning processing unit 112 trains the estimator 51, by machine learning, to output an output value that matches the corresponding correct answer data 313 when the sample 311 is input, for each first learning dataset 31. The trained estimator 51 that has acquired the capability to estimate features that appear in predetermined data is thereby built. The first save processing unit 113 saves information relating to the trained estimator 51 that is built to a predetermined storage area.

Configuration of Estimator

Next, an example of the configuration of the estimator 51 will be described. As shown in FIG. 4A, the estimator 51 is constituted by an autoencoder. That is, the estimator 51 is provided with an encoder 52 and a decoder 53. The encoder 52 is configured to convert input data that is provided into feature amounts. Feature amounts are obtained by converting features that can be extracted from predetermined data into numerical values. The decoder 53 is configured to restore input data from feature amounts, and to estimate features that appear in input data.

In the present embodiment, the encoder 52 and the decoder 53 are constituted by a neural network having a multilayer structure that is used in deep learning. The encoder 52 is provided with an input layer 521, an intermediate (hidden) layer 522, and an output layer 523. Similarly, the decoder 53 is provided with an input layer 531, an intermediate (hidden) layer 532, and an output layer 533. The structure of the encoder 52 and the decoder 53 is not, however, limited to such an example, and may be determined as appropriate according to the embodiment. For example, the number of intermediate layers respectively included in the encoder 52 and the decoder 53 is not limited to one, and may also be two or more.

The number of neurons (nodes) that are included in each of the layers 521 to 523 of the encoder 52 and each of the layers 531 to 533 of the decoder 53 may be selected as appropriate according to the embodiment. In the example in FIG. 4A, each neuron of the encoder 52 and the decoder 53 is connected to all neurons in adjacent layers. However, the connection of neurons in the encoder 52 and the decoder 53 is not limited to such an example, and may be set as appropriate according to the embodiment.

The neurons in adjacent layers are connected as appropriate, and a weight (connected load) is set for each connection. A threshold value is set for each neuron and, fundamentally, the output of each neuron is determined by whether the sum of the product of each input and each weight exceeds the threshold value. The weights of the connections of neurons that are included in each of the layers 521 to 523 of the encoder 52 and the threshold values of the neurons are examples of computational parameters of the encoder 52. The weights of the connections of neurons included in each of the layers 531 to 533 of the decoder 53 and the threshold values of the neurons are examples of computational parameters of the decoder 53. The computational parameters of the estimator 51 are constituted by the respective computational parameters of the encoder 52 and the decoder 53.

In the present embodiment, the first learning processing unit 112 executes machine learning of the estimator 51 (encoder 52 and decoder 53) constituted by a neural network such as described above, using the plurality of first learning datasets 31. That is, the first learning processing unit 112, by adjusting the values of the computational parameters of the estimator 51, trains the estimator 51 to output an output value that matches the sample 311 and the correct answer data 313 from the output layer 533 of the decoder 53 when the sample 311 is input to the input layer 521 of the encoder 52, for each first learning dataset 31. The first learning processing unit 112 thereby builds the trained estimator 51 that has acquired the capability to estimate features that appear in predetermined data. Note that this "estimation" may be one of deriving a discrete value (e.g., class corresponding to a specific feature) by grouping (classification, identification) and deriving a continuous value (e.g., probability of a specific feature appearing) by regression, for example. The first save processing unit 113 generates, as the first learning result data 121, information indicating the structure and computational parameters of the trained estimator 51 that is built. The first save processing unit 113 then saves the generated first learning result data 121 to a predetermined storage area.

(B) Modules Relating to Prediction Model

Next, the software modules relating to machine learning of the prediction model 55 will be described, with reference to FIG. 4B. The second data acquisition unit 114, the second learning processing unit 115, the second save processing unit 116 and the rarity degree setting unit 119, out of the above software modules, relate to machine learning of the prediction model 55. The second data acquisition unit 114 is an example of a "data acquisition unit" of the present invention, and the second learning processing unit 115 is an example of a "learning processing unit" of the present invention.

The second data acquisition unit 114 acquires a plurality of second learning datasets 32 to be used in machine learning of the prediction model 55. Each second learning dataset 32 is constituted by a combination of the first sample 321 of a first time of predetermined data that is obtained in time series and the feature information 323 included in the second sample 322 of the predetermined data of a future second time relative to the first time. In the present embodiment, the feature information 323 includes a feature amount of the second sample 322. The feature amount of the feature information 323 is provided by converting the second sample 322 with the encoder 52 of the estimator 51. The first sample 321 is utilized as training data (input data) of machine learning. The feature information 323 is utilized as teaching data (correct answer data) of machine learning.

The second learning processing unit 115 builds the prediction model 55 trained to predict the feature information 323 of the second time from the first sample 321 of the first time, by machine learning that uses the plurality of second learning datasets 32. In the present embodiment, the second learning processing unit 115 trains the prediction model 55, by machine learning, to output an output value that matches the corresponding feature information 323 when the first sample 321 is input, for each second learning dataset 32.

The rarity degree 325 indicating the degree of rarity of each second learning dataset 32 is set for each second learning dataset 32. The second learning processing unit 115 adjusts the extent of machine learning of each second learning dataset 32, according to this rarity degree 325. That is, the second learning processing unit 115 implements the processing of the above machine learning such that second learning datasets 32 having a higher rarity degree 325 are trained on more preponderantly. The prediction model 55 trained to predict the feature information 323 of the second time from the first sample 321 of the first time, for each second learning dataset 32, is thereby built. In other words, the trained prediction model 55 is built that has acquired the capability to predict, from predetermined data of an arbitrary time, feature information that will be included in predetermined data of a future time relative to the arbitrary time. The second save processing unit 116 saves information relating to the trained prediction model 55 that is built to a predetermined storage area.

The rarity degree setting unit 119 sets the rarity degree 325 of each second learning dataset 32. The method of setting the rarity degree 325 may be selected as appropriate according to the embodiment. In the present embodiment, the rarity degree setting unit 119 includes the discordance predictor 57, discussed later, constituted to predict the discordance of prediction by the prediction model 55 from the first sample 321 of a first time. The rarity degree setting unit 119 sets the degree of rarity of each second learning dataset 32, according to the result of predicting the discordance of prediction by the prediction model 55 with the discordance predictor 57.

Configuration of Prediction Model

Next, an example of the configuration of the prediction model 55 will be described. As shown in FIG. 4B, the prediction model 55 is constituted by a neural network having a multilayer structure that is used in deep learning, similarly to the above encoder 52 and decoder 53. The prediction model 55 is provided with an input layer 551, an intermediate (hidden) layer 552, and an output layer 553. The structure of the prediction model 55 is not, however, limited to such an example, and may be determined as appropriate according to the embodiment. For example, the number of intermediate layers included in the prediction model 55 is not limited to one, and may also be two or more.

The number of neurons (nodes) that are included in each of the layers 551 to 553 of the prediction model 55 may be selected as appropriate according to the embodiment. In the example in FIG. 4B, each neuron of the prediction model 55 is connected to all neurons in adjacent layers. However, connection of neurons in the prediction model 55 is not limited to such an example, and may be set as appropriate according to the embodiment. The weights of the connections of neurons included in each of the layers 551 to 553 and the threshold values of the neurons are examples of computational parameters of the prediction model 55.

In the present embodiment, the second learning processing unit 115 executes machine learning of the prediction model 55 constituted by a neural network such as the above, using the plurality of second learning datasets 32. That is, the second learning processing unit 115, by adjusting the values of the computational parameters of the prediction model 55, trains the prediction model 55 to output an output value that matches the corresponding feature information 323 from the output layer 553 when the first sample 321 is input to the input layer 551, for each second learning dataset 32. In the processing of this machine learning, second learning datasets 32 having a higher rarity degree 325 is trained on more preponderantly. The second learning processing unit 115 thereby builds the trained prediction model 55 that has acquired the capability to predict, from predetermined data of an arbitrary time, feature information that will be included in predetermined data of a future time relative to the arbitrary time. The second save processing unit 116 generates, as the second learning result data 123, information indicating the structure and computational parameters of the trained prediction model 55 that is built. The second save processing unit 116 then saves the generated second learning result data 123 to a predetermined storage area.

(C) Modules Relating to Discordance Predictor

Next, the software modules relating to machine learning of the discordance predictor 57 will be described, with reference to FIG. 4C. The third data acquisition unit 117 and the third learning processing unit 118, out of the above software modules, relate to machine learning of the discordance predictor 57. The third data acquisition unit 117 is an example of an "discordance learning data acquisition unit" of the present invention, and the third learning processing unit 118 is an example of an "discordance learning processing unit" of the present invention.

The third data acquisition unit 117 acquires a plurality of third learning datasets 33 to be used in machine learning of the discordance predictor 57. The third learning datasets 33 are an example of "discordance learning datasets" of the present invention. Each third learning dataset 33 is constituted by a combination of the first sample 321 of a first time of the corresponding second learning dataset 32 and a discordance 333 of prediction by the prediction model 55 with respect to the first sample 321.

The first sample 321 is utilized as training data (input data) of machine learning. The discordance 333 is utilized as teaching data (correct answer data) of machine learning.

The third learning processing unit 118 builds the discordance predictor 57 trained to predict, from the first sample 321 of the first time, the corresponding discordance 333 of prediction by the prediction model 55, by machine learning that uses the plurality of third learning datasets 33. In the present embodiment, the third learning processing unit 118 trains the discordance predictor 57, by machine learning, to output an output value that matches the corresponding discordance 333 when the first sample 321 is input, for each third learning dataset 33.

At this time, the third learning processing units 118 according to the present embodiment, in machine learning of the discordance predictor 57, trains on each third learning dataset 33 uniformly regardless of the rarity degree 325, unlike the above second learning processing unit 115. The discordance predictor 57 trained to predict, from the first sample 321 of the first time, the corresponding discordance 333 of prediction by the prediction model 55, for each third learning dataset 33, is thereby built. In other words, the trained discordance predictor 57 is built that has acquired the capability to predict the discordance of prediction of the prediction model 55 with respect to predetermined data of an arbitrary time. The trained discordance predictor 57 that is built is utilized by the above rarity degree setting unit 119.

Configuration of Discordance Predictor

Next, an example of the configuration of the discordance predictor 57 will be described. As shown in FIG. 4C, the discordance predictor 57 is constituted by a neural network having a multilayer structure that is used in deep learning, similarly to the above prediction model 55 and the like. The discordance predictor 57 is provided with an input layer 571, an intermediate (hidden) layer 572, and an output layer 573. The structure of the discordance predictor 57 is not, however, limited to such an example, and may be determined as appropriate according to the embodiment. For example, the number of intermediate layers included in the discordance predictor 57 is not limited to one, and may also be two or more.

The number of neurons (nodes) that are included in each of the layers 571 to 573 of the discordance predictor 57 may be selected as appropriate according to the embodiment. In the example in FIG. 4C, each neuron of the discordance predictor 57 is connected to all neurons in adjacent layers. However, the connection of neurons in the discordance predictor 57 is not limited to such an example, and may be set as appropriate according to the embodiment. The weights of the connections of neurons included in each of the layers 571 to 573 and the threshold values of the neurons are examples of computational parameters of the discordance predictor 57.

In the present embodiment, the third learning processing unit 118 executes machine learning of the discordance predictor 57 constituted by a neural network such as the above, using the plurality of third learning datasets 33. That is, the third learning processing unit 118, by adjusting the values of the computational parameters of the discordance predictor 57, trains the discordance predictor 57 to output an output value that matches the corresponding discordance 333 from the output layer 573 when the first sample 321 is input to the input layer 571, for each third learning dataset 33. In the processing of this machine learning, the rarity degree 325 is disregarded and each third learning dataset 33 is trained on uniformly, unlike machine learning of the prediction model 55. "Trained on uniformly" means not implementing adjustment of the extent of machine learning that depends on the rarity degree 325, unlike the above second learning processing unit 115. The third learning processing unit 118 thereby builds the trained discordance predictor 57 that has acquired the capability to predict the discordance of prediction of the prediction model 55 with respect to predetermined data of an arbitrary time. Note that training of the above prediction model 55 and training of the discordance predictor 57 may be executed alternately.

Prediction Apparatus

Figure 5:
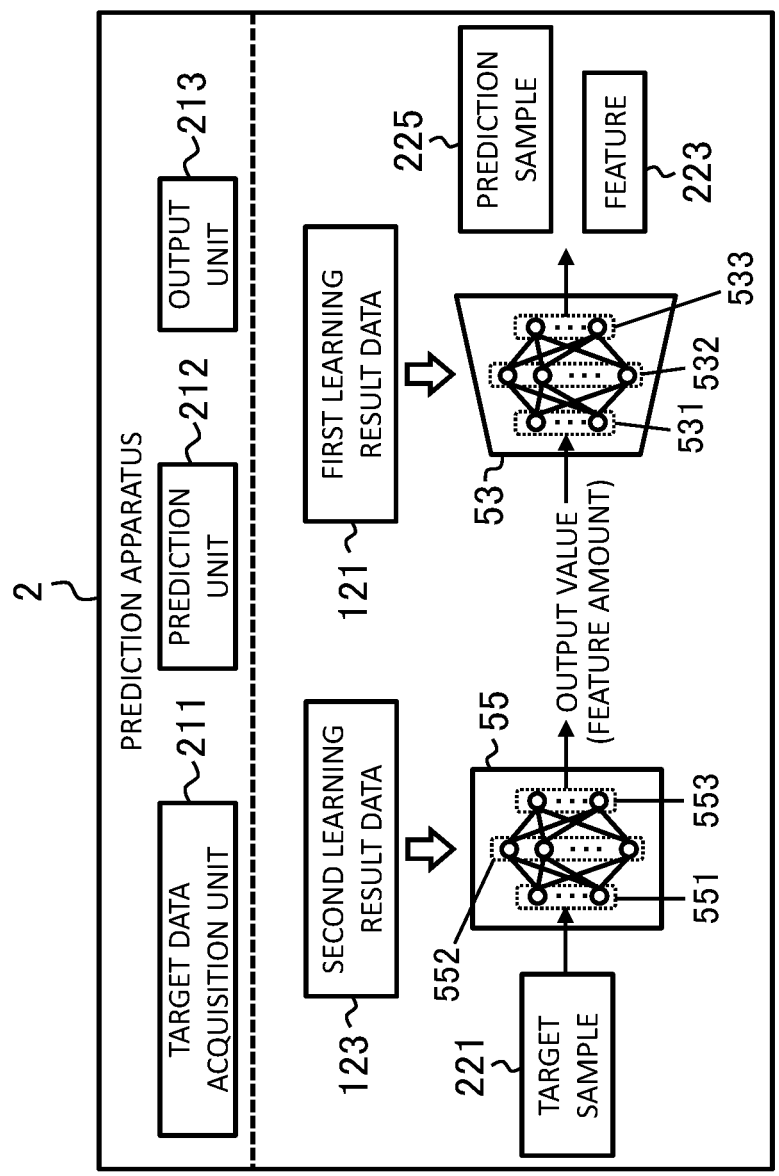
FIG. 5 schematically illustrates an example of the software configuration of the prediction apparatus according to the embodiment.

Next, an example of the software configuration of the prediction apparatus 2 according to the present embodiment will be described, using FIG. 5. FIG. 5 schematically illustrates an example of the software configuration of the prediction apparatus 2 according to the present embodiment.

The control unit 21 of the prediction apparatus 2 unpacks the prediction program 82 stored in the storage unit 22 into the RAM. The control unit 21 then controls the constituent elements, by interpreting and executing the prediction program 82 unpacked into the RAM with the CPU. As shown in FIG. 5, the prediction apparatus 2 according to the present embodiment thereby operates as a computer provided with a target data acquisition unit 211, a prediction unit 212 and an output unit 213 as software modules. That is, in the present embodiment, the software modules of the prediction apparatus 2 are realized by the control unit 21 (CPU).

The target data acquisition unit 211 acquires the target sample 221 of the predetermined data. In the present embodiment, the target data acquisition unit 211 acquires the target sample 221 from the sensor S. The prediction unit 212 predicts, from the acquired target sample 221, a feature 223 that will appear in the predetermined data at a future time relative to the time at which the target sample 221 is acquired, using the trained prediction model 55 built by the model generation apparatus 1. The output unit 213 outputs information relating to the result of predicting the feature 223.

Note that, in the present embodiment, the prediction model 55 is trained, by machine learning, to predict feature information that includes a feature amount that is obtained by the encoder 52 of the estimator 51. Thus, a prediction estimator capable of predicting a sample and a feature of predetermined data of a future time from a sample of predetermined data of an arbitrary time can be built, by combining the prediction model 55 and the decoder 53 of the estimator 51.

In view of this, in the present embodiment, the prediction unit 212 includes the decoder 53 of the estimator 51 and the prediction model 55, by holding the first learning result data 121 and the second learning result data 123. The prediction unit 212 predicts a prediction sample 225 and the feature 223 of a future time from the target sample 221 of an arbitrary time, utilizing the prediction model 55 and the decoder 53.

Specifically, the prediction unit 212, first, inputs the target sample 221 to the prediction model 55, and executes computational processing of the prediction model 55. The prediction unit 212 thereby predicts a feature amount of predetermined data of a future time from the target sample 221, utilizing the prediction model 55. The prediction unit 212 then inputs the predicted feature amount to the decoder 53, and executes computational processing of the decoder 53. The prediction unit 212 thereby utilizes the decoder 53 to restore the prediction sample 225 from the predicted feature amount and to predict the feature 223 that will appear in the predetermined data at a future time.

Additional Matters

The software modules of the model generation apparatus 1 and the prediction apparatus 2 will be described in detail with example operations discussed later. Note that, in the present embodiment, an example in which the software modules of the model generation apparatus 1 and the prediction apparatus 2 are all realized by a general-purpose CPU is described. However, some or all of the above software modules may also be realized by one or a plurality of dedicated processors. Also, in relation to the respective software configurations of the model generation apparatus 1 and the prediction apparatus 2, omission, substitution and addition of software modules are possible as appropriate, according to the embodiment.

3. Example Operations

Model Generation Apparatus (A) Machine Learning of Estimator

Figure 6:
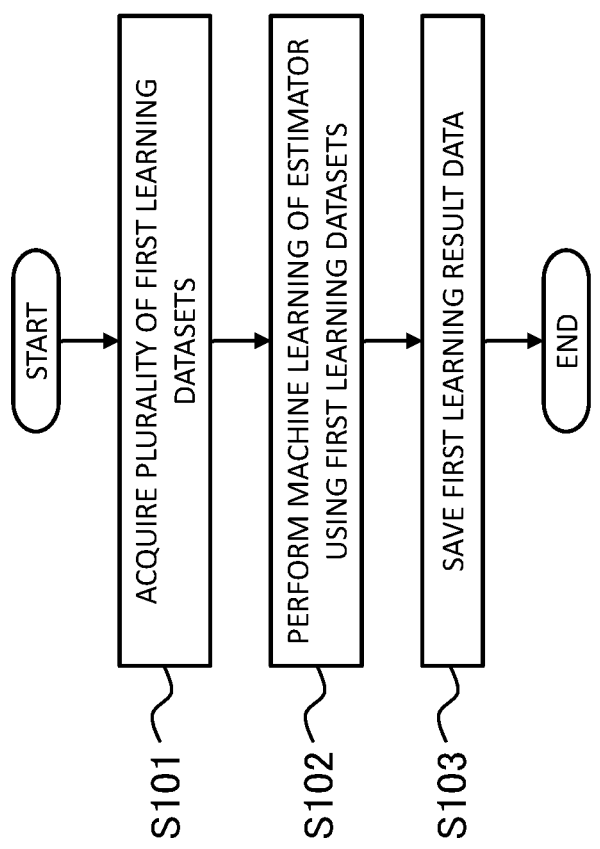
FIG. 6 illustrates an example of processing procedures relating to machine learning of an estimator by the model generation apparatus according to the embodiment.

Next, example operations of the model generation apparatus 1 relating to machine learning of the estimator 51 will be described, using FIG. 6. FIG. 6 is a flowchart showing an example of processing procedures relating to machine learning of the estimator 51 by the model generation apparatus 1. The processing procedures described below are, however, merely by way of example, and the steps may be modified to the fullest extent possible. Furthermore, with regard to the processing procedures described below, omission, substitution and addition of steps are possible as appropriate, according to the embodiment.

Step S101

In step S101, the control unit 11 operates as the first data acquisition unit 111, and acquires a plurality of first learning datasets 31 to be used in machine learning of the estimator 51. In the present embodiment, the control unit 11 acquires a plurality of first learning datasets 31 each constituted by a combination of the sample 311 and the correct answer data 313.

The method of acquiring each first learning dataset 31 is not particularly limited, and may be selected as appropriate according to the embodiment. For example, predetermined data is acquired in time series, by preparing a sensor of the same type as the sensor S and performing measurement under various conditions with the prepared sensor. The object of observation may be selected as appropriate according to the feature that is estimated from the predetermined data. Next, the sample 311 is extracted as appropriate from the predetermined data obtained in time series. The correct answer data 313 indicating a feature that appears in the extracted sample 311 is then associated with the sample 311. Each first learning dataset 31 can thereby be generated.

Each first learning dataset 31 may be generated automatically by operations of a computer, or may be generated manually through operation by the operator. Also, generation of each first learning dataset 31 may be performed by the model generation apparatus 1, or may be performed by another computer other than the model generation apparatus 1. In the case where the model generation apparatus 1 generates each first learning dataset 31, the control unit 11 acquires the plurality of first learning datasets 31, by executing the above series of processing automatically, or manually through operation by the operator via the input device 14. On the other hand, in the case where another computer generates each first learning dataset 31, the control unit 11 acquires the plurality of first learning datasets 31 generated by the other computer, via a network or the storage medium 91, for example. A configuration may also be adopted in which some of the first learning datasets 31 are generated by the model generation apparatus 1, and the other first learning datasets 31 are generated by one or a plurality of other computers.

The number of first learning datasets 31 that are acquired is not particularly limited, and may be selected as appropriate according to the embodiment. When the plurality of first learning datasets 31 have been acquired, the control unit 11 advances the processing to the next step S102.

Step S102

In step S102, the control unit 11 operates as the first learning processing unit 112, and executes machine learning of the estimator 51, using the plurality of first learning datasets 31. In the present embodiment, the control unit 11 trains the estimator 51, by machine learning, to output an output value that matches the sample 311 and the correct answer data 313 from the decoder 53 when the sample 311 is input to the encoder 52, for each first learning dataset 31. The control unit 11 thereby builds the trained estimator 51 that has acquired the capability to estimate features that appear in predetermined data.

As an example of specific processing procedures of machine learning, the control unit 11, first, prepares an estimator 51 to serve as the processing target. The structure (e.g., number of layers, number of neurons included in each layer, connection relationship of neurons in adjacent layers, etc.) of the estimator 51 that is prepared, the initial value of the weight of the connection between neurons, and the initial value of the threshold value of the neurons may be provided by a template or may be provided through input by the operator. Also, in the case of performing relearning, the control unit 11 may prepare the estimator 51, based on learning result data obtained by performing machine learning in the past.

Next, the control unit 11 executes learning processing of the neural network that constitutes the estimator 51, utilizing the sample 311 included in each first learning dataset 31 as input data, and utilizing the sample 311 and the correct answer data 313 as teaching data. The batch gradient descent method, stochastic gradient descent method, mini-batch gradient descent method or the like may be used for this learning processing.

For example, in a first step, the control unit 11 inputs the sample 311 to the encoder 52, and executes computational processing of the encoder 52, for each first learning dataset 31. That is, the control unit 11 inputs the sample 311 to the input layer 521 of the encoder 52, and performs firing determination of each neuron included in each of the layers 521 to 523 in order from the input side. Through this computational processing, the control unit 11 acquires an output value corresponding to the result of converting the sample 311 into a feature amount from the output layer 523 of the encoder 52.

Also, the control unit 11 inputs the output value acquired from the encoder 52 to the decoder 53, and executes computational processing of the decoder 53. That is, the control unit 11 inputs the output value acquired from the encoder 52 to the input layer 531 of the decoder 53, and performs firing determination of each neuron included in each of the layers 531 to 533 in order from the input side. Through this computational processing, the control unit 11 restores the sample 311 from the output value (feature amount) of the encoder 52, and acquires an output value corresponding to the result of estimating a feature included in the sample 311 from the output layer 533 of the decoder 53.

In a second step, the control unit 11 calculates the error between the output value acquired from the output layer 533 and the sample 311 and correct answer data 313, based on a loss function. The loss function is a function for evaluating the difference between the output of the learning model and the correct answer, and the value of the loss function is larger as the difference value between the output value acquired from the output layer 533 and the sample 311 and correct answer data 313 increases. The type of loss function that is utilized in computing the error of the estimator 51 is not particularly limited, and may be selected as appropriate according to the embodiment. In a third step, the control unit 11 calculates the respective errors of the weight of the connection between neurons in the estimator 51 and the threshold value of the neurons by the back propagation method, using the calculated error of the output value.

In a fourth step, the control unit 11 updates the values of the computational parameters of the estimator 51, that is, the respective values of the weight of the connection between neurons and the threshold value of the neurons, based on the calculated errors. The extent to which the values of the computational parameters are updated may be adjusted by the learning ratio. The learning ratio determines the degree to which the values of the computational parameters are updated in machine learning. The amount by which the computational parameters are updated is larger as the learning ratio increases, and the amount by which the computational parameters are updated is smaller as the learning ratio decreases. In this case, the control unit 11 updates the respective values of the weight of the connection between neurons and the threshold value of the neurons with values obtained by multiplying the learning ratio by the respective errors. In machine learning of the estimator 51, the learning ratio may be provided as appropriate. For example, the learning ratio may be provided by through designation by the operator.

The control unit 11, by repeating the above first to fourth steps, adjusts the values of the computational parameters of the estimator 51, such that the sum of the errors between the output value that is output from the output layer 533 of the decoder 53 and the sample 311 and correct answer data 313 decreases, for each first learning dataset 31. For example, the control unit 11 may also repeat the adjustment of the values of the computational parameters in the above first to fourth steps, until the sum of the errors between the output value that is obtained from the output layer 533 and the sample 311 and correct answer data 313 decreases to a threshold value, for each first learning dataset 31. The threshold value may be set as appropriate according to the embodiment.

This adjustment of the values of the computational parameters of the estimator 51 may be executed on a mini-batch. In this case, before executing the processing of the above first to fourth steps, the control unit 11 generates a mini-batch by extracting any suitable number of samples (first learning datasets 31) from the plurality of first learning datasets 31. The control unit 11 then executes the processing of the above first to fourth steps, for each first learning dataset 31 included in the generated mini-batch. In the case of repeating the first to fourth steps, the control unit 11 again generates a mini-batch, and executes the processing of the above first to fourth steps on the newly generated mini-batch. The size (i.e., number of samples) of the mini-batch may be set as appropriate according to the embodiment. Also, in machine learning of the estimator 51, the mini-batches may be extracted randomly, for example.

In the process of this machine learning, the encoder 52 is trained to convert the sample 311 of predetermined data into a feature amount. Also, the decoder 53 is trained to restore the sample 311 from the feature amount obtained by the encoder 52, and to estimate a feature included in the sample 311. The sample 311 is an example of a "third sample" of the present invention. As a result, the control unit 11 is able to build an estimator 51 trained to output an output value that matches the sample 311 and the correct answer data 313 in response to input of the sample 311, for each first learning dataset 31. "Conform" here may also include a difference permissible by a threshold value or the like occurring between the output value of the output layer 533 and the teaching data (sample 311 and correct answer data 313). This also similarly applies to machine learning of the prediction model 55 and the discordance predictor 57 discussed later. When machine learning of the estimator 51 has been completed, the control unit 11 advances the processing to the next step S103.

Note that the specific processing procedures of machine learning are not limited to such an example, and may be determined as appropriate according to the embodiment. For example, in the present embodiment, the estimator 51 is constituted by an autoencoder. Thus, so that the feature amounts that are output from the encoder 52 follow a prior distribution such as a Gaussian distribution, the control unit 11 may also normalize the output value of the encoder 52. For example, the control unit 11, in the process of the above machine learning, may calculate the error between the output value that is output from the encoder 52 and a value extracted from the prior distribution, and further adjust the values of the computational parameters of the encoder 52, based on the calculated error, with the above back propagation method.

Step S103

In step S103, the control unit 11 operates as the first save processing unit 113, and saves information relating to the trained estimator 51 built by machine learning to a predetermined storage area. In the present embodiment, the control unit 11 generates information indicating the structure and computational parameters of the trained estimator 51 (encoder 52 and decoder 53) built by the machine learning of step S102 as the first learning result data 121. Respective data relating to the encoder 52 and the decoder 53 may be generated as the same file or may be generated as separate files. The control unit 11 then saves the generated first learning result data 121 to a predetermined storage area.

The predetermined storage area may be the RAM in the control unit 11, the storage unit 12, an external storage device, storage media, or a combination thereof, for example. The storage media may be a CD or a DVD, for example, and the control unit 11 may also store the first learning result data 121 in the storage media via the drive 16. The external storage device may be a data server such as a NAS (Network Attached Storage), for example. In this case, the control unit 11 may also store the first learning result data 121 in the data server via a network, utilizing the communication interface 13. The external storage device may also be an external storage device connected to the model generation apparatus 1, for example.

When saving of the first learning result data 121 has thereby been completed, the control unit 11 ends the series of processing relating to machine learning of the estimator 51.

Note that, after building the trained estimator 51, the control unit 11 may also transfer the generated first learning result data 121 to the prediction apparatus 2 at any suitable timing. The prediction apparatus 2 may acquire the first learning result data 121 by receiving transfer from the model generation apparatus 1, or may acquire the first learning result data 121 by accessing the model generation apparatus 1 or a data server. The first learning result data 121 may also be incorporated in the prediction apparatus 2 in advance. In the case where the prediction apparatus 2 does not utilize the encoder 52, data relating to the encoder 52 may be omitted from the first learning result data 121 that is held by the prediction apparatus 2.

The control unit 11 may also periodically update the first learning result data 121, by periodically repeating the processing of the above steps S101 to S103. At the time of performing this repetition, updating such as modification, revision, addition and deletion of the first learning datasets 31 may be executed as appropriate. The control unit 11 may then also periodically update the first learning result data 121 that is held by the prediction apparatus 2, by transferring the updated first learning result data 121 to the prediction apparatus 2 every time machine learning is executed.

(B) Machine Learning of Prediction Model and Discordance Predictor

Figure 7:
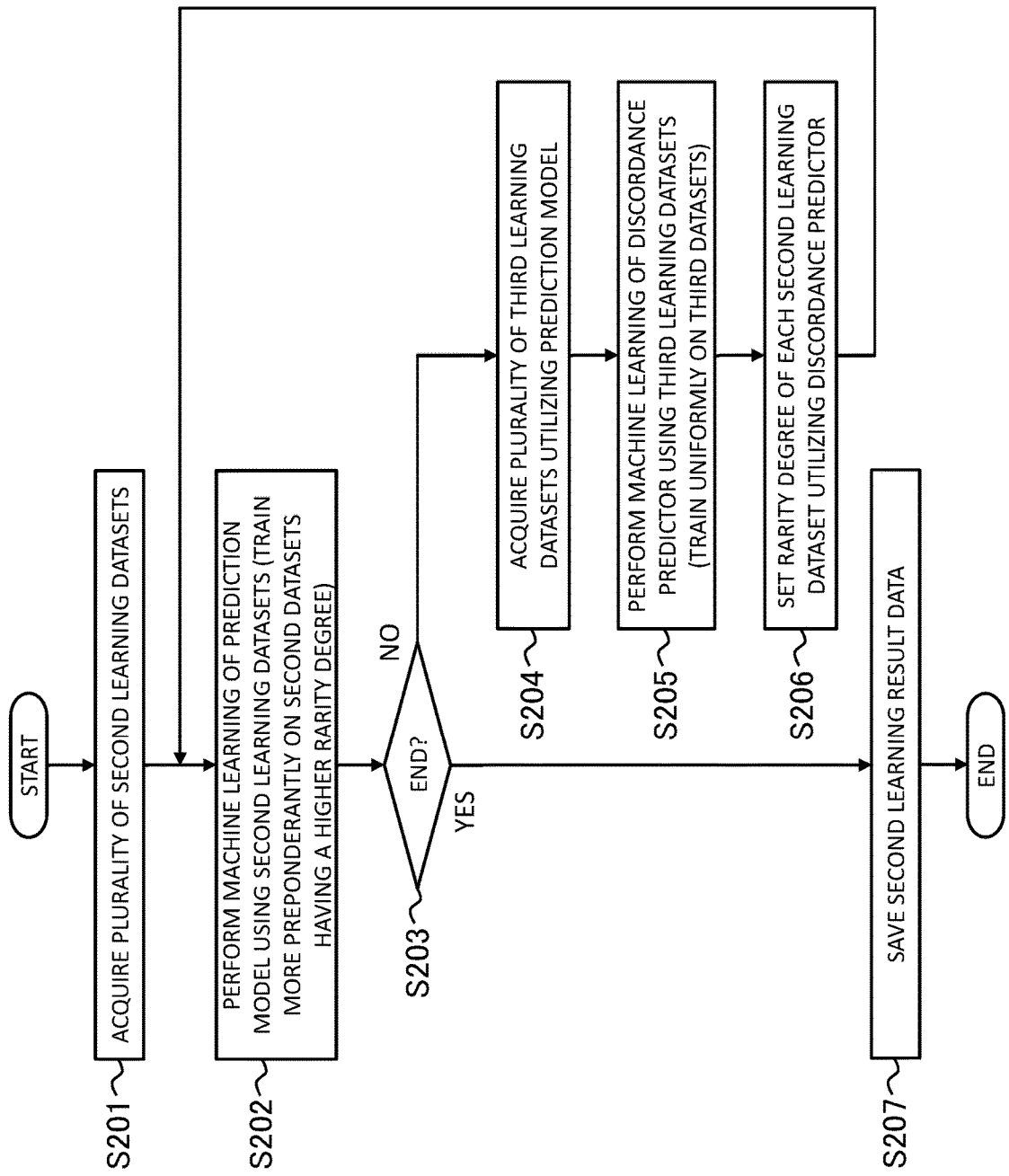
FIG. 7 illustrates an example of processing procedures relating to machine learning of a prediction model by the model generation apparatus according to the embodiment.

Next, example operations of the model generation apparatus 1 relating to machine learning of the prediction model 55 and the discordance predictor 57 will be described, using FIG. 7. FIG. 7 is a flowchart showing an example of processing procedures relating to machine learning of the prediction model 55 and the discordance predictor 57 by the model generation apparatus 1. The processing procedures described below are an example of a "model generation method" of the present invention. The processing procedures described below are, however, merely by way of example, and the steps may be modified to the fullest extent possible. Furthermore, with regard to the processing procedures described below, omission, substitution and addition of steps are possible as appropriate, according to the embodiment.

Step S201

In step S201, the control unit 11 operates as the second data acquisition unit 114, and acquires a plurality of second learning datasets 32 each constituted by a combination of the first sample 321 of a first time of predetermined data that is obtained in time series and the feature information 323 included in the second sample 322 of a future second time relative to the first time.

The method of acquiring each second learning dataset 32 is not particularly limited, and may be selected as appropriate according to the embodiment. For example, predetermined data is acquired in time series, by preparing a sensor of the same type as the sensor S, and performing measurement under various conditions with the prepared sensor. Next, the first sample 321 and the second sample 322 are extracted as appropriate from the predetermined data obtained in time series. The predetermined data from which the first sample 321 and the second sample 322 are extracted may be the same as the predetermined data utilized in generating the above first learning datasets 31.

Next, the feature information 323 is acquired from the second sample 322. In the present embodiment, the feature information 323 is constituted to include a feature amount of the second sample 322. The method of calculating the feature amount from the second sample 322 is not particularly limited, and may be selected as appropriate according to the embodiment. For example, the feature amount may be calculated from the second sample 322, by a known computational method relating to extraction of feature amounts. Also, in the present embodiment, the trained encoder 52 that converts samples of predetermined data into feature amounts is built by machine learning of the above estimator 51. Thus, the feature amount constituting the feature information 323 may also be provided by converting the second sample 322 with the trained encoder 52. Specifically, the second sample 322 is input to the input layer 521 of the encoder 52, and firing determination of each neuron included in each of the layers 521 to 523 is performed in order from the input side. Through this computational processing, an output value (feature amount) that is output from the output layer 523 of the encoder 52 is acquired as the feature information 323. The obtained feature information 323 is then associated with the first sample 321. Each second learning dataset 32 can thereby be generated.

Furthermore, the rarity degree 325 indicating the degree of rarity of the second learning dataset 32 is set for each generated second learning dataset 32. Rarity refers to how infrequently a feature is obtained from predetermined data. In the present embodiment, as will be discussed later, the rarity degree 325 is updated to show the degree of rarity of each second learning dataset 32, in the process of repeating the processing of step S202, depending on the determination of step S203. Thus, at the stage of acquiring each second learning dataset 32 in step S201, the rarity degree 325 may also be set as appropriate by random, template, or the like. The rarity degree 325 may also be set through designation by the operator.

Each second learning dataset 32 may be generated automatically by operations of a computer, or may be generated manually through operation by the operator. Also, generation of each second learning dataset 32 may be performed by the model generation apparatus 1, or may be performed by another computer other than the model generation apparatus 1. In the case where the model generation apparatus 1 generates each second learning dataset 32, the control unit 11 acquires the plurality of second learning datasets 32, by executing the above series of processing automatically, or manually through operation by the operator via the input device 14. On the other hand, in the case where another computer generates each second learning dataset 32, the other computer may acquire the first learning result data 121 from the model generation apparatus 1, in order to utilize the encoder 52 of the trained estimator 51. In the case where the decoder 53 is not utilized, data relating to the decoder 53 may be omitted from the first learning result data 121 that is acquired by the other computer. The other computer is thereby able to generate each second learning dataset 32, by executing the above series of processing automatically or manually, utilizing the encoder 52 of the trained estimator 51. The control unit 11 acquires the plurality of second learning datasets 32 generated by the other computer, via a network or the storage medium 91, for example. A configuration may also be adopted in which some of the second learning datasets 32 are generated by the model generation apparatus 1, and the other second learning datasets 32 are generated by one or a plurality of other computers. Generation of each second learning dataset 32 and setting of the rarity degree 325 may also be executed by separate computers.

The number of second learning datasets 32 that are acquired is not particularly limited, and may be selected as appropriate according to the embodiment. When the plurality of second learning datasets 32 have been acquired, the control unit 11 advances the processing to the next step S202.

Step S202

In step S202, the control unit 11 operates as the second learning processing unit 115, and executes machine learning of the prediction model 55, using the plurality of second learning datasets 32. In the present embodiment, the control unit 11 trains the prediction model 55, by machine learning, to output an output value that matches the corresponding feature information 323 when the first sample 321 is input, for each second learning dataset 32. The control unit 11 thereby builds the prediction model 55 trained to predict the feature information 323 of a second time from the first sample 321 of a first time, for each second learning dataset 32.

The specific processing procedures of machine learning may, fundamentally, be similar to the processing procedures of machine learning of the estimator 51. The control unit 11, first, prepares a prediction model 55 to serve as the processing target. The structure of the prediction model 55 that is prepared, the initial value of the weight of the connection between neurons, and the initial value of the threshold value of the neurons may be provided by template or may be provided through input by the operator. In the case of performing relearning, the control unit 11 may prepare the prediction model 55, based on learning result data obtained by performing machine learning in the past. In the case of executing step S202 again depending on the conditional branch of step S203 discussed later, the control unit 11 prepares the prediction model 55 to serve as the processing target, based on the learning result obtained by executing processing of the prior step S202.

Next, the control unit 11 executes learning processing of the neural network constituting the prediction model 55, utilizing the first sample 321 included in each second learning dataset 32 as input data, and utilizing the feature information 323 as teaching data. The batch gradient descent method, the stochastic gradient descent method, the mini-batch gradient descent method or the like may be used for this learning processing.

For example, in a first step, the control unit 11 inputs the first sample 321 to the prediction model 55, and executes computational processing of the prediction model 55, for each second learning dataset 32. That is, the control unit 11 inputs the first sample 321 to the input layer 551 of the prediction model 55, and performs firing determination of each neuron included in each of the layers 551 to 553 in order from the input side. Through this computational processing, the control unit 11 acquires an output value corresponding to the result of predicting the feature information 323 of a second time from the first sample 321 of a first time from the output layer 553 of the prediction model 55.

In a second step, the control unit 11 calculates the error between the output value acquired from the output layer 553 and the corresponding feature information 323, based on a loss function. The type of loss function that is utilized in calculating the error of the prediction model 55 is not particularly limited, and may be selected as appropriate according to the embodiment. In a third step, the control unit 11 calculates the respective errors of the weight of the connection between neurons in the prediction model 55 and the threshold value of the neurons by the back propagation method, using the calculated error of the output value. In a fourth step, the control unit 11 updates the values of the computational parameters of the prediction model 55, that is, the weight of the connection between neurons and the threshold value of the neurons, based on the calculated errors. The extent to which the values of the computational parameters are updated may be adjusted by the learning ratio.

The control unit 11, by repeating the above first to fourth steps, adjusts the values of the computational parameters of the prediction model 55, such that the sum of the errors between the output value that is output from the output layer 553 and the feature information 323 decreases, for each second learning dataset 32. For example, the control unit 11 may also repeat the adjustment of the values of the computational parameters in the above first to fourth steps, until the sum of the errors between the output value that is acquired from the output layer 553 and the feature information 323 decreases to a threshold value, for each second learning dataset 32. The threshold value may be set as appropriate according to the embodiment.

This adjustment of the values of the computational parameters of the prediction model 55 may be executed on a mini-batch. In this case, before executing the processing of the above first to fourth steps, the control unit 11 generates a mini-batch by extracting any suitable number of samples (second learning datasets 32) from the plurality of second learning datasets 32. The size of the mini-batch may be set as appropriate according to the embodiment. The control unit 11 then executes the processing of the above first to fourth steps, for each second learning dataset 32 included in the generated mini-batch. In the case of repeating the first to fourth steps, the control unit 11 again generates a mini-batch, and executes the processing of the above first to fourth steps on the newly generated mini-batch.

In the present embodiment, the rarity degree 325 indicating the degree of rarity of the second learning dataset 32 is set for each second learning dataset 32. The control unit 11 trains more preponderantly on second learning datasets 32 having a higher rarity degree 325, in machine learning of the above prediction model 55. The method of training preponderantly is not particularly limited, as long as it is a method according to which the degree of influence of second learning datasets 32 having a higher rarity degree 325 is greater than second learning datasets 32 having a lower rarity degree 325 in the predictive capability that is acquired by the prediction model 55, and may be selected as appropriate according to the embodiment. In the present embodiment, the control unit 11 trains more preponderantly on second learning datasets 32 having a higher rarity degree 325, in machine learning of the above prediction model 55, using at least one of the following two methods.

(A) Sampling Frequency

With a first method, the control unit 11 trains more preponderantly on second learning datasets 32 having a higher rarity degree 325, such that the sampling frequency in the above machine learning is increased for second learning datasets 32 having a higher rarity degree 325. In other words, in the first method, the degree of learning of each second learning dataset 32 is controlled based on the frequency with which each second learning dataset 32 is extracted as a sample.

As an example, when generating the above mini-batch, the control unit 11 increases the probability at which second learning datasets 32 having a higher rarity degree 325 are extracted to the mini-batch, compared with second learning datasets 32 having a lower rarity degree 325. That is, second learning datasets 32 having a higher rarity degree 325 are more likely to be frequently extracted to the mini-batch, compared with second learning datasets 32 having a lower rarity degree 325. The specific correspondence relationship between the rarity degree 325 and the extraction probability may be determined as appropriate.

The sampling frequency of second learning datasets 32 having a higher rarity degree 325 can thereby be increased, compared with second learning datasets 32 having a lower rarity degree 325. If this sampling frequency increases, the frequency of use in adjustment of the values of the computational parameters of the prediction model 55 increases. Therefore, according to this first method, in machine learning of the prediction model 55, the degree of influence of second learning datasets 32 having a higher rarity degree 325 can be increased over second learning datasets 32 having a lower rarity degree 325.

(B) Weighting

In a second method, the control unit 11 trains more preponderantly on second learning datasets 32 having a higher rarity degree 325, by increasing the weighting in the above machine learning for second learning datasets 32 having a higher rarity degree 325.

As an example, the control unit 11 sets the value of the above learning ratio, according to the rarity degree 325. That is, the control unit 11 sets the learning ratio to a larger value as the rarity degree 325 increases, and sets the learning ratio to a smaller value as the rarity degree 325 decreases. The specific correspondence relationship between the rarity degree 325 and the value of the learning ratio may be determined as appropriate according to the embodiment.

The value of the learning ratio of second learning datasets 32 having a higher rarity degree 325 is thereby set higher, compared with second learning datasets 32 having a lower rarity degree 325. If the value of the learning ratio increases, in the above fourth step, the amount of updating at the time of adjusting the values of the computational parameters of the prediction model 55 increases, that is, the weighting in machine learning increases, for the target second learning dataset 32. Therefore, according to this second method, in machine learning of the prediction model 55, the degree of influence of second learning datasets 32 having a higher rarity degree 325 can be increased over second learning datasets 32 having a lower rarity degree 325.

As a result of the above machine learning, the control unit 11 is able to build a prediction model 55 trained to output an output value that matches the feature information 323 of a second time when the first sample 321 of a first time is input, for each second learning dataset 32. When machine learning of the prediction model 55 has been completed, the control unit 11 advances the processing to the next step S203.

Step S203

In step S203, the control unit 11 determines whether to repeat processing of the machine learning of the prediction model 55 (and the discordance predictor 57). The criterion for repeating machine learning may be determined as appropriate according to the embodiment.

For example, a prescribed frequency for implementing machine learning of the prediction model 55 may be set. This prescribed frequency may be set uniquely for the model generation apparatus 1 or may be set through designation by the operator. In this case, the control unit 11 determines whether the frequency with which machine learning of the above step S202 (or step S205 discussed later) has been executed has reached the prescribed frequency. If it is determined that the frequency with which machine learning of the above step S202 has been executed has not reached the prescribed frequency, the control unit 11 advances the processing to the next step S204. On the other hand, if it is determined that the frequency with which machine learning of the above step S202 has been executed has reached the prescribed frequency, the control unit 11 ends execution of the machine learning of step S202, and advances the processing to the next step S207.

Also, for example, the control unit 11 may evaluate the prediction accuracy of the prediction model 55 utilizing evaluation data, and determine whether to end processing of machine learning, based on whether the evaluated accuracy of the prediction model 55 satisfies the predetermined criterion. The evaluation data may include a plurality of datasets similar to the second learning datasets 32. In other words, each evaluation dataset may be constituted by a combination of a sample of a first time and correct answer data of feature information of a second time. These evaluation datasets may be selected from second learning datasets 32 having a higher rarity degree 325. Alternatively, the evaluation datasets may be generated to be utilizable as second learning datasets 32 having a higher rarity degree 325. Whether the rarity degree 325 is high may be evaluated based on comparison with a threshold value, for example. In this case, the control unit 11 inputs a sample included in the evaluation datasets to the trained prediction model 55 in step S202, and executes computational processing of the prediction model 55. The control unit 11 thereby acquires an output value corresponding to the result of predicting feature information of a second time from the sample of a first time. The control unit 11 evaluates the prediction accuracy of the prediction model 55, by comparing the obtained output value and the correct answer data of the feature information, and determining whether the prediction of the prediction model 55 with respect to each evaluation dataset is correct. If this prediction accuracy does not satisfy the predetermined criterion (e.g., prediction accuracy less than or equal to threshold value), the control unit 11 determines to repeat the processing of machine learning, and advances the processing to the next step S204. On the other hand, if the prediction accuracy satisfies the predetermined criterion, the control unit 11 determines to end the processing of machine learning, and advances the processing to the next step S207.

Note that, as shown in FIG. 7, in the case where the processing is advanced to step S204, the processing returns to step S202 after the processing from step S204 is executed. Thus, in the case where step S204 is selected, the control unit 11 may also save the provisional learning result of step S202, that is, data showing information relating to the trained prediction model 55, to a predetermined storage area. The predetermined storage area may be the RAM in the control unit 11, the storage unit 12, an external storage device, storage media, or a combination thereof, for example.

Step S204

In step S204, the control unit 11 operates as the third data acquisition unit 117, and acquires a plurality of third learning datasets 33 each constituted by a combination of the first sample 321 of the first time of the corresponding second learning dataset 32 and the discordance 333 of prediction by the prediction model 55 with respect to the first sample 321.

The third learning datasets 33 may be generated as appropriate, utilizing the trained prediction model 55 built in step S202 and the respective second learning datasets 32. For example, the first sample 321 of each second learning dataset 32 is input to the trained prediction model 55 built in step S202, and computational processing of the prediction model 55 is executed. An output value corresponding to the result of predicting feature information of the second time from the first sample 321 of the first time is thereby acquired from the prediction model 55. The discordance 333 of prediction can be calculated, based on a comparison of the output value of this prediction model 55 and the corresponding feature information 323 (correct answer data). For example, the error between the output value of the prediction model 55 and the corresponding feature information 323 may also be calculated with a loss function, and the calculated error may be acquired as the discordance 333. The discordance 333 may also be calculated, utilizing an evaluation function of another error. For example, the difference value between the output value of the prediction model 55 and the corresponding feature information 323 may also be calculated as the discordance 333. The calculated discordance 333 is then associated with the first sample 321. Each third learning dataset 33 can thereby be generated. In the case where the processing of step S204 is repeated, depending on the determination of the above step S203, generation of each third learning dataset 33 may be executed whenever this step S204 is repeated.

Each third learning dataset 33 may be generated automatically by operations of a computer, or may be generated manually through operation by the operator. Also, generation of each third learning dataset 33 may be performed by the model generation apparatus 1, or may be performed by another computer other than the model generation apparatus 1. In the case where the model generation apparatus 1 generates each third learning dataset 33, the control unit 11 acquires the plurality of third learning datasets 33, by executing the above series of processing automatically, or manually through operation by the operator via the input device 14. On the other hand, in the case where another computer generates each third learning dataset 33, the other computer acquires data of the learning result of step S202 from the model generation apparatus 1, in order to utilize the trained prediction model 55. For example, the other computer may acquire data indicating the learning result saved in a predetermined storage area. Also, the other computer may acquire the first sample 321 of each second learning dataset 32 as appropriate. The other computer thereby generates each third learning dataset 33, by executing the above series of processing automatically or manually, utilizing the prediction model 55. The control unit 11 acquires the plurality of third learning datasets 33 generated by the other computer, via a network or the storage medium 91, for example. A configuration may also be adopted in which some of the third learning datasets 33 are generated by the model generation apparatus 1, and the other third learning datasets 33 are generated by one or a plurality of other computers.

The number of third learning datasets 33 that are acquired is not particularly limited, and may be selected as appropriate according to the embodiment. When the plurality of third learning datasets 33 have been acquired, the control unit 11 advances the processing to the next step S205.

Step S205

In step S205, the control unit 11 operates as the third learning processing unit 118, and executes machine learning of the discordance predictor 57, using the plurality of third learning datasets 33. In the present embodiment, the control unit 11 trains the discordance predictor 57, by machine learning, to output an output value that matches the corresponding discordance 333 when the first sample 321 is input, for each third learning dataset 33. The control unit 11 thereby builds the discordance predictor 57 trained to predict the discordance 333 of prediction by the prediction model 55 from the first sample 321 of the first time, for each third learning dataset 33. In other words, the discordance predictor 57 is configured to predict the discordance of prediction by the prediction model 55 from the first sample 321 of the first time, for each third learning dataset 33.

The specific processing procedures of machine learning may, fundamentally, be similar to the processing procedures of the machine learning of the estimator 51. The control unit 11, first, prepares a discordance predictor 57 to serve as the processing target. The structure of the discordance predictor 57 that is prepared, the initial value of the weight of the connection between neurons and the threshold value of the neurons may be provided by template or may be provided through input by the operator. In the case where a trained discordance predictor 57 has been obtained, that is, machine learning of a discordance predictor 57 has already been executed, the discordance predictor 57 to serve as the processing target may also be prepared, based on learning result data obtained as a result of past machine learning.

Next, the control unit 11 executes learning processing of the neural network constituting the discordance predictor 57, utilizing the first sample 321 included in each third learning dataset 33 as input data, and utilizing the discordance 333 as teaching data. The batch gradient descent method, the stochastic gradient descent method, the mini-batch gradient descent method or the like may be used for this learning processing, similarly to the above estimator 51 and the like.

For example, in a first step, the control unit 11 inputs the first sample 321 to the discordance predictor 57, and executes computational processing of the discordance predictor 57, for each third learning dataset 33. That is, the control unit 11 inputs the first sample 321 to the input layer 571 of the discordance predictor 57, and performs firing determination of each neuron included in each of the layers 571 to 573 in order from the input side. Through this computational processing, the control unit 11 acquires an output value corresponding to the result of predicting the discordance of prediction of the prediction model 55 with respect to the first sample 321 from the output layer 573 of the discordance predictor 57.

In a second step, the control unit 11 calculates the error between the output value acquired from the output layer 573 and the corresponding discordance 333 (correct answer data), based on a loss function. The type of loss function that is utilized in calculating the error of the discordance predictor 57 is not particularly limited, and may be selected as appropriate according to the embodiment. In a third step, the control unit 11 calculates the error of the weight of the connection between neurons and the threshold value of the neurons in the discordance predictor 57 by the back propagation method, using the calculated error of the output value. In a fourth step, the control unit 11 updates the values of the computational parameters of the discordance predictor 57, that is, the weight of the connection between neurons and the threshold value of the neurons, based on the calculated errors. The extent to which the values of the computational parameters are updated may be adjusted by the learning ratio.

The control unit 11, by repeating the above first to fourth steps, adjusts the values of the computational parameters of the discordance predictor 57, such that the sum of the errors between the output value that is output from the output layer 573 and the discordance 333 decreases, for each third learning dataset 33. For example, the control unit 11 may also repeat the adjustment of the values of the computational parameters in the above first to fourth steps, until the sum of the errors between the output value that is output from the output layer 573 and the discordance 333 decreases to a threshold value, for each third learning dataset 33. The threshold value may be set as appropriate according to the embodiment.

This adjustment of the values of the computational parameters of the discordance predictor 57 may be executed on a mini-batch. In this case, before executing the processing of the above first to fourth steps, the control unit 11 generates a mini-batch by extracting any suitable number of samples (third learning dataset 33) from the plurality of third learning datasets 33. The size of the mini-batch may be set as appropriate according to the embodiment. The control unit 11 then executes the processing of the above first to fourth steps, for each third learning dataset 33 included in the generated mini-batch. In the case of repeating the first to fourth steps, the control unit 11 again generates a mini-batch, and executes the processing of the above first to fourth steps on the newly generated mini-batch.

In the present embodiment, the control unit 11 uniformly trains on each third learning dataset 33, independently of the rarity degree 325, in machine learning of the discordance predictor 57, unlike machine learning of the above prediction model 55. That is, the control unit 11 does not implement adjustment of the extent of machine learning that depends on the rarity degree 325 by the above methods, with regard to the discordance predictor 57. In the case of generating a mini-batch, for example, the control unit 11 extracts sample (third learning dataset 33) randomly without bias from the plurality of third learning datasets 33. Also, the control unit 11 sets the learning ratio for each third learning dataset 33 to the same value. Note that "uniformly trains" may indicate training being performed independently of the provided rarity degree 325, and may, for example, include the nonuniformity of unintended machine learning consequently occurring, due to mini-batches being generated randomly.

As a result of the above machine learning, the control unit 11 is able to build a discordance predictor 57 trained to output an output value that matches the discordance 333 of prediction of the prediction model 55 with respect to the first sample 321 of the first time when this first sample 321 is input, for each third learning dataset 33. When machine learning of the discordance predictor 57 has been completed, the control unit 11 advances the processing to the next step S206.

Step S206

In step S206, the control unit 11 operates as the rarity degree setting unit 119, and sets (updates) the rarity degree 325 of each second learning dataset 32. In the present embodiment, the control unit 11 sets the rarity degree 325 of each second learning dataset 32, utilizing the trained discordance predictor 57 built in step S205.

The control unit 11 inputs the first sample 321 of each second learning dataset 32 to the discordance predictor 57, and executes computational processing of the discordance predictor 57. The control unit 11 thereby acquires an output value corresponding to the result of predicting the discordance of prediction of the prediction model 55 with respect to the first sample 321 from the discordance predictor 57. The control unit 11 sets the rarity degree 325 of the second learning datasets 32, according to the result of prediction of this discordance (i.e., discordance that is predicted). Specifically, the control unit 11 sets the rarity degree 325 to a higher value as the discordance that is predicted increases, and sets the rarity degree 325 to a lower value as the discordance that is predicted decreases. The specific correspondence relationship between the result of prediction of discordance and the rarity degree 325 may be determined as appropriate according to the embodiment.

In machine learning of the discordance predictor 57 in the above step S205, the control unit 11 trains on each third learning dataset 33, regardless of the rarity degree 325. When learning data is trained on uniformly, the results of training on learning data relating to rare events can get buried among the results of training on learning data relating to plentiful events (e.g., continuous events). Thus, in the case where the prediction model 55 predicts the feature information 323 of the second sample 322 having a high rarity from the first sample 321 when each third learning dataset 33 is trained on regardless of the rarity degree 325, the trained discordance predictor 57 is built such that the accuracy with which the discordance of prediction of the prediction model 55 is predicted deteriorates. That is, the trained discordance predictor 57 is built to predict that the prediction model 55 will make increasingly erroneous predictions, or in other words, that discordance will increase, as the rarity of the feature information 323 with which the first sample 321 is associated increases. Thus, according to the discordance predictor 57 trained in the above step S205, the rarity of each second learning dataset 32 can be appropriately evaluated.

In the present embodiment, the rarity degree 325 of each second learning dataset 32 is set according to the discordance that is predicted by the discordance predictor 57, and consequently, is set according to the extent of irregularity with which the corresponding feature information 323 appears in the predetermined data. In other words, since the possibility of an event occurring is lower as the irregularity with which a feature shown in the feature information 323 appears in the predetermined data increases, the number of second learning datasets 32 that include the feature information 323 having a high irregularity in the data group of the second learning datasets 32 decreases. In response, the number of third learning dataset 33 that include the first sample 321 associated with the feature information 323 having a high irregularity also decreases. Thus, as described above, the accuracy of prediction of discordance with respect to this first sample 321 by the discordance predictor 57 that is trained uniformly deteriorates, or in other words, the discordance predictor 57 can predict that discordance will increase. As a result, the rarity degree 325 of second learning datasets 32 that include the feature information 323 having a high irregularity is set to a high value. Accordingly, in the present embodiment, the control unit 11 sets the rarity degree 325 of each second learning dataset 32 according to the extent of irregularity with which the feature information 323 appears in the predetermined data, by utilizing the discordance predictor 57 that is trained uniformly. When setting of the rarity degree 325 has been completed, the control unit 11 returns the processing to step S202.

Note that in the case where the series of processing of step S202 and steps S204 to S206 are repeated, depending on the conditional branch of step S203, training of the prediction model 55 in step S202 and training of the discordance predictor 57 in step S205 are repeatedly executed alternately. In this case, in step S204, each third learning dataset 33 is obtained by the updated prediction model 55. Also, in step S206, the rarity degree 325 of each second learning dataset 32 is set (updated) by the updated discordance predictor 57.

In this process, the control unit 11 trains more preponderantly on second learning datasets 32 having a higher rarity degree 325 in machine learning of the prediction model 55, while, on the other hand, training uniformly on the third learning datasets 33 in machine learning of the discordance predictor 57. The results of training on second learning datasets 32 having a higher rarity degree 325 are thereby greatly accumulated in the prediction model 55, whereas the results of training on the third learning datasets 33 are uniformly accumulated in the discordance predictor 57. As a result, the prediction accuracy of the prediction model 55 with respect to samples having a higher rarity improves, whereas the prediction accuracy of the discordance predictor 57 with respect to samples having a higher rarity does not improve compared with the prediction model 55. Accordingly, in the process of repeating the above series of processing, improvement in the prediction accuracy of the prediction model 55 with respect to samples having a higher rarity can be achieved, while appropriately setting the rarity degree 325 of each second learning dataset 32 utilizing the discordance predictor 57.

Step S207

In step S207, the control unit 11 operates as the second save processing unit 116, and saves information relating to the trained prediction model 55 built by machine learning to a predetermined storage area. In the present embodiment, the control unit 11 generates information indicating the structure and computational parameters of the trained prediction model 55 built by the machine learning of step S202 as the second learning result data 123. The control unit 11 then saves the generated second learning result data 123 to a predetermined storage area. The control unit 11 may also generate learning result data for the trained discordance predictor 57, and save the generated learning result data to a predetermined storage area. The predetermined storage area may be the RAM in the control unit 11, the storage unit 12, an external storage device, storage media, or a combination thereof, for example. When saving of the second learning result data 123 has been completed, the control unit 11 ends the series of processing relating to machine learning of the prediction model 55 and the discordance predictor 57.

Note that, after building the trained prediction model 55, the control unit 11 may also transfer the generated second learning result data 123 to the prediction apparatus 2 at any suitable timing. The prediction apparatus 2 may acquire the second learning result data 123 by receiving transfer from the model generation apparatus 1, or may acquire the second learning result data 123 by accessing the model generation apparatus 1 or a data server. The second learning result data 123 may also be incorporated in the prediction apparatus 2 in advance.

Also, the control unit 11 may update the second learning result data 123 periodically, by periodically repeating the processing of the above steps S201 to S207. At the time of performing this repetition, updating such as modification, revision, addition and deletion of the second learning datasets 32 may be executed as appropriate. The control unit 11 may then also periodically update the second learning result data 123 that is held by the prediction apparatus 2, by transferring the updated second learning result data 123 to the prediction apparatus 2 every time machine learning is executed.

Prediction Apparatus

Figure 8:
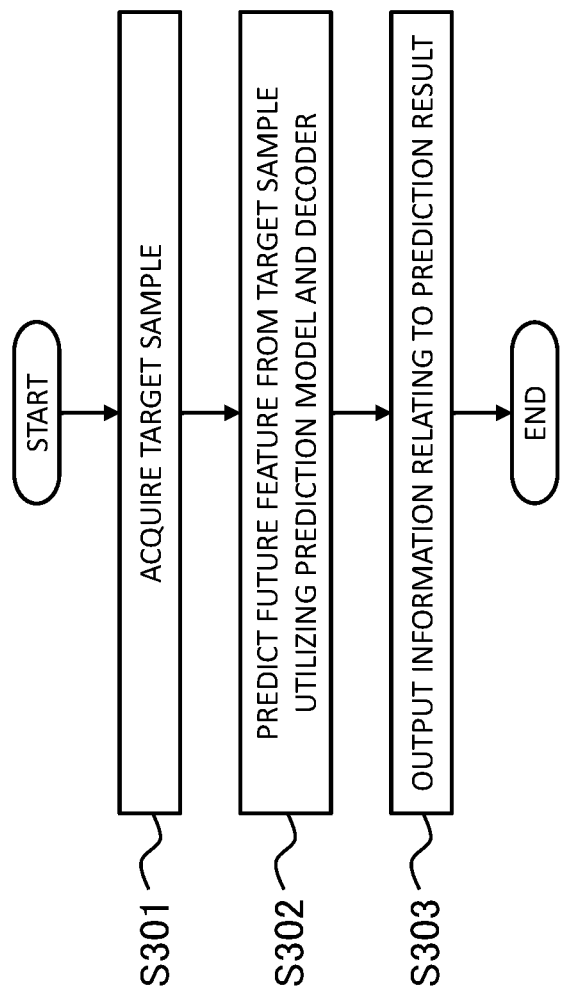
FIG. 8 illustrates an example of processing procedures of the prediction apparatus according to the embodiment.

Next, example operations of the prediction apparatus 2 that utilizes the trained prediction model 55 will be described, using FIG. 8. FIG. 8 is a flowchart showing an example of processing procedures relating to prediction processing by the prediction apparatus 2. The processing procedures described below are, however, merely by way of example, and the steps may be modified to the fullest extent possible. Furthermore, with regard to the processing procedures described below, omission, substitution and addition of steps are possible as appropriate, according to the embodiment.

Step S301

In step S301, the control unit 21 operates as the target data acquisition unit 211, and acquires the target sample 221 of the predetermined data. In the present embodiment, the prediction apparatus 2 is connected to the sensor S via the external interface 27. Thus, the control unit 21 acquires the target sample 221 from the sensor S via the external interface 27.

However, the path for acquiring the target sample 221 is not limited to such an example, and may be determined as appropriate according to the embodiment. For example, the sensor S may also be connected to another computer different from the prediction apparatus 2. In this case, the control unit 21 may also acquire the target sample 221, by receiving transmission of the target sample 221 from the other computer. When the target sample 221 has been acquired, the control unit 21 advances the processing to the next step S302.

Step S302

In step S302, the control unit 21 operates as the prediction unit 212, and predicts, from the acquired target sample 221, the feature 223 that will appear in the predetermined data at a future time relative to the time at which the target sample 221 is acquired, using the trained prediction model 55 built by the model generation apparatus 1.

In the present embodiment, the control unit 21 configures the settings of the trained prediction model 55, with reference to the second learning result data 123. Also, the control unit 21 configures the settings of the decoder 53 of the trained estimator 51, with reference to the first learning result data 121. Next, the control unit 21 inputs the acquired target sample 221 to the prediction model 55, and executes computational processing of the prediction model 55. That is, the control unit 21 inputs the target sample 221 to the input layer 551 of the prediction model 55, and performs firing determination of each neuron included in each of the layers 551 to 553 in order from the input side. The control unit 21 thereby predicts feature information (feature amount) of predetermined data of a future time from the target sample 221.

Similarly, the control unit 21 inputs the output value of the prediction model 55 to the decoder 53, and executes computational processing of the decoder 53. That is, the control unit 21 inputs the output value of the prediction model 55 to the input layer 531 of the decoder 53, and performs firing determination of each neuron included in each of the layers 531 to 533 in order from the input side. The control unit 21 thereby restores the prediction sample 225 from the feature amount predicted by the prediction model 55, and acquires an output value corresponding to the result of predicting the feature 223 that will appear in the predetermined data at a future time from the output layer 533 of the decoder 53. In the present embodiment, obtaining this output value corresponds to predicting the prediction sample 225 and the feature 223. When prediction of the feature 223 of the future from the target sample 221 has been completed, the control unit 21 advances the processing to the next step S303.

Step S303

In step S303, the control unit 21 operates as the output unit 213, and outputs information relating to the prediction result (feature 223 and prediction sample 225).

The output destination and the contents of the information that is output may be determined as appropriate according to the embodiment. For example, the control unit 21 may also output the feature 223 and the prediction sample 225 of predetermined data of a future time that were predicted from the target sample 221 directly to the output device 25. For example, the control unit 21 may also execute information processing of some sort, based on the prediction result. The control unit 21 may then also output the result of executing that information processing as information relating to the prediction result. Output of the result of executing the information processing includes outputting a specific message such as a warning according to the prediction result and controlling operation of the control target device according to the prediction result. The output destination may be the output device 25, the control target device or the like, for example. When the output of information relating to the prediction result has been completed, the control unit 21 ends the series of processing relating to prediction processing that utilizes the trained prediction model 55.

Features

As described above, the model generation apparatus 1 according to the present embodiment trains more preponderantly on second learning datasets 32 having a higher rarity degree 325, in machine learning of the prediction model 55 in step S202. Second learning datasets 32 having a higher rarity degree 325 can thereby be prevented from getting buried among second learning datasets 32 having a lower rarity degree 325, and the results of training on second learning datasets 32 having a higher rarity degree 325 can be appropriately reflected in the predictive capability with which the prediction model 55 is provided. Accordingly, with the model generation apparatus 1 of the present embodiment, the prediction model 55 capable of accurately predicting rare events can be built. For example, a prediction model 55 can be built that is capable of predicting events having a high rarity such as events that bring about a rapid change in a comparatively short time to the same extent as events having a low rarity such as continuous events having regularity. Also, in the prediction apparatus 2, the accuracy of prediction of the feature 223 in step S302 can be enhanced by utilizing the prediction model 55 thus built.

Also, the model generation apparatus 1 according to the present embodiment sets the rarity degree 325 of each second learning dataset 32, utilizing the discordance predictor 57, in the processing of step S206. Since the processing for setting the rarity degree 325 can thereby be automated, the time and effort of the series of processing relating to machine learning of the prediction model 55 can be reduced. Furthermore, the model generation apparatus 1 according to the present embodiment repeatedly executes training of the prediction model 55 in step S202 and training of the discordance predictor 57 in step S205 alternately, depending on the conditional branch of step S203. In this process, the model generation apparatus 1 according to the present embodiment trains more preponderantly on second learning datasets 32 having a higher rarity degree 325 in machine learning of the prediction model 55, while, on the other hand, training on each third learning dataset 33 uniformly in machine learning of the discordance predictor 57. Improvement in the prediction accuracy of the prediction model 55 with respect to samples having a higher rarity can thereby be achieved, while appropriately setting the rarity degree 325 of each second learning dataset 32 utilizing the discordance predictor 57.

4. Variations

Although an embodiment of the present invention has been described in detail above, the aforementioned description is, in all respect, merely an illustrative example of the present invention. Needless to say, various improvements and modifications can be made without departing from the scope of the invention. For example, modifications such as the following are possible. Note that, hereinafter, similar reference signs will be used in relation to constituent elements that are similar to the above embodiment, and description of points that are similar to the above embodiment will be omitted as appropriate. The following variations are combinable as appropriate.

4.1

The prediction system 100 according to the above embodiment is applied to a scenario where a feature included in sensing data that is obtained by the sensor S is predicted. However, the application scope of the above embodiment is not necessarily limited to such an example. The prediction system 100 according to the above embodiment is applicable to all scenarios where events that can occur at a future time are predicted from samples of a given time in predetermined data that is obtained in time series. The following illustrates six variations in which the application scenario is limited.

Figure 9:
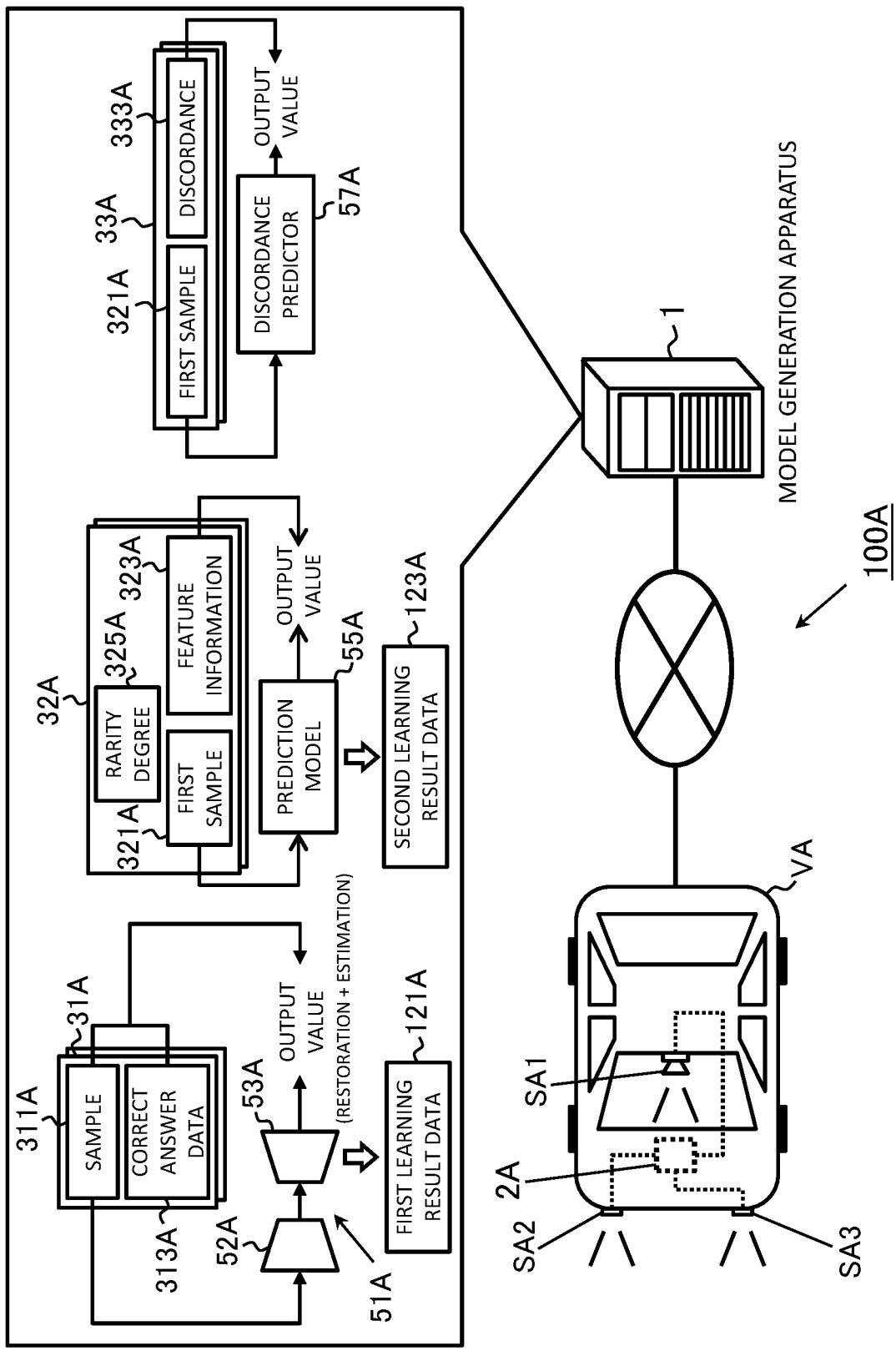
FIG. 9 schematically illustrates an example of another scenario in which the present invention is applied.

(A) Scenario where Situation of Surrounding Environment of Moving Body is Monitored FIG. 9 schematically illustrates an example of an application scenario of a prediction system 100A according to a first variation. This variation is an example in which the above embodiment is applied to a scenario where the situation of the surrounding environment of a moving body is monitored. A vehicle VA is an example of a moving body. Specifically, the vehicle VA is a car. The moving body is not, however, limited to the vehicle VA, and, for example, may be a flying body such as a drone, or the like. As shown in FIG. 9, a prediction system 100A according to this variation is provided with the model generation apparatus 1 and a monitoring apparatus 2A. Similarly to the above embodiment, the model generation apparatus 1 and the monitoring apparatus 2A may be connected to each other via a network.

The prediction system 100A according to this variation may be constituted similarly to the above embodiment, except for the data that is handled being different. The monitoring apparatus 2A corresponds to the above prediction apparatus 2. The monitoring apparatus 2A may be constituted similarly to the above prediction apparatus 2. The model generation apparatus 1 builds, by machine learning, a prediction model 55A trained to be capable of predicting, from sensing data of an arbitrary time that is obtained by a monitoring sensor for monitoring the situation of the surrounding environment of a moving body, a feature that will appear in the sensing data of a future time. On the other hand, the monitoring apparatus 2A predicts the situation of the surrounding environment of a future time from sensing data of an arbitrary time that is obtained by a monitoring sensor, utilizing the prediction model 55A. The predetermined data that is obtained in time series may be a sensing data that is obtained by the monitoring sensor, and the feature information 323 may relate to the situation of the surrounding environment that appears in the sensing data.

In this variation, the vehicle VA is provided with a camera SA1 and two LiDAR sensors (SA2, SA3), in order to monitor the environment around the vehicle VA. The camera SA1 and the two LiDAR sensors (SA2, SA3) are each an example of a monitoring sensor for monitoring the situation of the surrounding environment of a moving body. The camera SA1 is disposed to monitor the situation outside the vehicle VA, such as near a rearview mirror, for example. The camera SA1 may be a general camera, a depth camera, an infrared camera or the like, for example.

Also, the two LiDAR sensors (SA2, SA3) are disposed on both the left and right sides of the front part of the vehicle VA so as to be capable of acquiring information in front of the vehicle VA. In this variation, the first LiDAR sensor SA2 is disposed on the right side of the front part so as to be capable of acquiring information on the front right side of the vehicle VA, and the second LiDAR sensor SA3 is disposed on the left side of the front part so as to be capable of acquiring information on the front left side of the vehicle VA.

In this variation, the model generation apparatus 1 builds, by machine learning, the prediction model 55A trained to be capable of predicting, from image data of an arbitrary time, a feature relating to an attribute of an object that will appear in the image data of a future time. In other words, in this variation, the image data that is obtained by the camera SA1 is an example of "predetermined data that is obtained in time series" of the present invention, and is handled as the predetermined data to undergo processing for predicting events that can occur at a future time. The attribute of an object that appears in image data is an example of a situation of the surrounding environment.

On the other hand, the monitoring apparatus 2A is connected to the camera SA1 and the two LiDAR sensors (SA2, SA3). The monitoring apparatus 2A acquires image data by shooting images of the situation ahead of the vehicle VA with the camera SA1. The monitoring apparatus 2A then predicts a feature relating to an attribute of an object that will appear in the image data of a future time from image data of an arbitrary time obtained by the camera SA1, utilizing the trained prediction model 55A. Furthermore, the monitoring apparatus 2A monitors the situation in front of the vehicle VA with the sensing data respectively obtained by the two LiDAR sensors (SA2, SA3).

In the case of this variation, however, the predetermined data that is obtained in time series is not limited to image data that is obtained by the camera SA1. The sensing data obtained by at least one of the two LiDAR sensors (SA2, SA3) may also handled as the predetermined data. Also, in order to monitor the environment around the vehicle VA, the vehicle VA may also be provided with another monitoring sensor such as a millimeter wave radar, together with the camera SA1 and the two LiDAR sensors (SA2, SA3) or instead of at least one of the camera SA1 and the two LiDAR sensors (SA2, SA3). In this case, the sensing data that is obtained by the other monitoring sensor may also be handled as the predetermined data.

Hardware Configuration of Monitoring Apparatus

Figure 10:
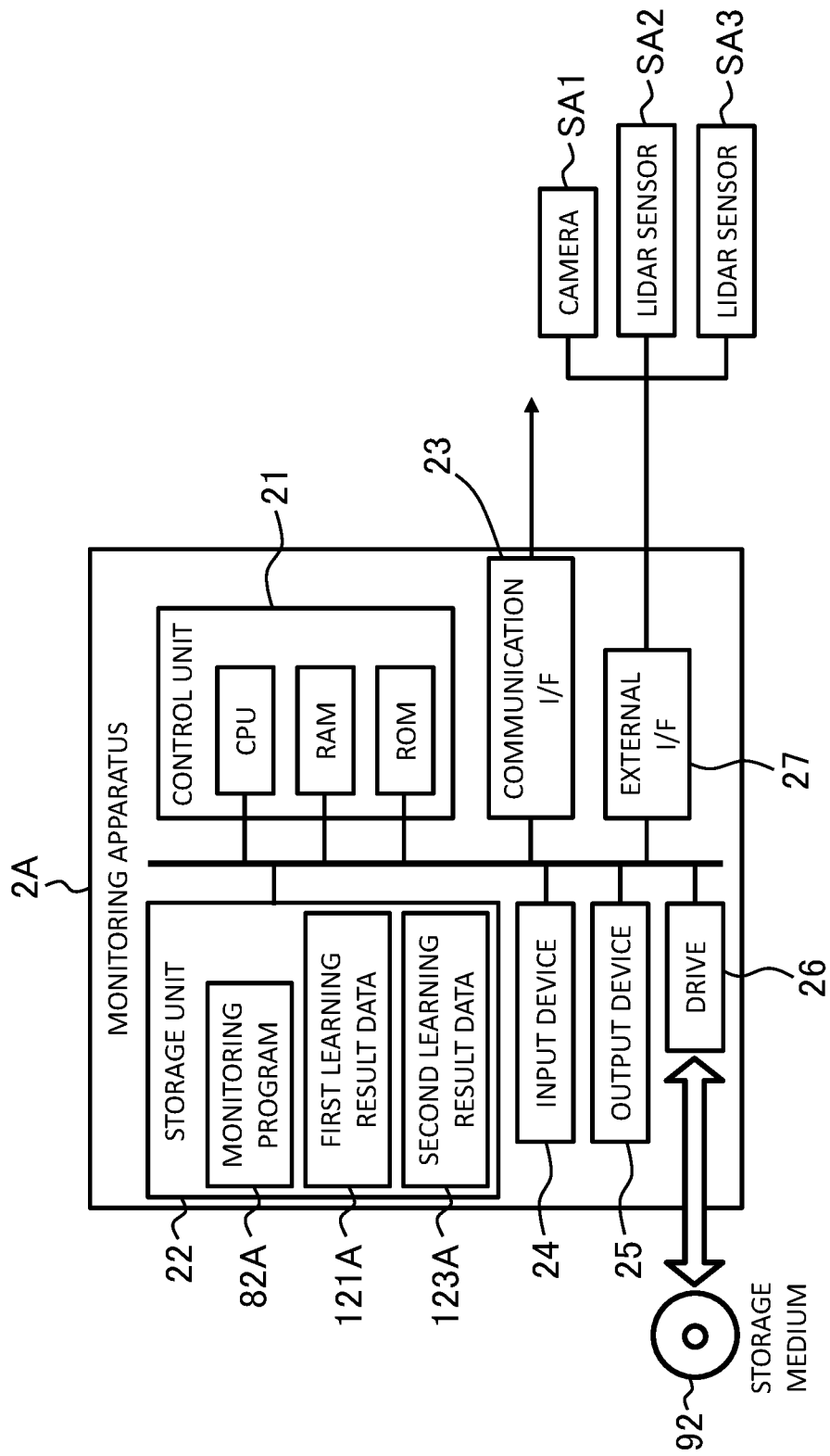
FIG. 10 schematically illustrates an example of the hardware configuration of a monitoring apparatus according to another mode.

Next, an example of the hardware configuration of the monitoring apparatus 2A according to this variation will be described, further using FIG. 10. FIG. 10 schematically illustrates an example of the hardware configuration of the monitoring apparatus 2A according to this variation. The monitoring apparatus 2A according to this variation is a computer in which a control unit 21, a storage unit 22, a communication interface 23, an input device 24, an output device 25, a drive 26 and an external interface 27 are electrically connected, similarly to the above prediction apparatus 2. The monitoring apparatus 2A is connected to the camera SA1 and the two LiDAR sensors (SA2, SA3) via the external interface 27. The hardware configuration of the monitoring apparatus 2A is not, however, limited to such an example. In relation to the specific hardware configuration of the monitoring apparatus 2A, omission, substitution and addition of constituent elements are possible as appropriate, according to the embodiment. The monitoring apparatus 2A may also be a general-purpose computer, a mobile phone including a smartphone, an in-vehicle device or the like, other than an information processing apparatus designed exclusively for the service that is provided.

The storage unit 22 of the monitoring apparatus 2A according to this variation stores various information such as a monitoring program 82A, first learning result data 121A and second learning result data 123A. The monitoring program 82A, the first learning result data 121A and the second learning result data 123A correspond to the prediction program 82, the first learning result data 121 and the second learning result data 123 according to the above embodiment. At least one of the monitoring program 82A, the first learning result data 121A and the second learning result data 123A may also be stored in the storage medium 92. The monitoring apparatus 2A may also acquire at least one of the monitoring program 82A, the first learning result data 121A and the second learning result data 123A from the storage medium 92.

Machine Learning of Estimator

Next, an example of processing procedures of machine learning of an estimator 51A in this variation will be described. As shown in FIG. 9, in this variation, the model generation apparatus 1 executes a series of processing relating to machine learning of the estimator 51A, similarly to the above embodiment, except for handling image data that is obtained by a camera disposed to monitor the situation outside a vehicle as predetermined data.

That is, in step S101, the control unit 11 of the model generation apparatus 1 acquires a plurality of first learning datasets 31A to be utilized in machine learning of the estimator 51A. In this variation, the estimator 51A is provided with an encoder 52A and a decoder 53A, similarly to the estimator 51 according to the above embodiment. The encoder 52A and the decoder 53A are respectively constituted by a neural network, similarly to the above embodiment, and respectively operate similarly to the above encoder 52 and decoder 53.

The first learning datasets 31A correspond to the first learning datasets 31 according to the above embodiment. In this variation, each first learning dataset 31A is constituted by a combination of a sample 311A of image data that is obtained in time series by a camera disposed to monitor the situation outside the vehicle and correct answer data 313A indicating a feature (correct answer) that appears in the sample 311A. The feature indicated by the correct answer data 313A may be an attribute of an object that appears in the sample 311A, for example. The object may be a route along which the moving body travels or a physical object that is present in the direction of travel of the moving body, for example. The route along which the moving body travels may be a road along which the vehicle VA can travel, for example. The physical object that is present in the direction of travel of the moving body may be a traffic signal or an obstacle (person, thing), for example. The attribute of the object may be the condition of the road surface of a route, the lighting state of a traffic signal, the presence or absence of an obstacle, the type of obstacle, the dimensions of an obstacle, the size of an obstacle or the speed of an obstacle, for example. Also, the attribute of the object may also include event information indicating an event such as a person or vehicle suddenly appearing, a vehicle suddenly driving off or stopping, or a vehicle changing lanes. This event information may also be represented by an attribute such as the presence or absence of an obstacle or the speed of an obstacle.

Similarly to the above embodiment, the method of acquiring each first learning dataset 31A may be selected as appropriate. Also, each first learning dataset 31A may be generated as appropriate. For example, image data is acquired in time series, by preparing a camera of the same type as the camera SA1, and shooting images of the situation outside the vehicle under various conditions with the prepared camera. Next, the sample 311A is extracted as appropriate from the image data obtained in time series. The correct answer data 313A indicating a feature that appears in the extracted sample 311A such as the attribute of an object that appears in the sample 311A, for example, is associated with the sample 311A. Each first learning dataset 31A can thereby be generated. When the plurality of first learning datasets 31A have been acquired, the control unit 11 advances the processing to the next step S102.

In step S102, the control unit 11 executes machine learning of the estimator 51A, using the plurality of first learning datasets 31A. In this variation, the control unit 11 trains the estimator 51A, by machine learning, to output an output value that matches the sample 311A and the correct answer data 313A from the decoder 53A when the sample 311A is input to the encoder 52A, for each first learning dataset 31A. The processing procedures of machine learning may be similar to the above embodiment. Through the process of this machine learning, the encoder 52A is trained to convert the sample 311A of image data into a feature amount. Also, the decoder 53A is trained to restore the sample 311A from the feature amount obtained by the encoder 52A, and to estimate a feature included in the sample 311A. As a result, the control unit 11 is able to build an estimator 51A trained to output an output value that matches the sample 311A and the correct answer data 313A in response to input of the sample 311A, for each first learning dataset 31A. When machine learning of the estimator 51A has been completed, the control unit 11 advances the processing to the next step S103.

In step S103, the control unit 11 generates information indicating the structure and computational parameters of the trained estimator 51A built by machine learning, as the first learning result data 121A. The control unit 11 then saves the generated first learning result data 121A to a predetermined storage area. The control unit 11 thereby ends the series of processing relating to machine learning of the estimator 51A. Note that, similarly to the above embodiment, the first learning result data 121A relating to the decoder 53A may be provided to the monitoring apparatus 2A at any suitable timing.

Machine Learning of Prediction Model

Next, an example of processing procedures of machine learning of the prediction model 55A and a discordance predictor 57A in this variation will be described. In this variation, the model generation apparatus 1 executes a series of processing relating to machine learning of the prediction model 55A and the discordance predictor 57A, similarly to the above embodiment, except for handling image data obtained by a camera disposed to monitor the situation outside a vehicle as predetermined data.

That is, in step S201, the control unit 11 acquires a plurality of second learning datasets 32A each constituted by a first sample 321A of a first time of image data that is obtained in time series and feature information 323A that is included in a second sample of a future time relative to the first time. The method of acquiring each second learning dataset 32A may be selected as appropriate, similarly to the above embodiment. Also, each second learning dataset 32A may be generated similarly to the above embodiment. The image data from which the first sample 321A and the second sample are extracted may be the same as the image data utilized in generation of each first learning dataset 31A. In this variation, the feature information 323A may also relate to an attribute of an object that appears in the image data. Also, the feature information 323A may be configured to include a feature amount of the second sample. The feature amount constituting the feature information 323A may also be provided by converting the second sample with the trained encoder 52A. A rarity degree 325A may be set as appropriate for each second learning dataset 32A. When the plurality of second learning datasets 32A have been acquired, the control unit 11 advances the processing to the next step S202.

In step S202, the control unit 11 executes machine learning of the prediction model 55A, using the plurality of second learning datasets 32A. The prediction model 55A may be constituted by a neural network, similarly to the prediction model 55 according to the above embodiment. The control unit 11 trains the prediction model 55A, by machine learning, to output an output value that matches the corresponding feature information 323A when the first sample 321A is input, for each second learning dataset 32A. In machine learning of this prediction model 55A, the control unit 11 trains more preponderantly on second learning datasets 32A having a higher rarity degree 325A. The method of training preponderantly may be similar to the above embodiment. The control unit 11 is thereby able to build the prediction model 55A trained to output an output value that matches the feature information 323A of the second time when the first sample 321A of the first time is input, for each second learning dataset 32A. When machine learning of the prediction model 55A has been completed, the control unit 11 advances the processing to the next step S203.

In step S203, the control unit 11 determines whether to repeat the processing of machine learning of the prediction model 55A and the discordance predictor 57A. The criterion for repeating machine learning may be similar to the above embodiment. If it is determined to repeat the processing of machine learning, the control unit 11 advances the processing to the next step S204. On the other hand, if it is determined to end the processing of machine learning, the control unit 11 advances the processing to the next step S207.

In step S204, the control unit 11 acquires a plurality of third learning datasets 33A each constituted by a combination of the first sample 321A of the first time of the corresponding second learning dataset 32A and a discordance 333A of prediction by the prediction model 55A with respect to the first sample 321A. The method of acquiring each third learning dataset 33A may be similar to the above embodiment. The trained prediction model 55A built in step S202 and the second learning datasets 32A may be utilized in generation of the respective third learning datasets 33A. When the plurality of third learning datasets 33A have been acquired, the control unit 11 advances the processing to the next step S205.

In step S205, the control unit 11 executes machine learning of the discordance predictor 57A, using the plurality of third learning datasets 33A. The control unit 11 trains the discordance predictor 57A, by machine learning, to output an output value that matches the corresponding discordance 333A when the first sample 321A is input, for each third learning dataset 33A. Unlike machine learning of the prediction model 55A, the control unit 11 trains uniformly on each third learning dataset 33A, independently of the rarity degree 325A, in this machine learning of the discordance predictor 57A. The method of training uniformly may be similar to the above embodiment. The control unit 11 is thereby able to build the discordance predictor 57A trained to output an output value that matches the discordance 333A of prediction by the prediction model 55A with respect to the first sample 321A of the first time when this first sample 321A is input, for each third learning dataset 33A. When machine learning of the discordance predictor 57A has been completed, the control unit 11 advances the processing to the next step S206.

In step S206, the control unit 11 sets (updates) the rarity degree 325A of each second learning dataset 32A, utilizing the trained discordance predictor 57A built in step S205. The method of setting the rarity degree 325A may be similar to the above embodiment. When setting of the rarity degree 325A has been completed, the control unit 11 returns the processing to step S202.

In step S207, the control unit 11 generates information indicating the structure and computational parameters of the trained prediction model 55A built by machine learning, as the second learning result data 123A. The control unit 11 then saves the generated second learning result data 123A to a predetermined storage area. The control unit 11 thereby ends the series of processing relating to machine learning of the prediction model 55A and the discordance predictor 57A. Note that, similarly to the above embodiment, the second learning result data 123A may be provided to the monitoring apparatus 2A at any suitable timing.

Monitoring Processing

Figure 11:
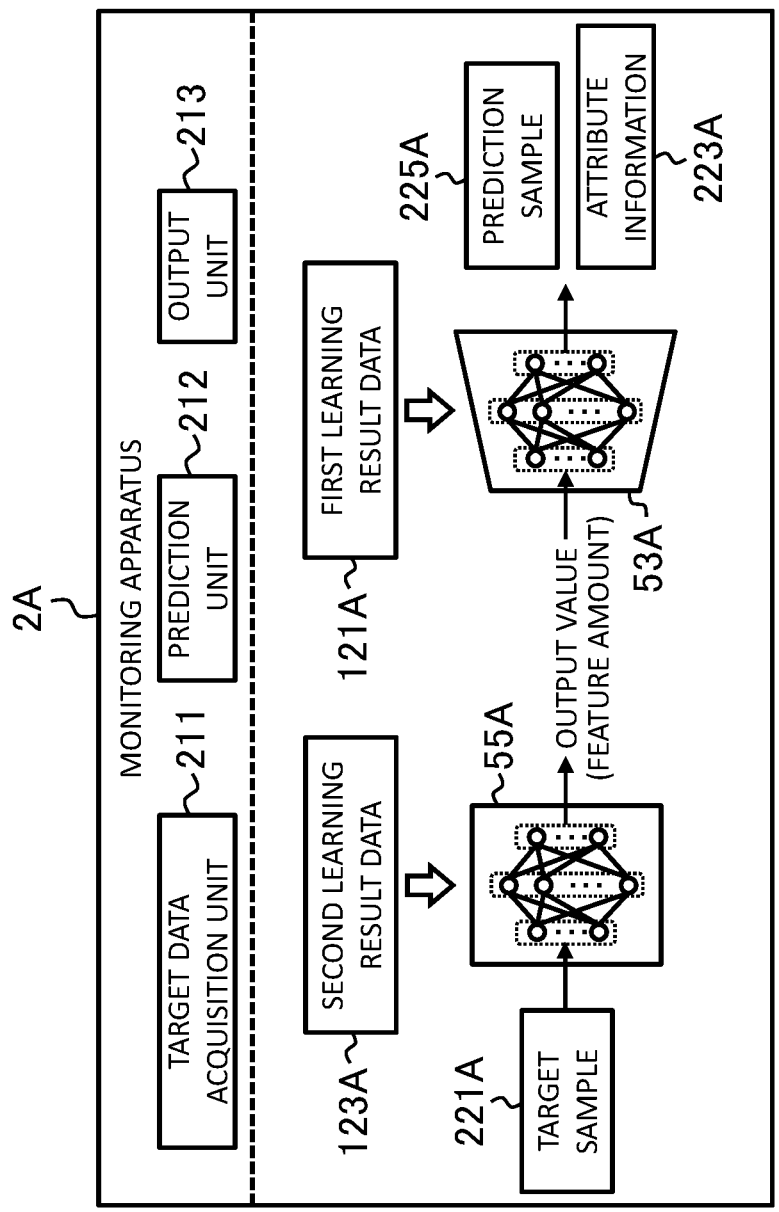
FIG. 11 schematically illustrates an example of the software configuration of the monitoring apparatus according to the other mode.

Next, an example of monitoring processing of the monitoring apparatus 2A will be described, using FIG. 11. FIG. 11 schematically illustrates an example of the software configuration relating to the monitoring processing of the monitoring apparatus 2A according to this variation. Similarly to the above embodiment, the software configuration relating to the monitoring processing of the monitoring apparatus 2A is realized by execution of the monitoring program 82A by the control unit 21. As shown in FIG. 11, the software configuration relating to the monitoring processing of the monitoring apparatus 2A is similar to the software configuration of the above prediction apparatus 2, except for handling image data that is obtained by a camera disposed to monitor the situation outside a vehicle as predetermined data. The monitoring apparatus 2A thereby executes the series of processing relating to the monitoring processing, similarly to the above prediction apparatus 2.

That is, in step S301, the control unit 21 of the monitoring apparatus 2A acquires a target sample 221A of image data from the camera SA1. In step S302, the control unit 21 configures the settings of the trained prediction model 55A, with reference to the second learning result data 123A. Also, the control unit 21 configures the settings of the decoder 53A of the trained estimator 51A, with reference to the first learning result data 121A. Next, the control unit 21 inputs the acquired target sample 221A to the prediction model 55A, and executes computational processing of the prediction model 55A. As a result of this computational processing, the control unit 21 predicts feature information (feature amount) of image data of a future time from the target sample 221A. Furthermore, the control unit 21 inputs the output value of the prediction model 55A to the decoder 53A, and executes computational processing of the decoder 53A. The control unit 21 thereby restores a prediction sample 225A from the feature amount predicted by the prediction model 55A, and acquires an output value corresponding to the result of predicting a feature that will appear in the image data at a future time from the decoder 53A. In this variation, the feature that is predicted can include attribute information 223A indicating an attribute of an object that appears in image data. When prediction of a future feature from the target sample 221A has been completed, the control unit 21 advances the processing to the next step S303.

In step S303, the control unit 21 outputs information relating to the prediction result (attribute information 223A and prediction sample 225A). The output destination and the contents of the information that is output may be determined as appropriate according to the embodiment. For example, the control unit 21 may also output the attribute information 223A and prediction sample 225A that were obtained directly to the output device 25. For example, the control unit 21 may also execute information processing of some sort, based on the prediction result. The control unit 21 may then also output the result of executing that information processing as information relating to the prediction result.

As an example of the information processing, the control unit 21 may also determine whether a danger will arise to the travel of the vehicle VA, based on the prediction result. As a specific example, in the case where it is predicted using the attribute information 223A that an obstacle will enter the travel path of the vehicle VA, the control unit 21 may also determine that a danger has arisen to the travel of the vehicle VA. In the case where it is determined that a danger has arisen to the travel of the vehicle VA, the control unit 21 may then also output a warning that informs about the danger to the output device 25. Note that the case where an obstacle enters the travel path of the vehicle VA may be a case where an event such as a person or vehicle suddenly appearing, a vehicle suddenly driving off or stopping, or a vehicle change lanes, for example, occurs.

In the case where the monitoring apparatus 2A is configured to be capable of controlling the operations of a moving body, for example, the control unit 21 may also determine a policy for operating the moving body, according to the prediction result, and control operations of the moving body in accordance with the determined operation policy. In this variation, the control unit 21 may also control use of an accelerator, use of brakes, the steering angle of a steering wheel, on/off of lights, use of a horn and the like as examples of operations of the vehicle VA. As a specific example, in the case where it is predicted using the attribute information 223A that an obstacle will enter the travel path of the vehicle VA, the control unit 21 may also control the operations of the vehicle VA to sound the horn and put on the brakes.

For example, the control unit 21 may also determine a control policy of each monitoring sensor, according to the prediction result, and control operation of each monitoring sensor in accordance with the determined control policy. As a specific example, the control unit 21 may also set a priority for the scanning range of each monitoring sensor, according to the prediction result, and execute the scanning of each monitoring sensor according to the set priority. In this variation, the vehicle VA is provided with the two LiDAR sensors (SA2, SA3), other than the camera SA1. Thus, the control unit 21 may also set the priority for the scanning range of each LiDAR sensor (SA2, SA3), according to the prediction result, and execute the scanning of each LiDAR sensor (SA2, SA3), according to the set priority. A priority may also be set according to the presence or absence of an obstacle, for example. As an example, in the case where it is predicted using the attribute information 223A that an obstacle will enter from the front right side of the vehicle VA, the control unit 21 may set the priority of the right side area of the measurement area of the first LiDAR sensor SA2 to a high value, and control the operations of the first LiDAR sensor SA2 to preferentially scan this right side area.

Also, as a specific example, the control unit 21 may pass the data between a plurality of monitoring sensors, according to the prediction result. As an example, in the case where it is predicted using the attribute information 223A that an obstacle will move from the front right side of the vehicle VA to the front left side, the control unit 21 may also predict that the obstacle observed by the first LiDAR sensor SA2 will come to be observed by the second LiDAR sensor SA3. The control unit 21 may thereby also cause the second LiDAR sensor SA3 to take over observation of the obstacle from the first LiDAR sensor SA2.

According to this variation, a prediction model 55A can be built that, in a scenario where the surrounding environment of a moving body is monitored, is capable of being utilized in the monitoring and is capable of accurately predicting rare events. Through machine learning that utilizes the above rarity degree 325A, for example, the prediction model 55A is built to be capable of predicting events that can occur irregularly such as an obstacle entering the shooting range of the camera SA1 from the outside the shooting range or a stationary object suddenly beginning to move, with an accuracy comparable to events that can have regularity such as a person moving in a given direction within the shooting range of the camera SA1. Thus, the monitoring apparatus 2A is able to accurately predict events such as the above that can occur irregularly, by utilizing this prediction model 55A.

The accuracy with which accidents such as a moving body colliding with an obstacle, for example, are prevented before they occur can thereby be enhanced. Also, in the monitoring apparatus 2A, the surrounding environment of a moving body can be appropriately monitored, by determining the control policy of each monitoring sensor, according to the prediction result, and controlling the operations of each monitoring sensor in accordance with the determined control policy. In the above example, obstacles can be quickly detected with the LiDAR sensors (SA2, SA3), by setting the priority of scanning according to the prediction result. The effects thereof are more beneficial as the temporal resolution of the monitoring sensors decreases.

Note that the vehicle VA is not limited to a car, and may be a vehicle other than a car, such as a train, for example. In the case where the vehicle VA is a train, event information indicating an event such as a physical object that will interfere with travel or a person falling from the station platform may also be included as a feature indicated by the correct answer data 313A, other than the above events. This event information may also be represented by the attributes of objects. In the above step S302, the monitoring apparatus 2A is thereby able to predict a physical object that will interfere with travel or a person falling from the station platform. In step S303, the monitoring apparatus 2A may control the operations of the train (vehicle VA) to stop traveling, in order to avoid colliding with the physical object that will interfere with travel or the person, according to the result of this prediction.

(B) Scenario where State of Machine is Monitored

Figure 12:
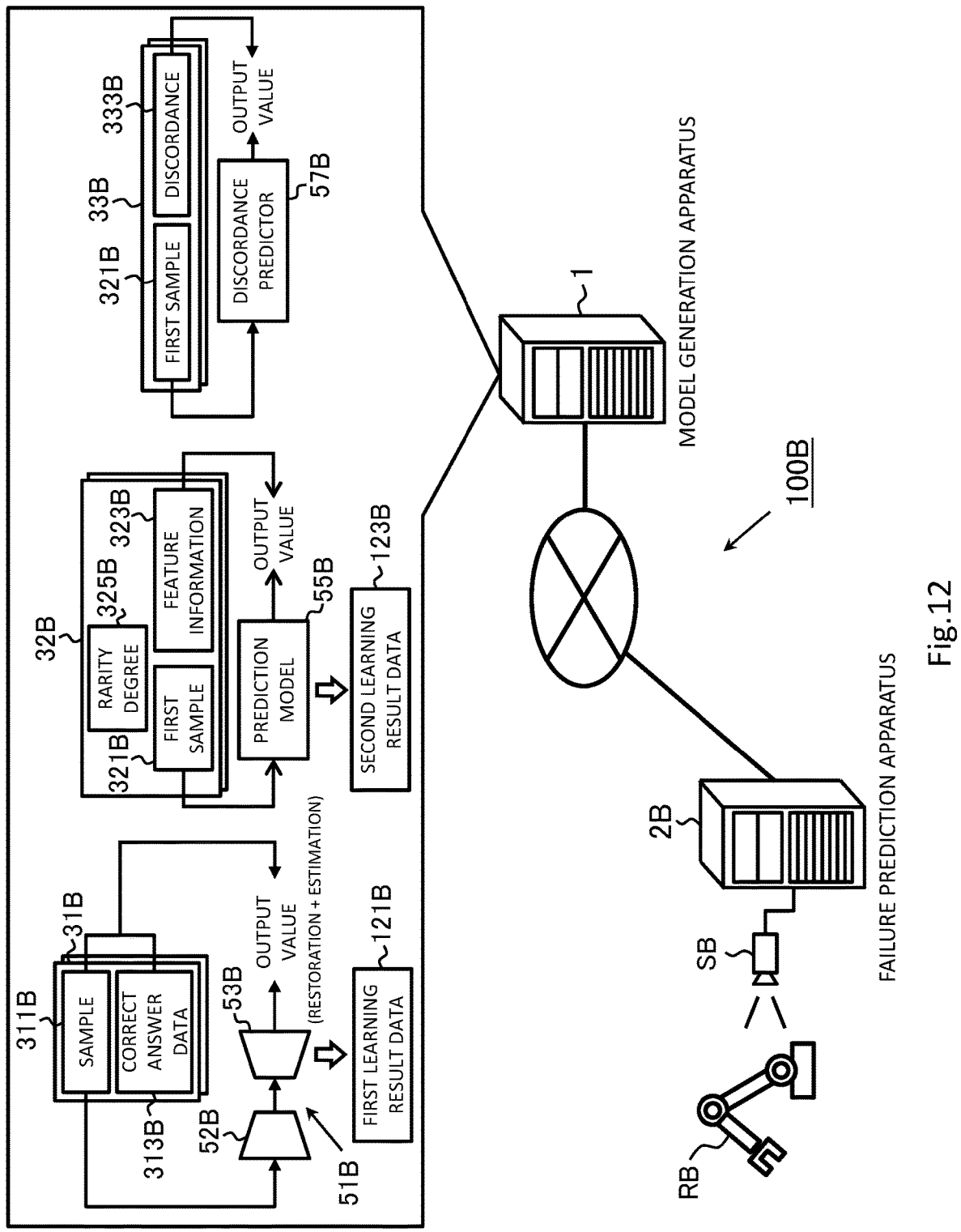
FIG. 12 schematically illustrates an example of another scenario in which the present invention is applied.

FIG. 12 schematically illustrates an example of an application scenario of a prediction system 100B according to a second variation. This variation is an example in which the above embodiment is applied to a scenario where the state of a machine RB constituting a production line is monitored. The type of machine RB is not particularly limited, and may be selected as appropriate according to the embodiment. The machine RB may be a molding machine, a packaging machine, a robotic device, a printer, a mounter, or a substrate inspection device, for example. As shown in FIG. 12, the prediction system 100B according to this variation is provided with the model generation apparatus 1 and a failure prediction apparatus 2B. Similarly to the above embodiment, the model generation apparatus 1 and the failure prediction apparatus 2B may be connected to each other via a network.

The prediction system 100B according to this variation may be constituted similarly to the above embodiment, except for the data that is handled being different. The failure prediction apparatus 2B corresponds to the above prediction apparatus 2. The failure prediction apparatus 2B may be constituted similarly to the above prediction apparatus 2. The model generation apparatus 1 builds, by machine learning, a prediction model 55B trained to be capable of predicting, from sensing data of an arbitrary time that is obtained by a sensor that monitors the state of the machine RB, a feature that will appear in the sensing data of a future time. On the other hand, the failure prediction apparatus 2B predicts the state of the machine RB of a future time from sensing data of an arbitrary time that is obtained by the sensor, utilizing the prediction model 55B. The predetermined data that is obtained in time series may be sensing data obtained by the sensor, and the feature information 323 may relate to the state of the machine RB that is specified from the sensing data.

In this variation, a camera SB is used, in order to monitor the state of the machine RB. The camera SB is an example of a sensor for monitoring the state of the machine RB. The camera SB is disposed near the machine RB, for example, to be capable of shooting images of the machine RB. The camera SB may be a general camera, a depth camera, or an infrared camera, for example.

In this variation, the model generation apparatus 1 builds, by machine learning, the prediction model 55B trained to be capable of predicting, from image data of an arbitrary time, a feature relating to the state of the machine RB that will appear in the image data of a future time. In other words, in this variation, the image data that is obtained by the camera SB is an example of "predetermined data that is obtained in time series" of the present invention, and is handled as the predetermined data to undergo processing for predicting events that can occur at a future time.

On the other hand, the failure prediction apparatus 2B is connected to the camera SB. The failure prediction apparatus 2B acquires image data by shooting images of the machine RB with the camera SB. The failure prediction apparatus 2B then predicts a feature relating to the state of the machine RB that will appear in the image data of a future time from image data of an arbitrary time obtained by the camera SB, utilizing the trained prediction model 55B.

In the case of this variation, however, the predetermined data that is obtained in time series is not limited to image data that is obtained by the camera SB. In order to monitor the state of the machine RB, another sensor such as a microphone or a rotary encoder may also be used, together with the camera SB or instead of the camera SB. In this case, sensing data (e.g., sound data, torque data, etc.) that is obtained by the other sensor may also be handled as the predetermined data.

Hardware Configuration of Failure Prediction Apparatus

Figure 13:
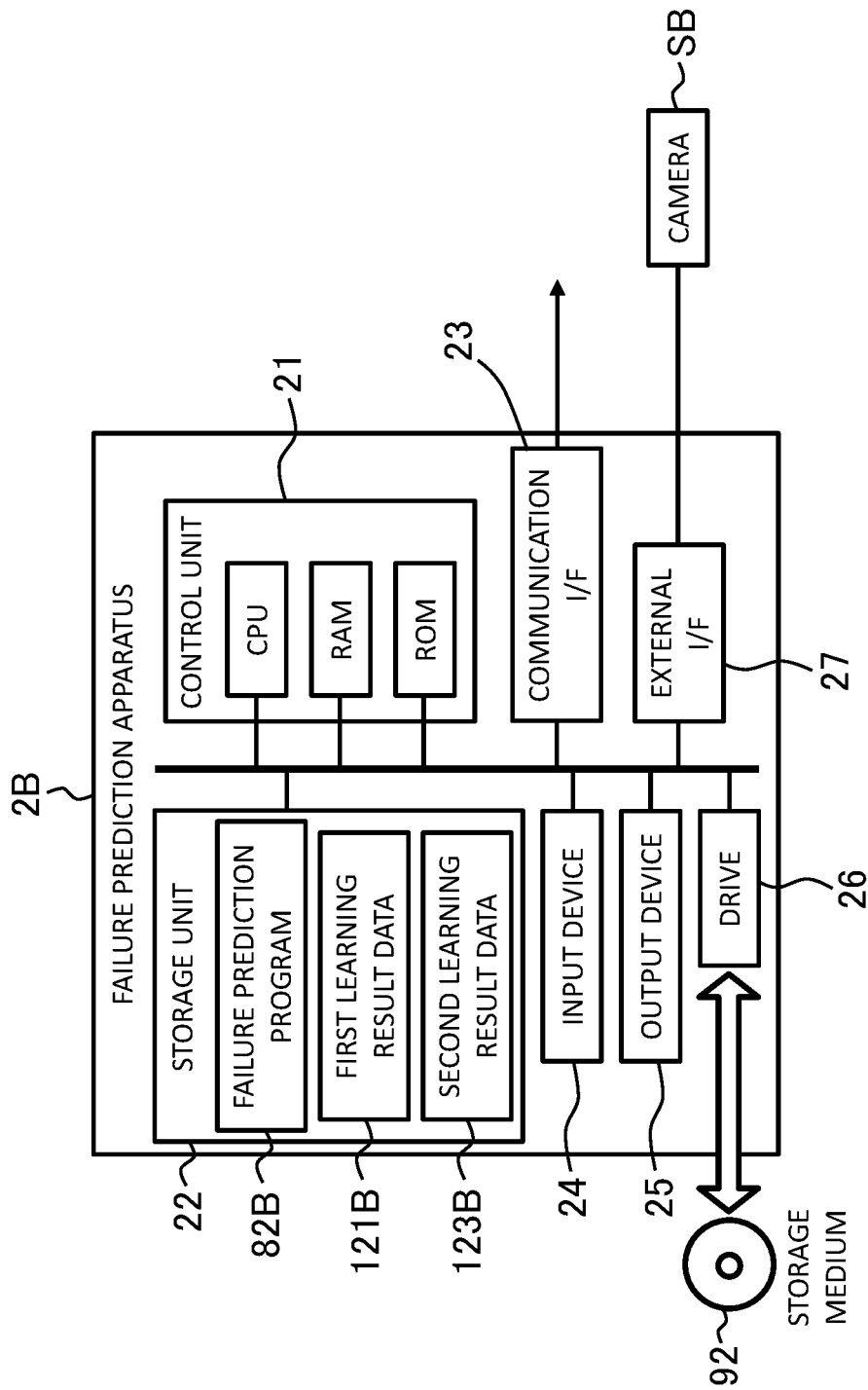
FIG. 13 schematically illustrates an example of the hardware configuration of a failure prediction apparatus according to another mode.

Next, an example of the hardware configuration of the failure prediction apparatus 2B according to this variation will be described, further using FIG. 13. FIG. 13 schematically illustrates an example of the hardware configuration of the failure prediction apparatus 2B according to this variation. The failure prediction apparatus 2B according to this variation is a computer in which a control unit 21, a storage unit 22, a communication interface 23, an input device 24, an output device 25, a drive 26 and an external interface 27 are electrically connected, similarly to the above prediction apparatus 2. The failure prediction apparatus 2B is connected to the camera SB via the external interface 27. The hardware configuration of the failure prediction apparatus 2B is not, however, limited to such an example. In relation to the specific hardware configuration of the failure prediction apparatus 2B, omission, substitution and addition of constituent elements are possible as appropriate, according to the embodiment. The failure prediction apparatus 2B may also be a general-purpose computer, a PLC (programmable logic controller) or the like, other than an information processing apparatus designed exclusively for the service that is provided.

The storage unit 22 of the failure prediction apparatus 2B according to this variation stores various information such as a failure prediction program 82B, first learning result data 121B and second learning result data 123B. The failure prediction program 82B, the first learning result data 121B and the second learning result data 123B correspond to the prediction program 82, the first learning result data 121 and the second learning result data 123 according to the above embodiment. At least one of the failure prediction program 82B, the first learning result data 121B and the second learning result data 123B may also be stored in the storage medium 92. The failure prediction apparatus 2B may also acquire at least one of the failure prediction program 82B, the first learning result data 121B and the second learning result data 123B from the storage medium 92.

Machine Learning of Estimator

Next, an example of processing procedures of machine learning of an estimator 51B in this variation will be described. As shown in FIG. 12, in this variation, the model generation apparatus 1 executes a series of processing relating to machine learning of the estimator 51B, similarly to the above embodiment, except for handling sensing data obtained by a sensor for monitoring the state of a machine (specifically, image data obtained by a camera disposed to monitor the state of a machine) as predetermined data.

That is, in step S101, the control unit 11 of the model generation apparatus 1 acquires a plurality of first learning datasets 31B to be used in machine learning of the estimator 51B. In this variation, the estimator 51B is provided with an encoder 52B and a decoder 53B, similarly to the estimator 51 according to the above embodiment. The encoder 52B and the decoder 53B are each constituted by a neural network, similarly to the above embodiment, and respectively operate similarly to the above encoder 52 and decoder 53.

The first learning datasets 31B correspond to the first learning datasets 31 according to the above embodiment. In this variation, each first learning dataset 31B is constituted by a combination of a sample 311B of image data that is obtained in time series by a camera disposed to monitor the state of the machine and correct answer data 313B indicating a feature (correct answer) that appears in the sample 311B. The feature indicated by the correct answer data 313B may be the state of the machine that appears in the sample 311B, for example. The state of the machine may be indicated by whether or not there is a failure or the type of failure, for example.

Similarly to the above embodiment, the method of acquiring each first learning dataset 31B may be selected as appropriate. Also, each first learning dataset 31B may be generated as appropriate. For example, image data is acquired in time series, by preparing a camera of the same type as the camera SB and a machine of the same type as the machine RB, and shooting images of the prepared machine under various conditions with the camera. Next, the sample 311B is extracted as appropriate from the image data obtained in time series. The correct answer data 313B indicating a feature that appears in the extracted sample 311B such as the state of the machine that appears in the sample 311B is associated with the sample 311B. Each first learning dataset 31B can thereby be generated. When the plurality of first learning datasets 31B have been acquired, the control unit 11 advances the processing to the next step S102.

In step S102, the control unit 11 executes machine learning of the estimator 51B, using the plurality of first learning datasets 31B. In this variation, the control unit 11 trains the estimator 51B, by machine learning, to output an output value that matches the sample 311B and the correct answer data 313B from the decoder 53B when the sample 311B is input to the encoder 52B, for each first learning dataset 31B. The processing procedures of machine learning may be similar to the above embodiment. Through the process of this machine learning, the encoder 52B is trained to convert the sample 311B of image data into a feature amount. Also, the decoder 53B is trained to restore the sample 311B from the feature amount obtained by the encoder 52B, and to estimate a feature included in the sample 311B. As a result, the control unit 11 is able to build an estimator 51B trained to output an output value that matches the sample 311B and the correct answer data 313B in response to input of the sample 311B, for each first learning dataset 31B. When machine learning of the estimator 51B has been completed, the control unit 11 advances the processing to the next step S103.

In step S103, the control unit 11 generates information indicating the structure and computational parameters of the trained estimator 51B built by machine learning, as the first learning result data 121B. The control unit 11 then saves the generated first learning result data 121B to a predetermined storage area. The control unit 11 thereby ends the series of processing relating to machine learning of the estimator 51B. Note that, similarly to the above embodiment, the first learning result data 121B relating to the decoder 53B may be provided to the failure prediction apparatus 2B at any suitable timing.

Machine Learning of Prediction Model

Next, an example of processing procedures of machine learning of the prediction model 55B and a discordance predictor 57B in this variation will be described. In this variation, the model generation apparatus 1 executes a series of processing relating to machine learning of the prediction model 55B and the discordance predictor 57B, similarly to the above embodiment, except for handling sensing data that is obtained by a sensor for monitoring the state of a machine (specifically, image data obtained by a camera disposed to monitor the state of a machine) as predetermined data.

That is, in step S201, the control unit 11 acquires a plurality of second learning datasets 32B each constituted by a combination of a first sample 321B of a first time of image data that is obtained in time series and feature information 323B that is included in a second sample of a future time relative to the first time. The method of acquiring each second learning dataset 32B may be selected as appropriate, similarly to the above embodiment. Also, each second learning dataset 32B may be generated similarly to the above embodiment. The image data from which the first sample 321B and the second sample are extracted may be the same as the image data utilized in generation of each first learning dataset 31B. In this variation, the feature information 323B may also relate to the state of the machine that appears in image data. Also, the feature information 323B may be configured to include a feature amount of the second sample. The feature amount constituting the feature information 323B may also be provided by converting the second sample with the trained encoder 52B. A rarity degree 325B may be set as appropriate for each second learning dataset 32B. When the plurality of second learning datasets 32B have been acquired, the control unit 11 advances the processing to the next step S202.

In step S202, the control unit 11 executes machine learning of the prediction model 55B, using the plurality of second learning datasets 32B. The prediction model 55B may be constituted by a neural network, similarly to the prediction model 55 according to the above embodiment. The control unit 11 trains the prediction model 55B, by machine learning, to output an output value that matches the corresponding feature information 323B when the first sample 321B is input, for each second learning dataset 32B. In machine learning of this prediction model 55B, the control unit 11 trains more preponderantly on second learning datasets 32B having a higher rarity degree 325B. The method of training preponderantly may be similar to the above embodiment. The control unit 11 is thereby able to build the prediction model 55B trained to output an output value that matches the feature information 323B of the second time when the first sample 321B of the first time is input, for each second learning dataset 32B. When machine learning of the prediction model 55B has been completed, the control unit 11 advances the processing to the next step S203.

In step S203, the control unit 11 determines whether to repeat the processing of machine learning of the prediction model 55B and the discordance predictor 57B. The criterion for repeating machine learning may be similar to the above embodiment. If it is determined to repeat the processing of machine learning, the control unit 11 advances the processing to the next step S204. On the other hand, if it is determined to end the processing of machine learning, the control unit 11 advances the processing to the next step S207.

In step S204, the control unit 11 acquires a plurality of third learning datasets 33B each constituted by a combination of the first sample 321B of the first time of the corresponding second learning dataset 32B and a discordance 333B of prediction by the prediction model 55B with respect to the first sample 321B. The method of acquiring each third learning dataset 33B may be similar to the above embodiment. The trained prediction model 55B built in step S202 and the second learning datasets 32B may be utilized in generation of the respective third learning datasets 33B. When the plurality of third learning datasets 33B have been acquired, the control unit 11 advances the processing to the next step S205.

In step S205, the control unit 11 executes machine learning of the discordance predictor 57B, using the plurality of third learning datasets 33B. The control unit 11 trains the discordance predictor 57B, by machine learning, to output an output value that matches the corresponding discordance 333B when the first sample 321B is input, for each third learning dataset 33B. Unlike machine learning of the prediction model 55B, the control unit 11 trains uniformly on each third learning dataset 33B, independently of the rarity degree 325B, in this machine learning of the discordance predictor 57B. The method of training uniformly may be similar to the above embodiment. The control unit 11 is thereby able to build the discordance predictor 57B trained to output an output value that matches the discordance 333B of prediction by the prediction model 55B with respect to the first sample 321B when the first sample 321B of the first time is input, for each third learning dataset 33B. When machine learning of the discordance predictor 57B has been completed, the control unit 11 advances the processing to the next step S206.

In step S206, the control unit 11 sets (updates) the rarity degree 325B of each second learning dataset 32B, utilizing the trained discordance predictor 57B built in step S205. The method of setting the rarity degree 325B may be similar to the above embodiment. When setting of the rarity degree 325B has been completed, the control unit 11 returns the processing to step S202.

In step S207, the control unit 11 generates information indicating the structure and computational parameters of the trained prediction model 55B built by machine learning, as the second learning result data 123B. The control unit 11 then saves the generated second learning result data 123B to a predetermined storage area. The control unit 11 thereby ends the series of processing relating to machine learning of the prediction model 55B and the discordance predictor 57B. Note that, similarly to the above embodiment, the second learning result data 123B may be provided to the failure prediction apparatus 2B at any suitable timing.

Prediction Processing

Figure 14:
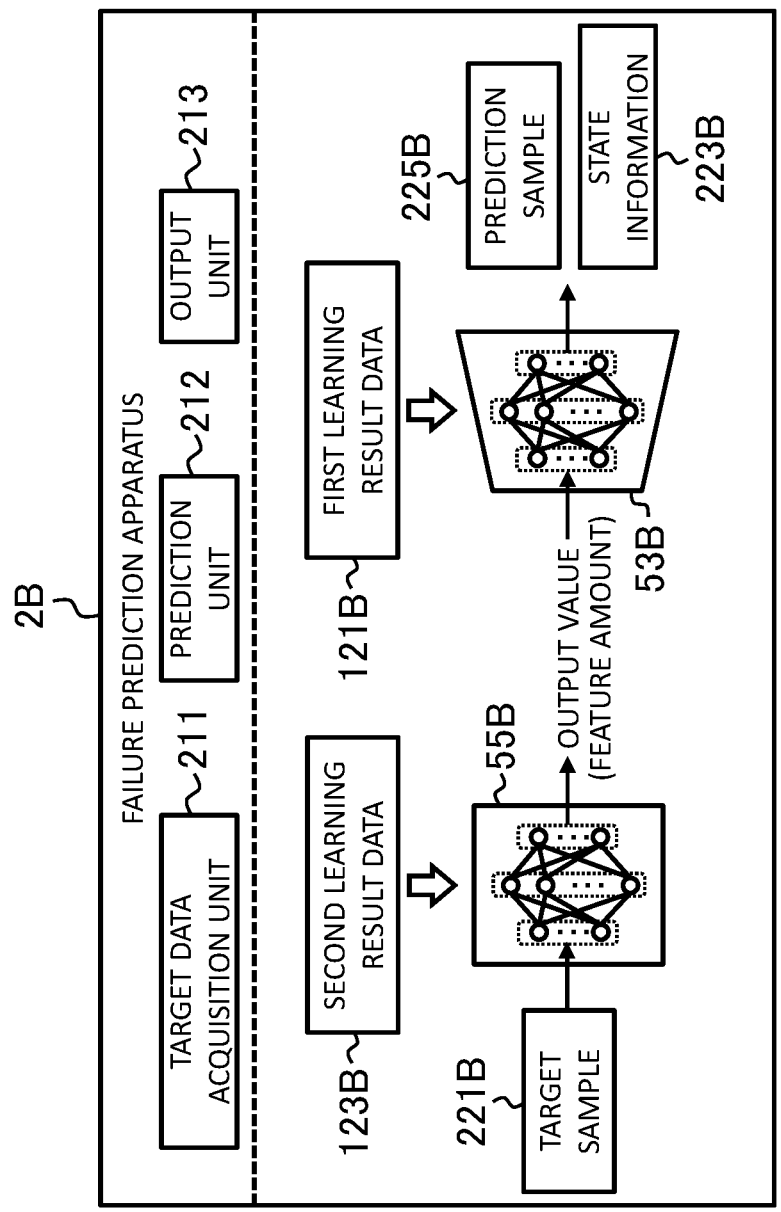
FIG. 14 schematically illustrates an example of the software configuration of the failure prediction apparatus according to the other mode.

Next, an example of prediction processing of the failure prediction apparatus 2B will be described, using FIG. 14. FIG. 14 schematically illustrates an example of the software configuration relating to the prediction processing of the failure prediction apparatus 2B according to this variation. Similarly to the above embodiment, the software configuration relating to the prediction processing of the failure prediction apparatus 2B is realized by execution of the failure prediction program 82B by the control unit 21. As shown in FIG. 14, the software configuration relating to the prediction processing of the failure prediction apparatus 2B is similar to the software configuration of the above prediction apparatus 2, except for handling sensing data that is obtained by a sensor for monitoring the state of a machine (specifically, image data obtained by a camera disposed to monitor the state of a machine) as predetermined data. The failure prediction apparatus 2B thereby executes the series of processing relating to the prediction processing, similarly to the above prediction apparatus 2.

That is, in step S301, the control unit 21 of the failure prediction apparatus 2B acquires a target sample 221B of image data from the camera SB. In step S302, the control unit 21 configures the settings of the trained prediction model 55B, with reference to the second learning result data 123B. Also, the control unit 21 configures the settings of the decoder 53B of the trained estimator 51B, with reference to the first learning result data 121B. Next, the control unit 21 inputs the acquired target sample 221B to the prediction model 55B, and executes computational processing of the prediction model 55B. As a result of this computational processing, the control unit 21 predicts feature information (feature amount) of image data of a future time from the target sample 221B. Furthermore, the control unit 21 inputs the output value of the prediction model 55B to the decoder 53B, and executes computational processing of the decoder 53B. The control unit 21 thereby restores a prediction sample 225B from the feature amount predicted by the prediction model 55B, and acquires an output value corresponding to the result of predicting a feature that will appear in the image data at a future time from the decoder 53B. In this variation, the feature that is predicted can include state information 223B indicating the state of the machine RB that appears in image data. When prediction of a future feature from the target sample 221B has been completed, the control unit 21 advances the processing to the next step S303.

In step S303, the control unit 21 outputs information relating to the prediction result (state information 223B and prediction sample 225B). The output destination and the contents of the information that is output may be determined as appropriate according to the embodiment. For example, the control unit 21 may also output the state information 223B and prediction sample 225B that were obtained directly to the output device 25. For example, the control unit 21 may also execute information processing of some sort, based on the prediction result. The control unit 21 may then also output the result of executing that information processing as information relating to the prediction result.

As an example of the information processing, the control unit 21 may also determine whether a failure will occur in the machine RB, based on the prediction result (state information 223B). In the case where it is determined that a failure will occur in the machine RB, the control unit 21 may then also output a warning for informing the occurrence of the failure to the output device 25. Furthermore, in the case where the failure prediction apparatus 2B is configured to be capable of controlling the operations of the machine RB, the control unit 21 may also cause the machine RB to stop operations, in response to having determined that a failure will occur in the machine RB. In addition, the control unit 21 may also output the type of failure that will occur in the machine RB, and information on the maintenance method corresponding to the failure to the output device 25. The information indicating the maintenance method corresponding to the failure may also be saved in a predetermined storage area such as the storage unit 22, the storage medium 92, an external storage device, storage media, or the like. The control unit 21 may also acquire the information indicating the maintenance method corresponding to the failure from the predetermined storage area.

According to this variation, a prediction model 55B can be built that, in a scenario where the state of the machine RB is monitored, is capable of being utilized in the monitoring and is capable of accurately predicting rare events. Through machine learning that utilizes the above rarity degree 325B, for example, the prediction model 55B is built to be capable of predicting events that can occur irregularly such as the machine RB suddenly reaching the point of failure, with an accuracy comparable to events that can have regularity such as the machine RB gradually reaching the point of failure after showing signs of failure. Thus, the failure prediction apparatus 2B is able to accurately predict failures such as the above that can occur irregularly, by utilizing this prediction model 55B. Maintenance of the machine RB can thereby be implemented at an appropriate timing so as to shorten the period for which the machine RB is stopped as much as possible, for example. Thus, the period for which the production line is stopped due to the failure of the machine RB can be shortened, and the efficiency with which products are manufactured on the production line can be enhanced.

(C) Scenario where State of Subject is Predicted

Figure 15:
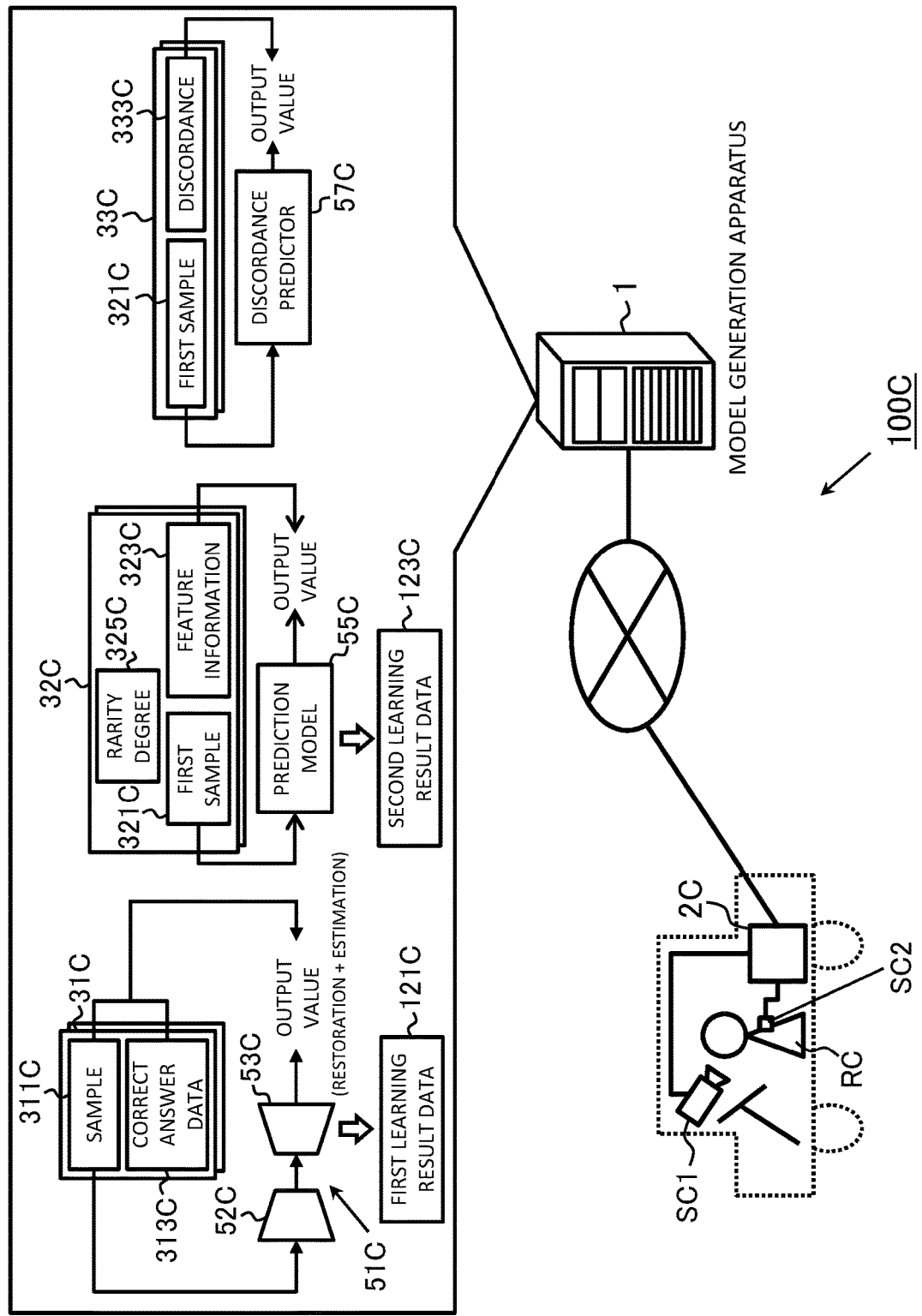
FIG. 15 schematically illustrates an example of another scenario in which the present invention is applied.

FIG. 15 schematically illustrates an example of an application scenario of a prediction system 100C according to a third variation. This variation is an example in which the above embodiment is applied to a scenario where the state of a subject is predicted. In FIG. 15, a scenario where the state of a driver RC of a vehicle is monitored is illustrated as an example of a scenario where the state of a subject is predicted. The driver RC is an example of a subject. As shown in FIG. 15, the prediction system 100C according to this variation is provided with the model generation apparatus 1 and a state prediction apparatus 2C. Similarly to the above embodiment, the model generation apparatus 1 and the state prediction apparatus 2C may be connected to each other via a network.

The prediction system 100C according to this variation may be constituted similarly to the above embodiment, except for the data that is handled being different. The state prediction apparatus 2C corresponds to the above prediction apparatus 2. The state prediction apparatus 2C may be constituted similarly to the above prediction apparatus 2. The model generation apparatus 1 builds, by machine learning, a prediction model 55C trained to be capable of predicting, from measurement data of an arbitrary time obtained by a sensor that measures the state of the subject, a feature that will appear in the measurement data of a future time. On the other hand, the state prediction apparatus 2C predicts the state of the subject of a future time from the measurement data obtained by the sensor, utilizing the prediction model 55C. The predetermined data that is obtained in time series may be measurement data that is obtained by the sensor, and the feature information 323 may relate to the state of the subject that is specified from the measurement data. The sensor may be at least one of a camera and a vital sign sensor, for example, and the measurement data may be at least one of vital sign data of the subject and image data of the subject, for example.

In this variation, a camera SC1 and a vital sign sensor SC2 are used, in order to predict the state of the driver RC. The camera SC1 and the vital sign sensor SC2 are examples of a sensor for measuring the state of the subject. The camera SC1 may be disposed as appropriate to be capable of shooting images of the driver RC. The camera SC1 may be a general camera, a depth camera, or an infrared camera, for example. Also, the vital sign sensor SC2 is not particularly limited in terms of type, as long as it is a sensor capable of measuring vital signs of the subject, and may be selected as appropriate according to the embodiment. The vital sign sensor SC2 may be a thermometer, a sphygmomanometer, or a pulse meter, for example. In response, the vital sign data that is obtained by the vital sign sensor SC2 may be data indicating the result of measuring body temperature, blood pressure, or pulse, for example.

In this variation, the model generation apparatus 1 builds, by machine learning, the prediction model 55C trained to be capable of predicting, from image data and vital sign data of an arbitrary time, a feature relating to the state of the driver RC that will be specified from image data and vital sign data of a future time. In other words, in this variation, the image data that is obtained by the camera SC1 and the vital sign data that is obtained by the vital sign sensor SC2 are examples of "predetermined data that is obtained in time series" of the present invention, and are handled as the predetermined data to undergo processing for predicting events that can occur at a future time.

On the other hand, the state prediction apparatus 2C is connected to the camera SC1 and the vital sign sensor SC2. The state prediction apparatus 2C acquires image data by shooting images of the driver RC with the camera SC1. Also, the state prediction apparatus 2C acquires vital sign data by measuring vital signs of the driver RC with the vital sign sensor SC2. The state prediction apparatus 2C then predicts a feature relating to the state of the driver RC that will appear in the image data and vital sign data of a future time from image data and vital sign data of an arbitrary time, utilizing the trained prediction model 55C.

In the case of this variation, however, the predetermined data that is obtained in time series is not limited to the image data that is obtained by the camera SC1 and the vital sign data that is obtained by the vital sign sensor SC2. At least one of image data and vital sign data may be omitted, and at least one of the camera SC1 and the vital sign sensor SC2 may be omitted in response.

Hardware Configuration of State Prediction Apparatus

Figure 16:
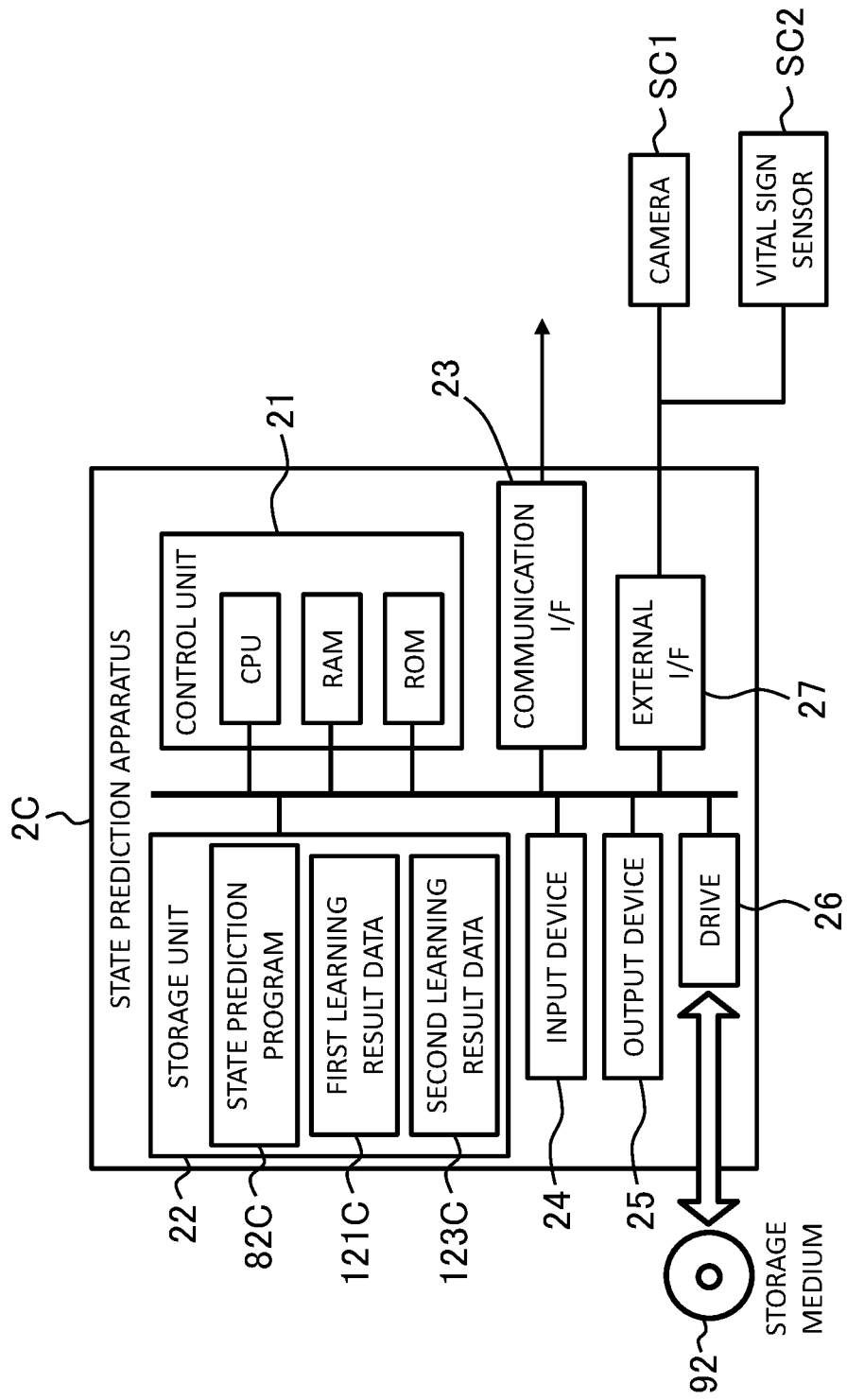
FIG. 16 schematically illustrates an example of the hardware configuration of a state prediction apparatus according to another mode.

Next, an example of the hardware configuration of the state prediction apparatus 2C according to this variation will be described, further using FIG. 16. FIG. 16 schematically illustrates an example of the hardware configuration of the state prediction apparatus 2C according to this variation. The state prediction apparatus 2C according to this variation is a computer in which a control unit 21, a storage unit 22, a communication interface 23, an input device 24, an output device 25, a drive 26 and an external interface 27 are electrically connected, similarly to the above prediction apparatus 2. The state prediction apparatus 2C is connected to the camera SC1 and the vital sign sensor SC2 via the external interface 27. The hardware configuration of the state prediction apparatus 2C is not, however, limited to such an example. In relation to the specific hardware configuration of the state prediction apparatus 2C, omission, substitution and addition of constituent elements are possible as appropriate, according to the embodiment. The state prediction apparatus 2C may also be a general-purpose computer, a mobile phone including a smartphone, an in-vehicle device or the like, other than an information processing apparatus designed exclusively for the service that is provided.

The storage unit 22 of the state prediction apparatus 2C according to this variation stores various information such as a state prediction program 82C, first learning result data 121C and second learning result data 123C. The state prediction program 82C, the first learning result data 121C and the second learning result data 123C correspond to the prediction program 82, the first learning result data 121 and the second learning result data 123 according to the above embodiment. At least one of the state prediction program 82C, the first learning result data 121C and the second learning result data 123C may also be stored in the storage medium 92. The state prediction apparatus 2C may also acquire at least one of the state prediction program 82C, the first learning result data 121C and the second learning result data 123C from the storage medium 92.

Machine Learning of Estimator

Next, an example of processing procedures of machine learning of an estimator 51C in this variation will be described. As shown in FIG. 15, in this variation, the model generation apparatus 1 executes a series of processing relating to machine learning of the estimator 51C, similarly to the above embodiment, except for handling measurement data (specifically, image data and vital sign data) obtained by a sensor that measures the state of a subject as predetermined data.

That is, in step S101, the control unit 11 of the model generation apparatus 1 acquires a plurality of first learning datasets 31C to be used in machine learning of the estimator 51C. In this variation, the estimator 51C is provided with an encoder 52C and a decoder 53C, similarly to the estimator 51 according to the above embodiment. The encoder 52C and the decoder 53C are each constituted by a neural network, similarly to the above embodiment, and respectively operate similarly to the above encoder 52 and decoder 53.

The first learning datasets 31C correspond to the first learning datasets 31 according to the above embodiment. In this variation, each first learning dataset 31C is constituted by a combination of a sample 311C of image data and vital sign data that are respectively obtained in time series by a camera and a vital sign sensor that measure the state of the driver and correct answer data 313C indicating a feature (correct answer) that appears in the sample 311C. The feature indicated by the correct answer data 313C may be the state of the driver, for example. The state of the driver may also include the level of drowsiness indicating how drowsy the driver is, the level of fatigue indicating how fatigued the driver is, the level of reserve indicating how much the driver has in reserve with respect to driving, or a combination thereof, for example.

Similarly to the above embodiment, the method of acquiring each first learning dataset 31C may be selected as appropriate. Also, each first learning dataset 31C may be generated as appropriate. For example, image data and vital sign data are acquired in time series, by preparing a camera and a vital sign sensor respectively of the same type as the camera SC1 and the vital sign sensor SC2, and measuring drivers (test subjects) having various attributes under various conditions with the prepared camera and vital sign sensor. Next, the sample 311C is extracted as appropriate from the image data and vital sign data obtained in time series. The correct answer data 313C indicating a feature that appears in the extracted sample 311C such as the state of the test subjects is then associated with the sample 311C. Each first learning dataset 31C can thereby be generated. When the plurality of first learning datasets 31C have been acquired, the control unit 11 advances the processing to the next step S102.

In step S102, the control unit 11 executes machine learning of the estimator 51C, using the plurality of first learning datasets 31C. In this variation, the control unit 11 trains the estimator 51C, by machine learning, to output an output value that matches the sample 311C and the correct answer data 313C from the decoder 53C when the sample 311C is input to the encoder 52C, for each first learning dataset 31C. The processing procedures of machine learning may be similar to the above embodiment. Through the process of this machine learning, the encoder 52C is trained to convert the sample 311C of image data and vital sign data into a feature amount. Also, the decoder 53C is trained to restore the sample 311C from the feature amount obtained by the encoder 52C, and to estimate a feature included in the sample 311C. As a result, the control unit 11 is able to build an estimator 51C trained to output an output value that matches the sample 311C and the correct answer data 313C in response to input of the sample 311C, for each first learning dataset 31C. When machine learning of the estimator 51C has been completed, the control unit 11 advances the processing to the next step S103.

In step S103, the control unit 11 generates information indicating the structure and computational parameters of the trained estimator 51C built by machine learning, as the first learning result data 121C. The control unit 11 then saves the generated first learning result data 121C to a predetermined storage area. The control unit 11 thereby ends the series of processing relating to machine learning of the estimator 51C. Note that, similarly to the above embodiment, the first learning result data 121C relating to the decoder 53C may be provided to the state prediction apparatus 2C at any suitable timing.

Machine Learning of Prediction Model

Next, an example of processing procedures of machine learning of the prediction model 55C and a discordance predictor 57C in this variation will be described. In this variation, the model generation apparatus 1 executes a series of processing relating to machine learning of the prediction model 55C and the discordance predictor 57C, similarly to the above embodiment, except for handling measurement data (specifically, image data and vital sign data) that is obtained by a sensor that measures the state of a subject as predetermined data.

That is, in step S201, the control unit 11 acquires a plurality of second learning datasets 32C each constituted by a combination of a first sample 321C of a first time of image data and vital sign data that are obtained in time series and feature information 323C that is included in a second sample of a future time relative to the first time. The method of acquiring each second learning dataset 32C may be selected as appropriate, similarly to the above embodiment. Also, each second learning dataset 32C may be generated similarly to the above embodiment. The image data and vital sign data from which the first sample 321C and the second sample are extracted may be the same as the image data and vital sign data utilized in generation of each first learning dataset 31C. In this variation, the feature information 323C may also relate to the state of the test subjects that appears in image data and vital sign data. Also, the feature information 323C may be configured to include a feature amount of the second sample. The feature amount constituting the feature information 323C may also be provided by converting the second sample with the trained encoder 52C. A rarity degree 325C may be set as appropriate for each second learning dataset 32C. When the plurality of second learning datasets 32C have been acquired, the control unit 11 advances the processing to the next step S202.

In step S202, the control unit 11 executes machine learning of the prediction model 55C, using the plurality of second learning datasets 32C. The prediction model 55C may be constituted by a neural network, similarly to the prediction model 55 according to the above embodiment. The control unit 11 trains the prediction model 55C, by machine learning, to output an output value that matches the corresponding feature information 323C when the first sample 321C is input, for each second learning dataset 32C. In machine learning of this prediction model 55C, the control unit 11 trains more preponderantly on second learning datasets 32C having a higher rarity degree 325C. The method of training preponderantly may be similar to the above embodiment. The control unit 11 is thereby able to build the prediction model 55C trained to output an output value that matches the feature information 323C of the second time when the first sample 321C of the first time is input, for each second learning dataset 32C. When machine learning of the prediction model 55C has been completed, the control unit 11 advances the processing to the next step S203.

In step S203, the control unit 11 determines whether to repeat the processing of machine learning of the prediction model 55C and the discordance predictor 57C. The criterion for repeating machine learning may be similar to the above embodiment. If it is determined to repeat the processing of machine learning, the control unit 11 advances the processing to the next step S204. On the other hand, if it is determined to end the processing of machine learning, the control unit 11 advances the processing to the next step S207.

In step S204, the control unit 11 acquires a plurality of third learning datasets 33C each constituted by a combination of the first sample 321C of the first time of the corresponding second learning dataset 32C and a discordance 333C of prediction by the prediction model 55C with respect to the first sample 321C. The method of acquiring each third learning dataset 33C may be similar to the above embodiment. The trained prediction model 55C built in step S202 and the second learning datasets 32C may be utilized in generation of the respective third learning datasets 33C. When the plurality of third learning datasets 33C have been acquired, the control unit 11 advances the processing to the next step S205.

In step S205, the control unit 11 executes machine learning of the discordance predictor 57C, using the plurality of third learning datasets 33C. The control unit 11 trains the discordance predictor 57C, by machine learning, to output an output value that matches the corresponding discordance 333C when the first sample 321C is input, for each third learning dataset 33C. Unlike machine learning of the prediction model 55C, the control unit 11 trains uniformly on each third learning dataset 33C, independently of the rarity degree 325C, in this machine learning of the discordance predictor 57C. The method of training uniformly may be similar to the above embodiment. The control unit 11 is thereby able to build the discordance predictor 57C trained to output an output value that matches the discordance 333C of prediction by the prediction model 55C with respect to the first sample 321C when the first sample 321C of the first time is input, for each third learning dataset 33C. When machine learning of the discordance predictor 57C has been completed, the control unit 11 advances the processing to the next step S206.

In step S206, the control unit 11 sets (updates) the rarity degree 325C of each second learning dataset 32C, utilizing the trained discordance predictor 57C built in step S205. The method of setting the rarity degree 325C may be similar to the above embodiment. When setting of the rarity degree 325C has been completed, the control unit 11 returns the processing to step S202.

In step S207, the control unit 11 generates information indicating the structure and computational parameters of the trained prediction model 55C built by machine learning, as the second learning result data 123C. The control unit 11 then saves the generated second learning result data 123C to a predetermined storage area. The control unit 11 thereby ends the series of processing relating to machine learning of the prediction model 55C and the discordance predictor 57C. Note that, similarly to the above embodiment, the second learning result data 123C may be provided to the state prediction apparatus 2C at any suitable timing.

Prediction Processing

Figure 17:
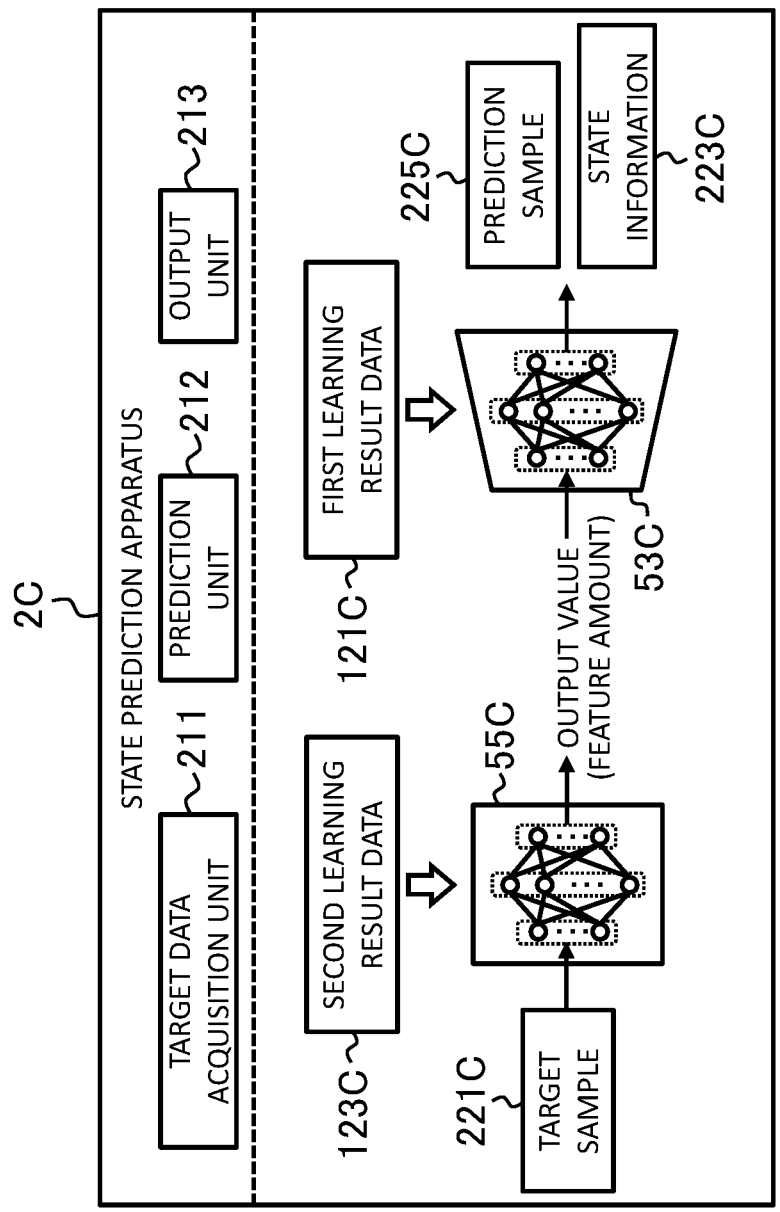
FIG. 17 schematically illustrates an example of the software configuration of the state prediction apparatus according to the other mode.

Next, an example of prediction processing of the state prediction apparatus 2C will be described, using FIG. 17. FIG. 17 schematically illustrates an example of the software configuration relating to the prediction processing of the state prediction apparatus 2C according to this variation. Similarly to the above embodiment, the software configuration relating to the prediction processing of the state prediction apparatus 2C is realized by execution of the state prediction program 82C by the control unit 21. As shown in FIG. 17, the software configuration relating to the prediction processing of the state prediction apparatus 2C is similar to the software configuration of the above prediction apparatus 2, except for handling measurement data (specifically, image data and vital sign data) that is obtained by a sensor that measures the state of a subject as predetermined data. The state prediction apparatus 2C thereby executes the series of processing relating to the prediction processing, similarly to the above prediction apparatus 2.

That is, in step S301, the control unit 21 of the state prediction apparatus 2C acquires a target sample 221C of image data and vital sign data from the camera SC1 and the vital sign sensor SC2. In step S302, the control unit 21 configures the settings of the trained prediction model 55C, with reference to the second learning result data 123C. Also, the control unit 21 configures the settings of the decoder 53C of the trained estimator 51C, with reference to the first learning result data 121C. Next, the control unit 21 inputs the acquired target sample 221C to the prediction model 55C, and executes computational processing of the prediction model 55C. As a result of this computational processing, the control unit 21 predicts feature information (feature amount) of image data and vital sign data of a future time from the target sample 221C. Furthermore, the control unit 21 inputs the output value of the prediction model 55C to the decoder 53C, and executes computational processing of the decoder 53C. The control unit 21 thereby restores a prediction sample 225C from the feature amount predicted by the prediction model 55C, and acquires an output value corresponding to the result of predicting a feature that will appear in the image data and vital sign data at a future time from the decoder 53C. In this variation, the feature that is predicted can include state information 223C indicating the state of the driver RC that is specified from the image data and the vital sign data. The state of the driver RC shown by the state information 223C can include the level of drowsiness, level of fatigue or level of reserve of the driver RC, or a combination thereof. When prediction of a future feature from the target sample 221C has been completed, the control unit 21 advances the processing to the next step S303.

In step S303, the control unit 21 outputs information relating to the prediction result (state information 223C and prediction sample 225C). The output destination and the contents of the information that is output may be determined as appropriate according to the embodiment. For example, the control unit 21 may also output the state information 223C and prediction sample 225C that were obtained directly to the output device 25. For example, the control unit 21 may also execute information processing of some sort, based on the prediction result. The control unit 21 may then also output the result of executing that information processing as information relating to the prediction result.

As an example of the information processing, the control unit 21 may also output a specific message such as a warning to the output device 25, according to the state of the driver RC shown by the state information 223C. As an example, in the case where the state information 223C indicates at least one of the level of drowsiness and level of fatigue of the driver RC, the control unit 21 may also determine whether at least one of the predicted level of drowsiness and level of fatigue exceeds a threshold value. The threshold value may be set as appropriate. In the case where at least one of the level of drowsiness and the level of fatigue exceeds the threshold value, the control unit 21 may also stop the vehicle in a parking lot or the like and output a warning prompting the driver RC to take a break to the output device 25.

Also, in the case where the vehicle is configured to be capable of an automated driving operation, for example, the control unit 21 may also control the automated driving operation of the vehicle, based on the result of predicting the state of the driver RC. As an example, it is assumed that the vehicle is configured to be capable of switching between an automated driving mode in which travel of the vehicle is controlled by a system and a manual driving mode in which travel of the vehicle is controlled by steering of the driver RC.

In this case, when the vehicle is traveling in the automated driving mode and switching from the automated driving mode to the manual driving mode is received from the driver RC or the system, the control unit 21 may determine whether the level of reserve of the driver RC shown by the state information 223C exceeds a threshold value. If the level of reserve of the driver RC exceeds the threshold value, the control unit 21 may then permit the switch from the automated driving mode to the manual driving mode. On the other hand, if the level of reserve of the driver RC is less than or equal to the threshold value, the control unit 21 may maintain travel in the automated driving mode, and not permit the switch from the automated driving mode to the manual driving mode.

When the vehicle is traveling in the manual driving mode, the control unit 21 may also determine whether at least one of the level of drowsiness or level of fatigue shown by the state information 223C exceeds a threshold value. If at least one of the level of drowsiness and level of fatigue exceeds the threshold value, the control unit 21 may then switch from the manual driving mode to the automated driving mode, and transmit an instruction to stop the vehicle at a safe location such as a parking lot to the system of the vehicle. On the other hand, if that is not the case, the control unit 21 may maintain travel of the vehicle in the manual driving mode.

When the vehicle is traveling in the manual driving mode, the control unit 21 may also determine whether the level of reserve shown by the state information 223C is less than or equal to a threshold value. If the level of reserve is less than or equal to the threshold value, the control unit 21 may transmit an instruction to slow down to the system of the vehicle. On the other hand, if that is not the case, the control unit 21 may maintain travel of the vehicle under the operation of the driver RC.

According to this variation, in a scenario where the state of the subject is predicted, the prediction model 55C capable of accurately predicting rare events can be built. Through machine learning that utilizes the above rarity degree 325C, for example, the prediction model 55C is built to be capable of predicting events that can occur irregularly such as the state of the subject changing suddenly, with an accuracy comparable to events that can have regularity such as the state of the subject changing gradually. Thus, the state prediction apparatus 2C is able to accurately predict changes in the state of the subject such as the above that can occur irregularly, by utilizing this prediction model 55C. In the above case, it thereby becomes possible to prevent the vehicle having accidents that can occur due to the state of the driver RC changing suddenly, for example.

Note that the subject whose state is to be predicted is not limited to the driver RC of the vehicle illustrated in FIG. 15, and may include all people. The subject whose state is to be predicted may also include a worker who works in an office, a factory or the like or a person whose vital signs are measured, for example.

Figure 18:
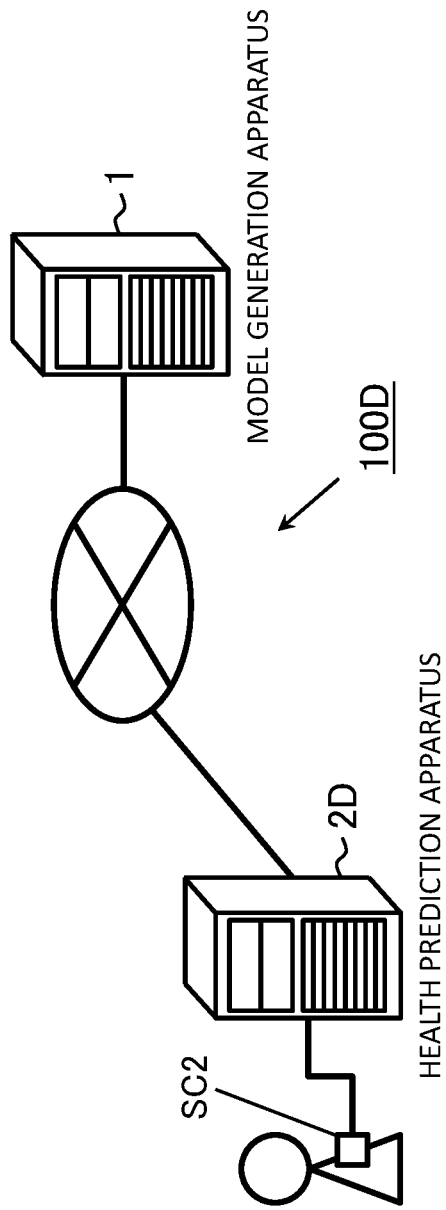
FIG. 18 schematically illustrates an example of another scenario in which the present invention is applied.

FIG. 18 schematically illustrates an example of another scenario where the state of the subject is predicted. A prediction system 100D illustrated in FIG. 18 is provided with the model generation apparatus 1 and a health prediction apparatus 2D. The health prediction apparatus 2D corresponds to the above state prediction apparatus 2C. In the example in FIG. 18, the health prediction apparatus 2D is connected to the vital sign sensor SC2, and acquires vital sign data of the person to be measured with the vital sign sensor SC2. The health prediction apparatus 2D predicts the state of health of the person to be measured of a future time from vital sign data of an arbitrary time, by similar processing as the above state prediction apparatus 2C. The state of health of the person to be measured is an example of the state of the subject. The state of health may be determined as appropriate according to the embodiment, and may include whether the person is healthy or whether there are signs of illness, for example. In this scenario, the health prediction apparatus 2D is able to accurately predict changes in the state of health of the person to be measured that can occur irregularly.

Note that the state of the subject who undergoes prediction is not limited to the above example, and may include all states of the subject. The state of the subject may also be represented by an event that occurs to the subject (e.g., falling ill). Also, the subject whose state is to be predicted is not limited to a specific person such as the driver RC illustrated in the above FIG. 15 or the person illustrated in the above FIG. 18 whose vital signs are to be measured, and may also be an unspecified person who is captured on camera. As an example, a camera may also be installed on a station platform, a street, a store, or the like. The above prediction system 100C may also be configured to handle image data that is obtained by this camera. In this case, events such as a person falling from the station platform may also be included in the state of the subject. In the above step S303, in the case where an event such as a person falling from a station platform is predicted, the state prediction apparatus 2C may output a warning message according to the type of predicted event.

(D) Prediction of Flow of People

Figure 19:
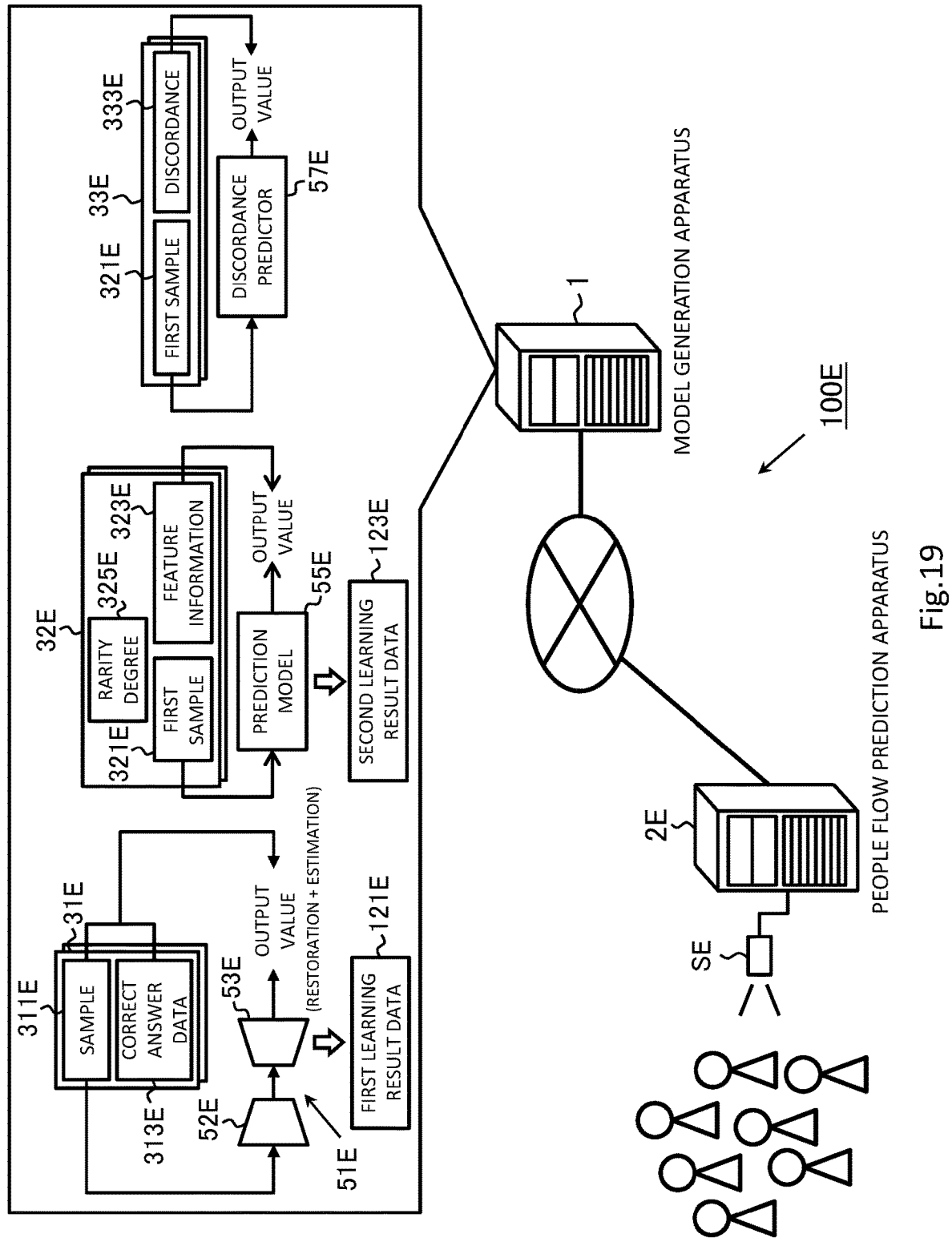
FIG. 19 schematically illustrates an example of another scenario in which the present invention is applied.

FIG. 19 schematically illustrates an example of an application scenario of a prediction system 100E according to a fourth variation. This variation is an example in which the above embodiment is applied to a scenario where the flow of people is predicted. The flow of people may include at least one of the flow of pedestrians or the flow of moving bodies that people can ride in. The flow of pedestrians may, for example, also be represented by the flow of the person who exists in a predetermined area (as an example, the flow of participants at a given venue). The flow of moving bodies may, for example, also be represented by the flow of traffic of vehicles or the like. As shown in FIG. 19, the prediction system 100E according to this variation is provided with the model generation apparatus 1 and a people flow prediction apparatus 2E. Similarly to the above embodiment, the model generation apparatus 1 and the people flow prediction apparatus 2E may be connected to each other via a network.

The prediction system 100E according to this variation may be constituted similarly to the above embodiment, except for the data that is handled being different. The people flow prediction apparatus 2E corresponds to the above prediction apparatus 2. The people flow prediction apparatus 2E may be constituted similarly to the above prediction apparatus 2. The model generation apparatus 1 builds, by machine learning, a prediction model 55E trained to be capable of predicting a feature that will appear in the people flow data of a future time from people flow data of an arbitrary time. On the other hand, the people flow prediction apparatus 2E predicts the amount of people flow of a future time from people flow data, utilizing the prediction model 55E. The predetermined data that is obtained in time series may be people flow data, and the feature information 323 may relate to the amount of people flow that is specified from the people flow data.

The people flow data is an example of "predetermined data that is obtained in time series" of the present invention. The people flow data is not particularly limited in terms of type, as long as it is data relating to the flow of people, that is, data that enables the flow of people to be estimated, and may be selected as appropriate according to the embodiment. A sensor may also be used in acquisition of people flow data. For example, people flow data may be acquired by a motion sensor configured to detect people who pass through an arbitrary location, a sensor configured to detect opening and closing of a gate, a sensor configured to detect people who pass through a gate, a sensor configured to detect the amount of passing vehicle traffic, a microphone installed to measure sounds relating to at least one of moving people and vehicles, or a camera set to shoot images of at least one of moving people and vehicles. That is, people flow data may be image data that is obtained with a camera, sound data that is obtained with a microphone, sensing data obtained with another sensor, or the like. The motion sensor may be an infrared sensor, for example. The gate may be an automatic ticket gate, a gate (door, etc.) installed in a building, a gate installed at the entrance of a highway, or a gate installed at the entrance of a predetermined site such as a parking lot, for example. The people flow data may also include position data of a device held by people or in vehicles such as a mobile phone or an in-vehicle device, or communication data of the device, for example. The position data may also be measured by a GPS measuring device or the like, for example. The people flow data may also include data relating to the history of people such as POS (Point of Sales) data showing that goods were purchased at predetermined locations. Furthermore, the people flow data may also include data that can indirectly contribute to the flow of people such as meteorological data.

In this variation, a sensor SE is used, in order to measure the flow of people. The sensor SE is not particularly limited, and may be selected as appropriate from the above examples. The sensor SE may be disposed as appropriate to be capable of measuring the flow of people.

The model generation apparatus 1 builds, by machine learning, the prediction model 55E trained to be capable of predicting, from people flow data of an arbitrary time that is obtained by a sensor, a feature relating to the amount of people flow that will be specified by people flow data of a future time. In other words, in this variation, the people flow data that is obtained by the sensor SE is handled as the predetermined data to undergo processing for predicting events that can occur at a future time.

On the other hand, the people flow prediction apparatus 2E is connected to the sensor SE. The people flow prediction apparatus 2E acquires people flow data by measuring the flow of people with the sensor SE. The people flow prediction apparatus 2E then predicts a feature relating to the amount of people flow of a future time from people flow data of an arbitrary time, utilizing the trained prediction model 55E.

Hardware Configuration of People Flow Prediction Apparatus

Figure 20:
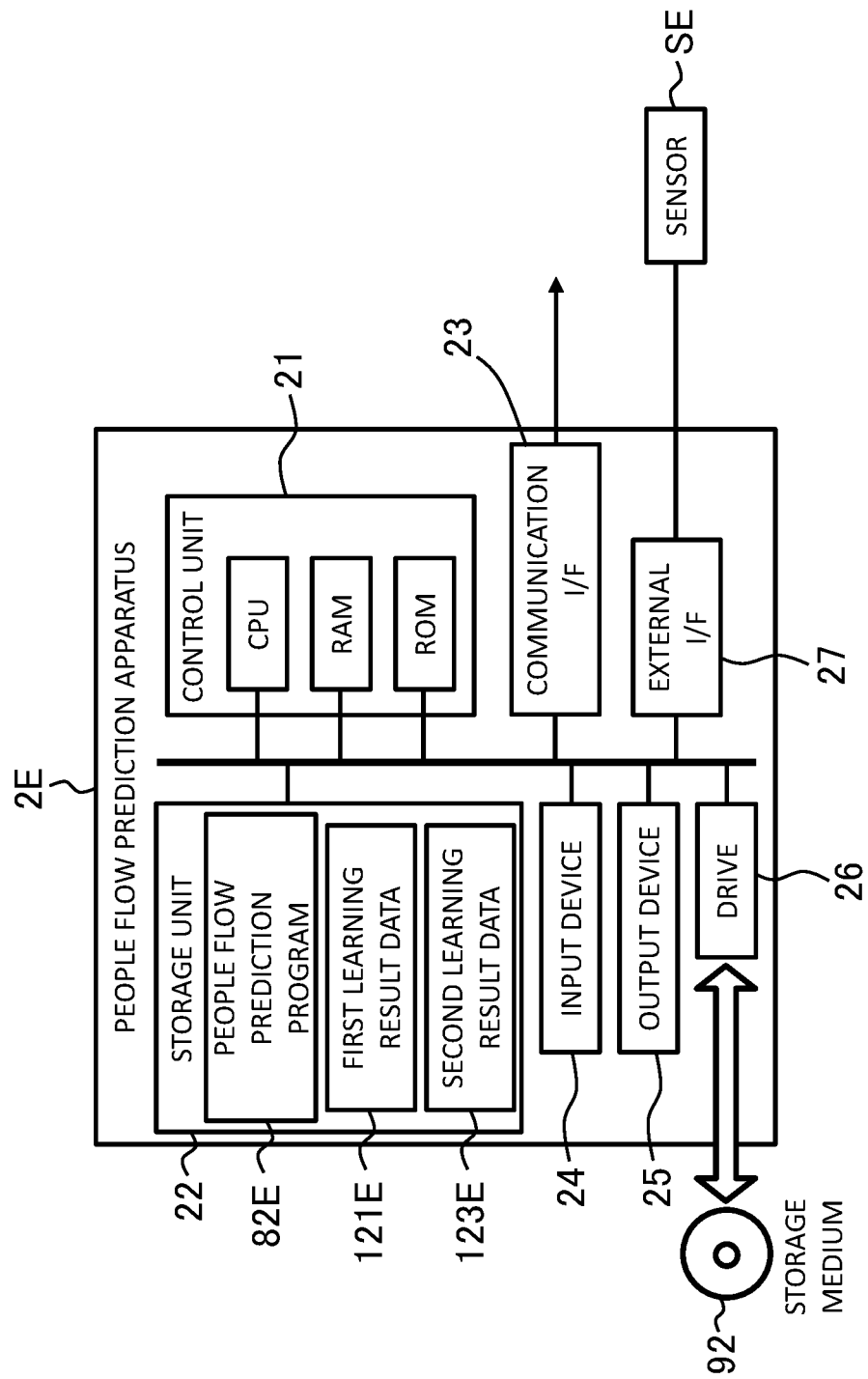
FIG. 20 schematically illustrates an example of the hardware configuration of a people flow prediction apparatus according to another mode.

Next, an example of the hardware configuration of the people flow prediction apparatus 2E according to this variation will be described, further using FIG. 20. FIG. 20 schematically illustrates an example of the hardware configuration of the people flow prediction apparatus 2E according to this variation. The people flow prediction apparatus 2E according to this variation is a computer in which a control unit 21, a storage unit 22, a communication interface 23, an input device 24, an output device 25, a drive 26 and an external interface 27 are electrically connected, similarly to the above prediction apparatus 2. The people flow prediction apparatus 2E is connected to the sensor SE via the external interface 27. The hardware configuration of the people flow prediction apparatus 2E is not, however, limited to such an example. In relation to the specific hardware configuration of the people flow prediction apparatus 2E, omission, substitution and addition of constituent elements are possible as appropriate, according to the embodiment. The people flow prediction apparatus 2E may also be a general-purpose server device, a general-purpose PC or the like, other than an information processing apparatus designed exclusively for the service that is provided.

The storage unit 22 of the people flow prediction apparatus 2E according to this variation stores various information such as a people flow prediction program 82E, first learning result data 121E and second learning result data 123E. The people flow prediction program 82E, the first learning result data 121E and the second learning result data 123E correspond to the prediction program 82, the first learning result data 121 and the second learning result data 123 according to the above embodiment. At least one of the people flow prediction program 82E, the first learning result data 121E and the second learning result data 123E may also be stored in the storage medium 92. The people flow prediction apparatus 2E may also acquire at least one of the people flow prediction program 82E, the first learning result data 121E and the second learning result data 123E from the storage medium 92.

Machine Learning of Estimator

Next, an example of processing procedures of machine learning of an estimator 51E in this variation will be described. As shown in FIG. 19, in this variation, the model generation apparatus 1 executes a series of processing relating to machine learning of the estimator 51E, similarly to the above embodiment, except for handling people flow data as predetermined data.

That is, in step S101, the control unit 11 of the model generation apparatus 1 acquires a plurality of first learning datasets 31E to be used in machine learning of the estimator 51E. In this variation, the estimator 51E is provided with an encoder 52E and a decoder 53E, similarly to the estimator 51 according to the above embodiment. The encoder 52E and the decoder 53E are each constituted by a neural network, similarly to the above embodiment, and respectively operate similarly to the above encoder 52 and decoder 53.

The first learning datasets 31E correspond to the first learning datasets 31 according to the above embodiment. In this variation, each first learning dataset 31E is constituted by a combination of a sample 311E of people flow data that is obtained in time series by a sensor and correct answer data 313E indicating a feature (correct answer) that appears in the sample 311E. The feature indicated by the correct answer data 313E may be the amount of people flow, for example. The amount of people flow may be represented by the number of people who pass through a predetermined point or the extent thereof, the number of people who are present within a predetermined range or the extent thereof, or the presence or absence of traffic congestion, for example.

Similarly to the above embodiment, the method of acquiring each first learning dataset 31E may be selected as appropriate. Also, each first learning dataset 31E may be generated as appropriate. For example, people flow data is acquired in time series, by preparing a sensor of the same type as the sensor SE, and measuring the flow of people under various conditions with the prepared sensor. Next, the sample 311E is extracted as appropriate from the people flow data obtained in time series. The correct answer data 313E indicating a feature that appears in the extracted sample 311E such as the measured amount of people flow is then associated with the sample 311E. Each first learning dataset 31E can thereby be generated. When the plurality of first learning datasets 31E have been acquired, the control unit 11 advances the processing to the next step S102.

In step S102, the control unit 11 executes machine learning of the estimator 51E, using the plurality of first learning datasets 31E. In this variation, the control unit 11 trains the estimator 51E, by machine learning, to output an output value that matches the sample 311E and the correct answer data 313E from the decoder 53E when the sample 311E is input to the encoder 52E, for each first learning dataset 31E. The processing procedures of machine learning may be similar to the above embodiment. Through the process of this machine learning, the encoder 52E is trained to convert the sample 311E of people flow data into a feature amount. Also, the decoder 53E is trained to restore the sample 311E from the feature amount obtained by the encoder 52E, and to estimate a feature included in the sample 311E. As a result, the control unit 11 is able to build an estimator 51E trained to output an output value that matches the sample 311E and the correct answer data 313E in response to input of the sample 311E, for each first learning dataset 31E. When machine learning of the estimator 51E has been completed, the control unit 11 advances the processing to the next step S103.

In step S103, the control unit 11 generates information indicating the structure and computational parameters of the trained estimator 51E built by machine learning, as the first learning result data 121E. The control unit 11 then saves the generated first learning result data 121E to a predetermined storage area. The control unit 11 thereby ends the series of processing relating to machine learning of the estimator 51E. Note that, similarly to the above embodiment, the first learning result data 121E relating to the decoder 53E may be provided to the people flow prediction apparatus 2E at any suitable timing.

Machine Learning of Prediction Model

Next, an example of processing procedures of machine learning of the prediction model 55E and a discordance predictor 57E in this variation will be described. In this variation, the model generation apparatus 1 executes a series of processing relating to machine learning of the prediction model 55E and the discordance predictor 57E, similarly to the above embodiment, except for handling people flow data as predetermined data.

That is, in step S201, the control unit 11 acquires a plurality of second learning datasets 32E each constituted by a combination of a first sample 321E of a first time of people flow data that is obtained in time series and feature information 323E that is included in a second sample of a future time relative to the first time. The method of acquiring each second learning dataset 32E may be selected as appropriate, similarly to the above embodiment. Also, each second learning dataset 32E may be generated similarly to the above embodiment. The people flow data from which the first sample 321E and the second sample are extracted may be the same as the people flow data utilized in generation of each first learning dataset 31E. In this variation, the feature information 323E may also relate to the amount of people flow that is specified from the people flow data. Also, the feature information 323E may be configured to include a feature amount of the second sample. The feature amount constituting the feature information 323E may also be provided by converting the second sample with the trained encoder 52E. A rarity degree 325E may be set as appropriate for each second learning dataset 32E. When the plurality of second learning datasets 32E have been acquired, the control unit 11 advances the processing to the next step S202.

In step S202, the control unit 11 executes machine learning of the prediction model 55E, using the plurality of second learning datasets 32E. The prediction model 55E may be constituted by a neural network, similarly to the prediction model 55 according to the above embodiment. The control unit 11 trains the prediction model 55E, by machine learning, to output an output value that matches the corresponding feature information 323E when the first sample 321E is input, for each second learning dataset 32E. In machine learning of this prediction model 55E, the control unit 11 trains more preponderantly on second learning datasets 32E having a higher rarity degree 325E. The method of training preponderantly may be similar to the above embodiment. The control unit 11 is thereby able to build the prediction model 55E trained to output an output value that matches the feature information 323E of the second time when the first sample 321E of the first time is input, for each second learning dataset 32E. When machine learning of the prediction model 55E has been completed, the control unit 11 advances the processing to the next step S203.

In step S203, the control unit 11 determines whether to repeat the processing of machine learning of the prediction model 55E and the discordance predictor 57E. The criterion for repeating machine learning may be similar to the above embodiment. If it is determined to repeat the processing of machine learning, the control unit 11 advances the processing to the next step S204. On the other hand, if it is determined to end the processing of machine learning, the control unit 11 advances the processing to the next step S207.

In step S204, the control unit 11 acquires a plurality of third learning datasets 33E each constituted by a combination of the first sample 321E of the first time of the corresponding second learning dataset 32E and a discordance 333E of prediction by the prediction model 55E with respect to the first sample 321E. The method of acquiring each third learning dataset 33E may be similar to the above embodiment. The trained prediction model 55E built in step S202 and the second learning datasets 32E may be utilized in generation of the respective third learning datasets 33E. When the plurality of third learning datasets 33E have been acquired, the control unit 11 advances the processing to the next step S205.

In step S205, the control unit 11 executes machine learning of the discordance predictor 57E, using the plurality of third learning datasets 33E. The control unit 11 trains the discordance predictor 57E, by machine learning, to output an output value that matches the corresponding discordance 333E when the first sample 321E is input, for each third learning dataset 33E. Unlike machine learning of the prediction model 55E, the control unit 11 trains uniformly on each third learning dataset 33E, independently of the rarity degree 325E, in this machine learning of the discordance predictor 57E. The method of training uniformly may be similar to the above embodiment. The control unit 11 is thereby able to build the discordance predictor 57E trained to output an output value that matches the discordance 333E of prediction by the prediction model 55E with respect to the first sample 321E when the first sample 321E of the first time is input, for each third learning dataset 33E. When machine learning of the discordance predictor 57E has been completed, the control unit 11 advances the processing to the next step S206.

In step S206, the control unit 11 sets (updates) the rarity degree 325E of each second learning dataset 32E, utilizing the trained discordance predictor 57E built in step S205. The method of setting the rarity degree 325E may be similar to the above embodiment. When setting of the rarity degree 325E has been completed, the control unit 11 returns the processing to step S202.

In step S207, the control unit 11 generates information indicating the structure and computational parameters of the trained prediction model 55E built by machine learning, as the second learning result data 123E. The control unit 11 then saves the generated second learning result data 123E to a predetermined storage area. The control unit 11 thereby ends the series of processing relating to machine learning of the prediction model 55E and the discordance predictor 57E. Note that, similarly to the above embodiment, the second learning result data 123E may be provided to the people flow prediction apparatus 2E at any suitable timing.

Prediction Processing

Figure 21:
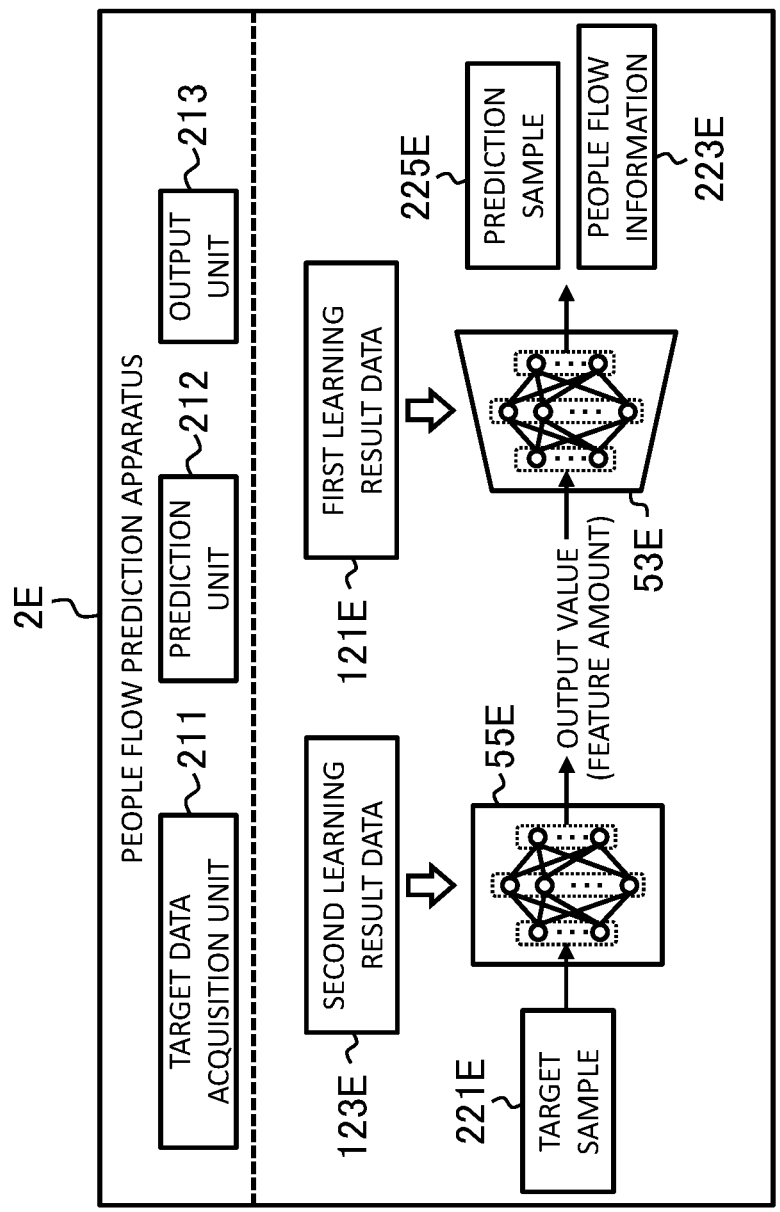
FIG. 21 schematically illustrates an example of the software configuration of the people flow prediction apparatus according to the other mode.

Next, an example of prediction processing of the people flow prediction apparatus 2E will be described, using FIG. 21. FIG. 21 schematically illustrates an example of the software configuration relating to the prediction processing of the people flow prediction apparatus 2E according to this variation. Similarly to the above embodiment, the software configuration relating to the prediction processing of the people flow prediction apparatus 2E is realized by execution of the people flow prediction program 82E by the control unit 21. As shown in FIG. 21, the software configuration relating to the prediction processing of the people flow prediction apparatus 2E is similar to the software configuration of the above prediction apparatus 2, except for handling people flow data as predetermined data. The people flow prediction apparatus 2E thereby executes the series of processing relating to the prediction processing, similarly to the above prediction apparatus 2.

That is, in step S301, the control unit 21 of the people flow prediction apparatus 2E acquires a target sample 221E of people flow data from the sensor SE. In step S302, the control unit 21 configures the settings of the trained prediction model 55E, with reference to the second learning result data 123E. Also, the control unit 21 configures the settings of the decoder 53E of the trained estimator 51E, with reference to the first learning result data 121E. Next, the control unit 21 inputs the acquired target sample 221E to the prediction model 55E, and executes computational processing of the prediction model 55E. As a result of this computational processing, the control unit 21 predicts feature information (feature amount) of people flow data of a future time from the target sample 221E. Furthermore, the control unit 21 inputs the output value of the prediction model 55E to the decoder 53E, and executes computational processing of the decoder 53E. The control unit 21 thereby restores a prediction sample 225E from the feature amount predicted by the prediction model 55E, and acquires an output value corresponding to the result of predicting a feature that will appear in the people flow data at a future time from the decoder 53E. In this variation, the feature that is predicted can include people flow information 223E indicating the amount of people flow that is specified from the people flow data. When prediction of a future feature from the target sample 221E has been completed, the control unit 21 advances the processing to the next step S303.

In step S303, the control unit 21 outputs information relating to the prediction result (people flow information 223E and prediction sample 225E). The output destination and the contents of the information that is output may be determined as appropriate according to the embodiment. For example, the control unit 21 may also output the people flow information 223E and prediction sample 225E that were obtained directly to the output device 25. For example, the control unit 21 may also execute information processing of some sort, based on the prediction result. The control unit 21 may then also output the result of executing that information processing as information relating to the prediction result.

As an example of the information processing, the control unit 21 may also output a specific message such as traffic congestion will occur, crowding is expected, according to the flow of people shown by the people flow information 223E to the output device 25. In this case, the people flow prediction apparatus 2E may also further output a detour route that avoids the location where traffic congestion or crowding is expected to the output device 25, with reference to map information. The map information may also be saved in a predetermined storage area such as the storage unit 22, the storage medium 92, an external storage device, storage media, or the like. The control unit 21 may also acquire the map information from the predetermined storage area as appropriate, when executing the processing.

According to this variation, in a scenario where the flow of people is predicted, the prediction model 55E capable of accurately predicting rare events can be built. Through machine learning that utilizes the above rarity degree 325E, for example, the prediction model 55E is built to be capable of predicting events that can occur irregularly such as the flow of people changing suddenly, with an accuracy comparable to events that can have regularity such as the flow of people changing gradually. Thus, the people flow prediction apparatus 2E is able to predict changes in the flow or people such as the above that can occur irregularly, by utilizing this prediction model 55E. It thereby becomes possible to appropriately adjust the flow of people.

(E) Scenario where Cultivation Condition is Predicted

Figure 22:
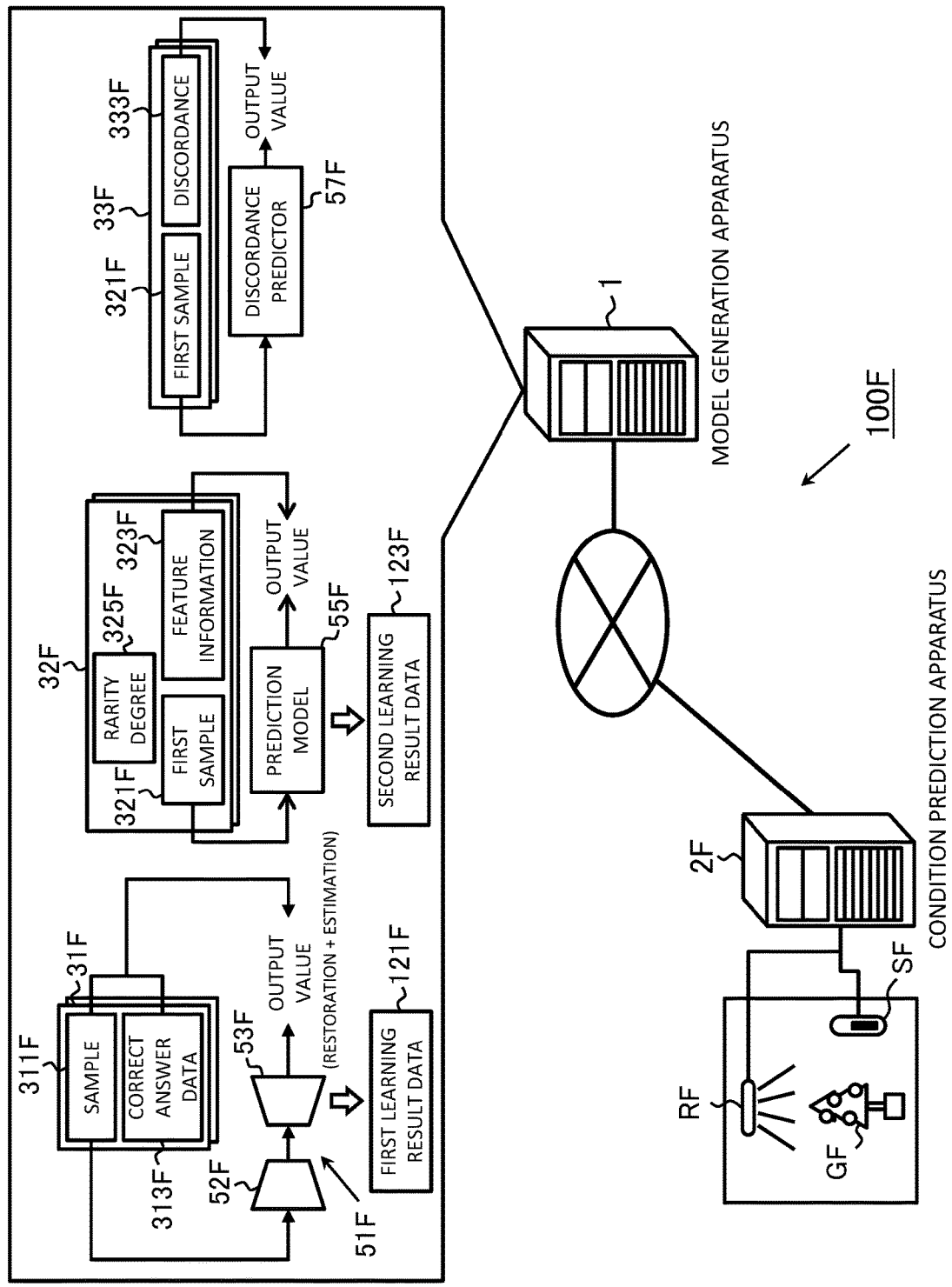
FIG. 22 schematically illustrates an example of another scenario in which the present invention is applied.

FIG. 22 schematically illustrates an example of an application scenario of a prediction system 100F according to a fifth variation. This variation is an example in which the above embodiment is applied to a scenario where the cultivation condition of a plant GF is predicted. As shown in FIG. 22, the prediction system 100F according to this variation is provided with the model generation apparatus 1 and a condition prediction apparatus 2F. Similarly to the above embodiment, the model generation apparatus 1 and the condition prediction apparatus 2F may be connected to each other via a network.

The prediction system 100F according to this variation may be constituted similarly to the above embodiment, except for the data that is handled being different. The condition prediction apparatus 2F corresponds to the above prediction apparatus 2. The condition prediction apparatus 2F may be constituted similarly to the above prediction apparatus 2. The model generation apparatus 1 builds, by machine learning, a prediction model 55F trained to be capable of predicting, from condition data relating to the cultivation condition of the plant of an arbitrary time, a feature that will appear in the condition data of a future time. On the other hand, the condition prediction apparatus 2F predicts the cultivation condition of the plant GF of a future time from condition data, utilizing the prediction model 55F. The predetermined data that is obtained in time series may be condition data, and the feature information 323 may relate to the cultivation condition of the plant GF that is specified from the condition data.

The cultivation condition of the plant GF relates to all elements for cultivating the plant GF, and may be specified by the growing environment up until the point of cultivation or the growth state, for example. The growing environment relates to the situation for growing the plant GF, such as the time for irradiating the plant GF with light, the ambient temperature of the plant GF, and the amount of the water to be given to the plant GF, for example. The growth state may be prescribed by the degree of growth of the plant GF, for example. The condition data is not particularly limited in terms of type, as long as it is data relating to the cultivation condition of the plant GF, and may be selected as appropriate according to the embodiment.

In this variation, a sensor SF is used, in order to monitor the cultivation condition of the plant GF. The sensor SF is not particularly limited in terms of type, as long as it is a sensor capable of monitoring the cultivation condition of the plant GF, and may be selected as appropriate according to the embodiment. The sensor SF may be a photometer, a temperature gauge, a hygrometer, or a camera, for example. The camera may be a general camera, a depth camera, or an infrared camera, for example. That is, in this variation, sensing data that is obtained by the sensor SF is utilized as an example of condition data.

The model generation apparatus 1 builds, by machine learning, the prediction model 55F trained to be capable of predicting, from condition data of an arbitrary time that is obtained by a sensor, a feature relating to the cultivation condition of the plant that will be specified by condition data of a future time. In other words, in this variation, the condition data that is obtained by the sensor SF is handled as the predetermined data to undergo processing for predicting events that can occur at a future time.

On the other hand, the condition prediction apparatus 2F is connected to the sensor SF. The condition prediction apparatus 2F acquires condition data by measuring the cultivation condition of the plant GF by the sensor SF. The condition prediction apparatus 2F then predicts a feature relating to the cultivation condition of the plant GF that will appear in the condition data of a future time from condition data of an arbitrary time, utilizing the trained prediction model 55F.

Note that, in this variation, the condition prediction apparatus 2F is, further, connected to a cultivation device RF and configured to be capable of controlling the operations of the cultivation device RF, according to the result of predicting the cultivation condition of the plant GF. The cultivation device RF is configured to cultivate the plant GF, by controlling the growing environment of the plant GF. The cultivation device RF is not particularly limited in terms of type, as long as it is a device capable of controlling the growing environment of the plant GF, and may be selected as appropriate according to the embodiment. The cultivation device RF may be a curtain device, a lighting device, an air conditioning facility, or a sprinkler device, for example. The curtain device is configured to open and close a curtain attached to a window of a building. The lighting device is an LED (light emitting diode) light or a fluorescent light, for example. The air conditioning facility is an air-conditioner, for example. This sprinkler device is a sprinkler, for example. The curtain device and the lighting device are utilized in order to control the time for irradiating the plant GF with light. The air conditioning facility is utilized in order to control the ambient temperature of the plant GF. The sprinkler device is utilized in order to control the amount of water that is provided to the plant GF.

Hardware Configuration of Condition Prediction Apparatus

Figure 23:
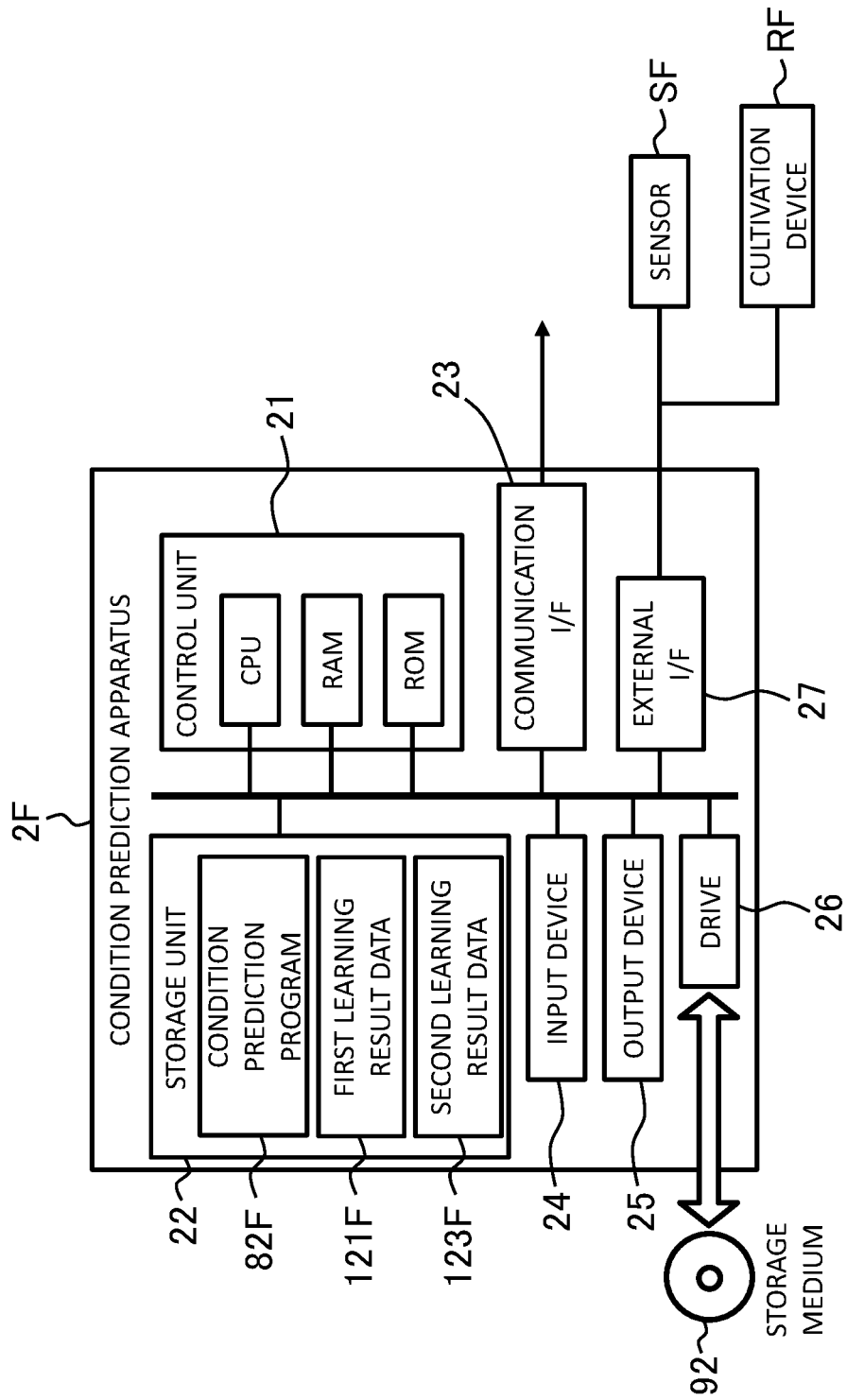
FIG. 23 schematically illustrates an example of the hardware configuration of a condition prediction apparatus according to another mode.

Next, an example of the hardware configuration of the condition prediction apparatus 2F according to this variation will be described, further using FIG. 23. FIG. 23 schematically illustrates an example of the hardware configuration of the condition prediction apparatus 2F according to this variation. The condition prediction apparatus 2F according to this variation is a computer in which a control unit 21, a storage unit 22, a communication interface 23, an input device 24, an output device 25, a drive 26 and an external interface 27 are electrically connected, similarly to the above prediction apparatus 2. The condition prediction apparatus 2F is connected to the sensor SF and the cultivation device RF via the external interface 27. The hardware configuration of the condition prediction apparatus 2F is not, however, limited to such an example. In relation to the specific hardware configuration of the condition prediction apparatus 2F, omission, substitution and addition of constituent elements are possible as appropriate, according to the embodiment. The condition prediction apparatus 2F may also be a general-purpose server device, a general-purpose PC, a PLC or the like, other than an information processing apparatus designed exclusively for the service that is provided.

The storage unit 22 of the condition prediction apparatus 2F according to this variation stores various information such as a condition prediction program 82F, first learning result data 121F and second learning result data 123F. The condition prediction program 82F, the first learning result data 121F and the second learning result data 123F correspond to the prediction program 82, the first learning result data 121 and the second learning result data 123 according to the above embodiment. At least one of the condition prediction program 82F, the first learning result data 121F and the second learning result data 123F may also be stored in the storage medium 92. The condition prediction apparatus 2F may also acquire at least one of the condition prediction program 82F, the first learning result data 121F and the second learning result data 123F from the storage medium 92.

Machine Learning of Estimator

Next, an example of processing procedures of machine learning of an estimator 51F in this variation will be described. As shown in FIG. 22, in this variation, the model generation apparatus 1 executes a series of processing relating to machine learning of the estimator 51F, similarly to the above embodiment, except for handling condition data relating to the cultivation condition of a plant as predetermined data.

That is, in step S101, the control unit 11 of the model generation apparatus 1 acquires a plurality of first learning datasets 31F to be used in machine learning of the estimator 51F. In this variation, the estimator 51F is provided with an encoder 52F and a decoder 53F, similarly to the estimator 51 according to the above embodiment. The encoder 52F and the decoder 53F are each constituted by a neural network, similarly to the above embodiment, and respectively operate similarly to the above encoder 52 and decoder 53.

The first learning datasets 31F correspond to the first learning datasets 31 according to the above embodiment. In this variation, each first learning dataset 31F is constituted by a combination of a sample 311F of condition data that is obtained in time series by a sensor and correct answer data 313F indicating a feature (correct answer) that appears in the sample 311F. The feature indicated by the correct answer data 313F may be the cultivation condition of a plant, for example.

Similarly to the above embodiment, the method of acquiring each first learning dataset 31F may be selected as appropriate. Also, each first learning dataset 31F may be generated as appropriate. For example, condition data is acquired in time series, by preparing a sensor of the same type as the sensor SF and a plant of the same type as the plant GF, and measuring the plant under various cultivation conditions with the prepared sensor. Next, the sample 311F is extracted as appropriate from the condition data obtained in time series. The correct answer data 313F indicating a feature that appears in the extracted sample 311F such as cultivation condition of the measured plant is then associated with the sample 311F. Each first learning dataset 31F can thereby be generated. When the plurality of first learning datasets 31F have been acquired, the control unit 11 advances the processing to the next step S102.

In step S102, the control unit 11 executes machine learning of the estimator 51F, using the plurality of first learning datasets 31F. In this variation, the control unit 11 trains the estimator 51F, by machine learning, to output an output value that matches the sample 311F and the correct answer data 313F from the decoder 53F when the sample 311F is input to the encoder 52F, for each first learning dataset 31F. The processing procedures of machine learning may be similar to the above embodiment. Through the process of this machine learning, the encoder 52F is trained to convert the sample 311F of condition data into a feature amount. Also, the decoder 53F is trained to restore the sample 311F from the feature amount obtained by the encoder 52F, and to estimate a feature included in the sample 311F. As a result, the control unit 11 is able to build an estimator 51F trained to output an output value that matches the sample 311F and the correct answer data 313F in response to input of the sample 311F, for each first learning dataset 31F. When machine learning of the estimator 51F has been completed, the control unit 11 advances the processing to the next step S103.

In step S103, the control unit 11 generates information indicating the structure and computational parameters of the trained estimator 51F built by machine learning, as the first learning result data 121F. The control unit 11 then saves the generated first learning result data 121F to a predetermined storage area. The control unit 11 thereby ends the series of processing relating to machine learning of the estimator 51F. Note that, similarly to the above embodiment, the first learning result data 121F relating to the decoder 53F may be provided to the condition prediction apparatus 2F at any suitable timing.

Machine Learning of Prediction Model

Next, an example of processing procedures of machine learning of the prediction model 55F and a discordance predictor 57F in this variation will be described. In this variation, the model generation apparatus 1 executes a series of processing relating to machine learning of the prediction model 55F and the discordance predictor 57F, similarly to the above embodiment, except for handling condition data relating to the cultivation condition of a plant as predetermined data.

That is, in step S201, the control unit 11 acquires a plurality of second learning datasets 32F each constituted by a combination of a first sample 321F of a first time of condition data that is obtained in time series and feature information 323F that is included in a second sample of a future time relative to the first time. The method of acquiring each second learning dataset 32F may be selected as appropriate, similarly to the above embodiment. Also, each second learning dataset 32F may be generated similarly to the above embodiment. The condition data from which the first sample 321F and the second sample are extracted may be the same as the condition data utilized in generation of each first learning dataset 31F. In this variation, the feature information 323F may also relate to the cultivation condition of the plant that is specified from the condition data. Also, the feature information 323F may be configured to include a feature amount of the second sample. The feature amount constituting the feature information 323F may also be provided by converting the second sample with the trained encoder 52F. A rarity degree 325F may be set as appropriate for each second learning dataset 32F. When the plurality of second learning datasets 32F have been acquired, the control unit 11 advances the processing to the next step S202.

In step S202, the control unit 11 executes machine learning of the prediction model 55F, using the plurality of second learning datasets 32F. The prediction model 55F may be constituted by a neural network, similarly to the prediction model 55 according to the above embodiment. The control unit 11 trains the prediction model 55F, by machine learning, to output an output value that matches the corresponding feature information 323F when the first sample 321F is input, for each second learning dataset 32F. In machine learning of this prediction model 55F, the control unit 11 trains more preponderantly on second learning datasets 32F having a higher rarity degree 325F. The method of training preponderantly may be similar to the above embodiment. The control unit 11 is thereby able to build the prediction model 55F trained to output an output value that matches the feature information 323F of the second time when the first sample 321F of the first time is input, for each second learning dataset 32F. When machine learning of the prediction model 55F has been completed, the control unit 11 advances the processing to the next step S203.

In step S203, the control unit 11 determines whether to repeat the processing of machine learning of the prediction model 55F and the discordance predictor 57F. The criterion for repeating machine learning may be similar to the above embodiment. If it is determined to repeat the processing of machine learning, the control unit 11 advances the processing to the next step S204. On the other hand, if it is determined to end the processing of machine learning, the control unit 11 advances the processing to the next step S207.

In step S204, the control unit 11 acquires a plurality of third learning datasets 33F each constituted by a combination of the first sample 321F of the first time of the corresponding second learning dataset 32F and a discordance 333F of prediction by the prediction model 55F with respect to the first sample 321F. The method of acquiring each third learning dataset 33F may be similar to the above embodiment. The trained prediction model 55F built in step S202 and the second learning datasets 32F may be utilized in generation of the respective third learning datasets 33F. When the plurality of third learning datasets 33F have been acquired, the control unit 11 advances the processing to the next step S205.

In step S205, the control unit 11 executes machine learning of the discordance predictor 57F, using the plurality of third learning datasets 33F. The control unit 11 trains the discordance predictor 57F, by machine learning, to output an output value that matches the corresponding discordance 333F when the first sample 321F is input, for each third learning dataset 33F. Unlike machine learning of the prediction model 55F, the control unit 11 trains uniformly on each third learning dataset 33F, independently of the rarity degree 325F, in this machine learning of the discordance predictor 57F. The method of training uniformly may be similar to the above embodiment. The control unit 11 is thereby able to build the discordance predictor 57F trained to output an output value that matches the discordance 333F of prediction by the prediction model 55F with respect to the first sample 321F when the first sample 321F of the first time is input, for each third learning dataset 33F. When machine learning of the discordance predictor 57F has been completed, the control unit 11 advances the processing to the next step S206.

In step S206, the control unit 11 sets (updates) the rarity degree 325F of each second learning dataset 32F, utilizing the trained discordance predictor 57F built in step S205. The method of setting the rarity degree 325F may be similar to the above embodiment. When setting of the rarity degree 325F has been completed, the control unit 11 returns the processing to step S202.

In step S207, the control unit 11 generates information indicating the structure and computational parameters of the trained prediction model 55F built by machine learning, as the second learning result data 123F. The control unit 11 then saves the generated second learning result data 123F to a predetermined storage area. The control unit 11 thereby ends the series of processing relating to machine learning of the prediction model 55F and the discordance predictor 57F. Note that, similarly to the above embodiment, the second learning result data 123F may be provided to the condition prediction apparatus 2F at any suitable timing.

Prediction Processing

Next, an example of prediction processing of the condition prediction apparatus 2F will be described, using FIG.

Figure 24:
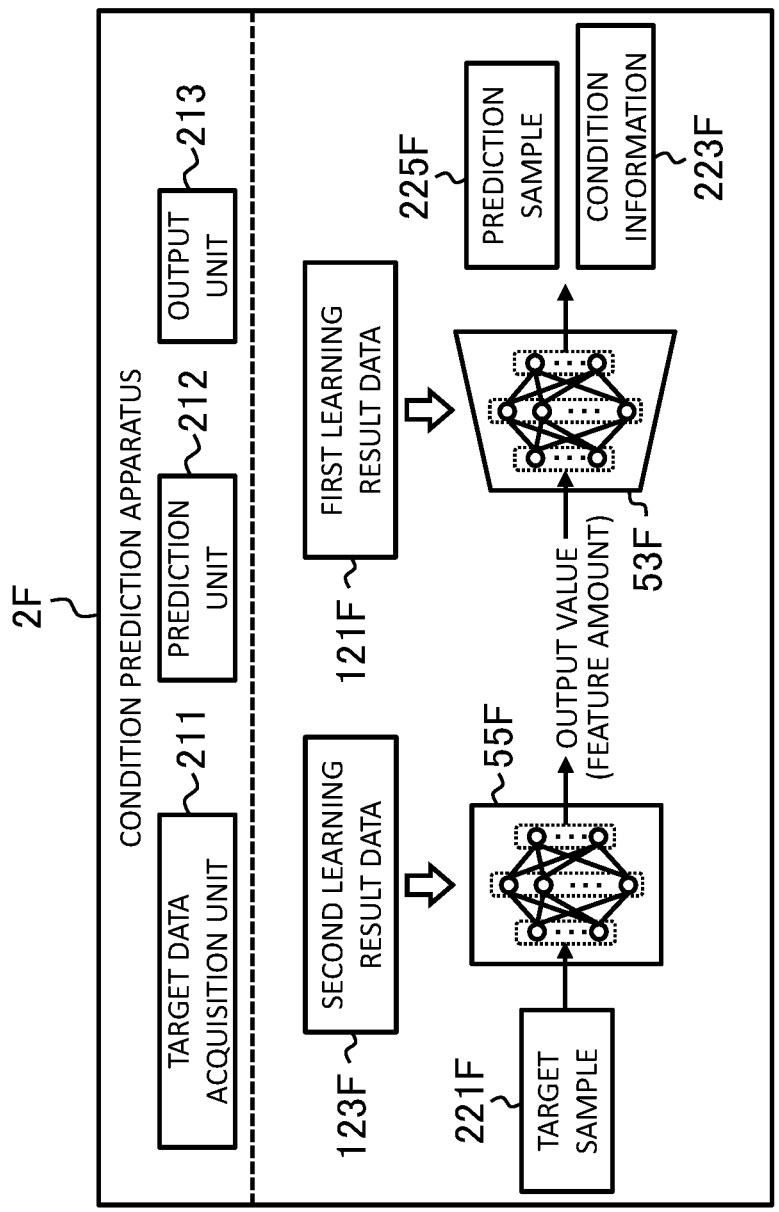
FIG. 24 schematically illustrates an example of the software configuration of the condition prediction apparatus according to the other mode.

24. FIG. 24 schematically illustrates an example of the software configuration relating to the prediction processing of the condition prediction apparatus 2F according to this variation. Similarly to the above embodiment, the software configuration relating to the prediction processing of the condition prediction apparatus 2F is realized by execution of the condition prediction program 82F by the control unit 21. As shown in FIG. 24, the software configuration relating to the prediction processing of the condition prediction apparatus 2F is similar to the software configuration of the above prediction apparatus 2, except for handling condition data relating to the cultivation condition of a plant as predetermined data. The condition prediction apparatus 2F thereby executes the series of processing relating to the prediction processing, similarly to the above prediction apparatus 2.

That is, in step S301, the control unit 21 of the condition prediction apparatus 2F acquires a target sample 221F of condition data from the sensor SF. In step S302, the control unit 21 configures the settings of the trained prediction model 55F, with reference to the second learning result data 123F. Also, the control unit 21 configures the settings of the decoder 53F of the trained estimator 51F, with reference to the first learning result data 121F. Next, the control unit 21 inputs the acquired target sample 221F to the prediction model 55F, and executes computational processing of the prediction model 55F. As a result of this computational processing, the control unit 21 predicts feature information (feature amount) of condition data of a future time from the target sample 221F. Furthermore, the control unit 21 inputs the output value of the prediction model 55F to the decoder 53F, and executes computational processing of the decoder 53F. The control unit 21 thereby restores a prediction sample 225F from the feature amount predicted by the prediction model 55F, and acquires an output value corresponding to the result of predicting a feature that will appear in the condition data of a future time from the decoder 53F. In this variation, the feature that is predicted can include condition information 223F indicating the cultivation condition of the plant GF that is specified from the condition data. When prediction of a future feature from the target sample 221F has been completed, the control unit 21 advances the processing to the next step S303.

In step S303, the control unit 21 outputs information relating to the prediction result (condition information 223F and prediction sample 225F). The output destination and the contents of the information that is output may be determined as appropriate according to the embodiment. For example, the control unit 21 may also output the condition information 223F and prediction sample 225F that were obtained directly to the output device 25. For example, the control unit 21 may also execute information processing of some sort, based on the prediction result. The control unit 21 may then also output the result of executing that information processing as information relating to the prediction result.

As an example of the information processing, the control unit 21 may determine a control instruction that is given to the cultivation device RF, according to the predicted cultivation condition that is indicated by the condition information 223F. The correspondence relationship between the cultivation condition and the control instruction may also be provided by reference information in table format or the like. This reference information may also be saved in a predetermined storage areas such as the storage unit 22, the storage medium 92, an external storage device, storage media or the like. The control unit 21 may determine the control instruction according to the predicted cultivation condition, by referring to this reference information. The control unit 21 may then also control the operations of the cultivation device RF, by giving the determined control instruction to the cultivation device RF. For example, the control unit 21 may also output information indicating the determined control instruction to the output device 25, and prompt a manager of the plant GF to control the operations of the cultivation device RF.

According to this variation, in a scenario where the cultivation condition of the plant GF is predicted, the prediction model 55F capable of accurately predicting rare events can be built. Through machine learning that utilizes the above rarity degree 325F, for example, the prediction model 55F is built to be capable of predicting events that can occur irregularly such as the cultivation condition of the plant GF changing suddenly, with an accuracy comparable to events that can have regularity such as the cultivation condition of the plant GF changing gradually. Thus, the condition prediction apparatus 2F is able to accurately predict changes in the cultivation condition of the plant GF such as the above that can occur irregularly, by utilizing this prediction model 55F. It thereby becomes possible to appropriately control the growing environment of the plant GF.

(F) Scenario where Amount of Power Generation is Predicted

Figure 25:
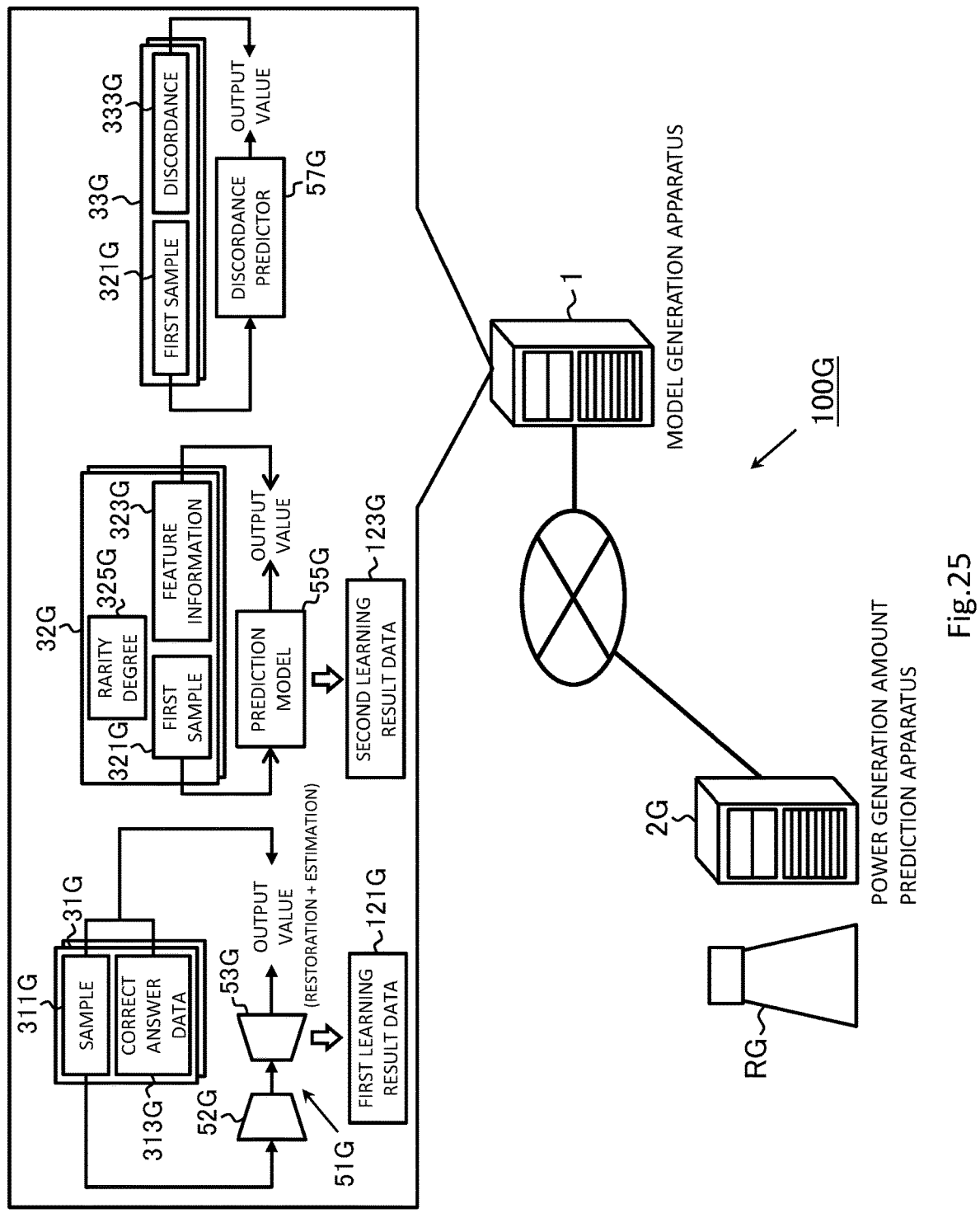
FIG. 25 schematically illustrates an example of another scenario in which the present invention is applied.

FIG. 25 schematically illustrates an example of an application scenario of a prediction system 100G according to a sixth variation. This variation is an example in which the above embodiment is applied to a scenario where the amount of power generation in a power generation facility RG is predicted. As shown in FIG. 25, the prediction system 100G according to this variation is provided with the model generation apparatus 1 and a power generation amount prediction apparatus 2G. Similarly to the above embodiment, the model generation apparatus 1 and the power generation amount prediction apparatus 2G may be connected to each other via a network.

The prediction system 100G according to this variation may be constituted similarly to the above embodiment, except for the data that is handled being different. The power generation amount prediction apparatus 2G corresponds to the above prediction apparatus 2. The power generation amount prediction apparatus 2G may be constituted similarly to the above prediction apparatus 2. The type of power generation facility RG is not particularly limited, and may be selected as appropriate according to the embodiment. The power generation facility RG may be solar power generation facility, for example.

In this variation, the amount of power generation in the power generation facility RG is predicted, based on related data that is related to power generation of the power generation facility RG. The related data is not particularly limited in terms of type as long as it is data that can relate to power generation of the power generation facility RG, and may be selected as appropriate according to the embodiment. The related data may be meteorological data relating to the weather such as climate, temperature, precipitation, humidity and wind volume, for example.

The model generation apparatus 1 builds, by machine learning, a prediction model 55G trained to be capable of predicting, from related data of an arbitrary time, a feature relating to the amount of power generation in the power generation facility that will be specified by related data of a future time. In other words, in this variation, the related data that is related to power generation of the power generation facility RG is an example of "predetermined data that is obtained in time series" of the present invention, and is handled as the predetermined data to undergo processing for predicting events that can occur at a future time.

On the other hand, the power generation amount prediction apparatus 2G acquires related data that is related to power generation of the power generation facility RG as appropriate. The power generation amount prediction apparatus 2G then predicts a feature relating to the amount of power generation in the power generation facility RG that will appear in the related data of a future time from related data of an arbitrary time, utilizing the trained prediction model 55G.

Hardware Configuration of Power Generation Amount Prediction Apparatus

Figure 26:
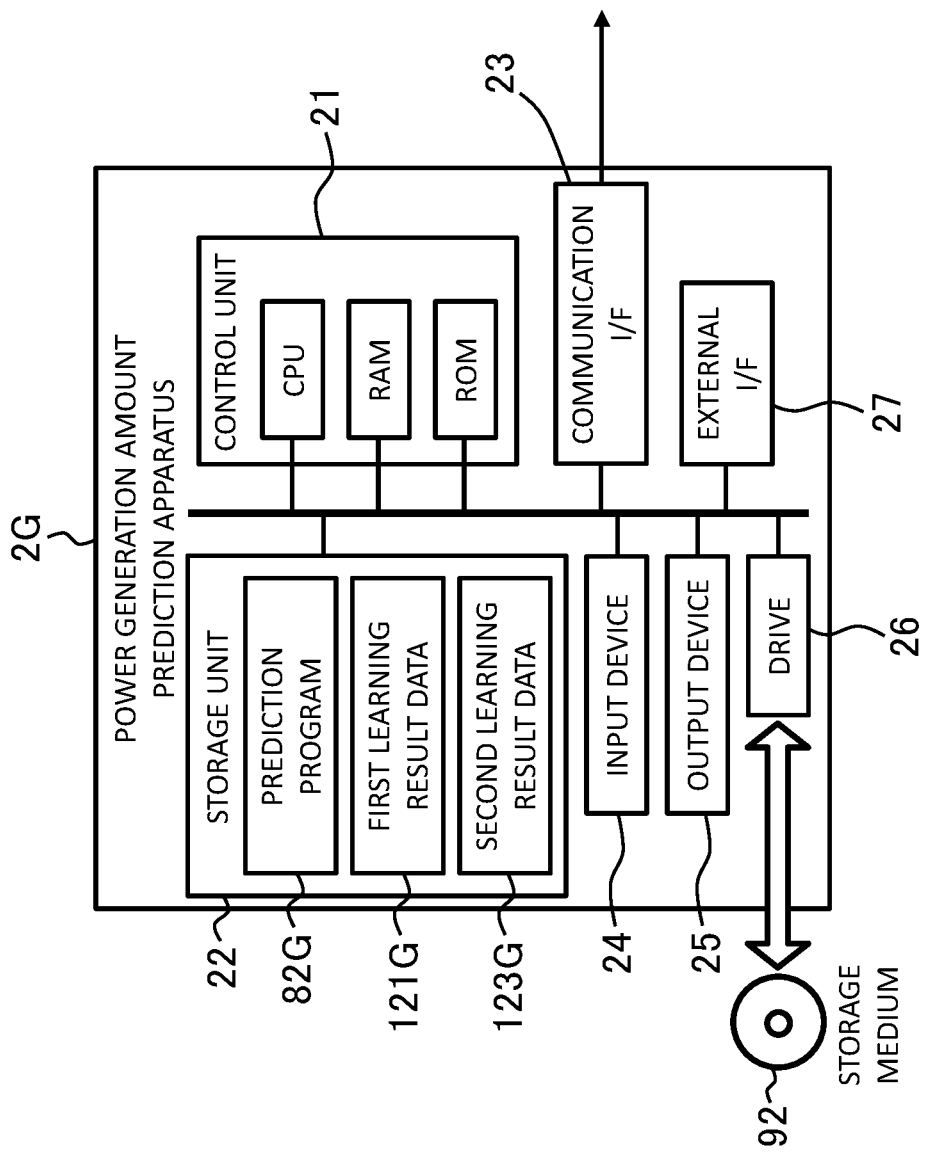
FIG. 26 schematically illustrates an example of the hardware configuration of a power generation amount prediction apparatus according to another mode.

Next, an example of the hardware configuration of the power generation amount prediction apparatus 2G according to this variation will be described, further using FIG. 26. FIG. 26 schematically illustrates an example of the hardware configuration of the power generation amount prediction apparatus 2G according to this variation. The power generation amount prediction apparatus 2G according to this variation is a computer in which a control unit 21, a storage unit 22, a communication interface 23, an input device 24, an output device 25, a drive 26 and an external interface 27 are electrically connected, similarly to the above prediction apparatus 2. The hardware configuration of the power generation amount prediction apparatus 2G is not, however, limited to such an example. In relation to the specific hardware configuration of the power generation amount prediction apparatus 2G, omission, substitution and addition of constituent elements are possible as appropriate, according to the embodiment. The power generation amount prediction apparatus 2G may also be a general-purpose server device, a general-purpose PC or the like, other than an information processing apparatus designed exclusively for the service that is provided.

The storage unit 22 of the power generation amount prediction apparatus 2G according to this variation stores various information such as a prediction program 82G, first learning result data 121G and second learning result data 123G. The prediction program 82G, the first learning result data 121G and the second learning result data 123G correspond to the prediction program 82, the first learning result data 121 and the second learning result data 123 according to the above embodiment. At least one of the prediction program 82G, the first learning result data 121G and the second learning result data 123G may also be stored in the storage medium 92. The power generation amount prediction apparatus 2G may also acquire at least one of the prediction program 82G, the first learning result data 121G and the second learning result data 123G from the storage medium 92.

Machine Learning of Estimator

Next, an example of processing procedures of machine learning of an estimator 51G in this variation will be described. As shown in FIG. 25, in this variation, the model generation apparatus 1 executes a series of processing relating to machine learning of the estimator 51G, similarly to the above embodiment, except for handling related data that is related to power generation of a power generation facility as predetermined data.

That is, in step S101, the control unit 11 of the model generation apparatus 1 acquires a plurality of first learning datasets 31G to be used in machine learning of the estimator 51G. In this variation, the estimator 51G is provided with an encoder 52G and a decoder 53G, similarly to the estimator 51 according to the above embodiment. The encoder 52G and the decoder 53G are each constituted by a neural network, similarly to the above embodiment, and respectively operate similarly to the above encoder 52 and decoder 53.

The first learning datasets 31G correspond to the first learning datasets 31 according to the above embodiment. In this variation, each first learning dataset 31G is constituted by a combination of a sample 311G of related data that is obtained in time series and correct answer data 313G indicating a feature (correct answer) that appears in the sample 311G. The feature indicated by the correct answer data 313G may be the amount of power generation in the power generation facility, for example.

Similarly to the above embodiment, the method of acquiring each first learning dataset 31G may be selected as appropriate. Also, each first learning dataset 31G may be generated as appropriate. For example, related data is acquired in time series under various power generation conditions, along with the amount of power generation in a power generation facility of the same type as the power generation facility RG. The amount of power generation may be provided by a sensor of the power generation facility, an input of the operator or the like. Next, the sample 311G is extracted as appropriate from the related data obtained in time series. The correct answer data 313G indicating a feature that appears in the sample 311G such as the amount of power generation in the power generation facility is then associated with the extracted sample 311G. Each first learning dataset 31G can thereby be generated. When the plurality of first learning datasets 31G have been acquired, the control unit 11 advances the processing to the next step S102.

In step S102, the control unit 11 executes machine learning of the estimator 51G, using the plurality of first learning datasets 31G. In this variation, the control unit 11 trains the estimator 51G, by machine learning, to output an output value that matches the sample 311G and the correct answer data 313G from the decoder 53G when the sample 311G is input to the encoder 52G, for each first learning dataset 31G. The processing procedures of machine learning may be similar to the above embodiment. Through the process of this machine learning, the encoder 52G is trained to convert the sample 311G of related data into a feature amount. Also, the decoder 53G is trained to restore the sample 311G from the feature amount obtained by the encoder 52G, and to estimate a feature included in the sample 311G. As a result, the control unit 11 is able to build an estimator 51G trained to output an output value that matches the sample 311G and the correct answer data 313G in response to input of the sample 311G, for each first learning dataset 31G. When machine learning of the estimator 51G has been completed, the control unit 11 advances the processing to the next step S103.

In step S103, the control unit 11 generates information indicating the structure and computational parameters of the trained estimator 51G built by machine learning, as the first learning result data 121G. The control unit 11 then saves the generated first learning result data 121G to a predetermined storage area. The control unit 11 thereby ends the series of processing relating to machine learning of the estimator 51G. Note that, similarly to the above embodiment, the first learning result data 121G relating to the decoder 53G may be provided to the power generation amount prediction apparatus 2G at any suitable timing.

Machine Learning of Prediction Model

Next, an example of processing procedures of machine learning of the prediction model 55G and a discordance predictor 57G in this variation will be described. In this variation, the model generation apparatus 1 executes a series of processing relating to machine learning of the prediction model 55G and the discordance predictor 57G, similarly to the above embodiment, except for handling related data that is related to power generation of a power generation facility as predetermined data.

That is, in step S201, the control unit 11 acquires a plurality of second learning datasets 32G each constituted by a combination of a first sample 321G of a first time of related data that is obtained in time series and feature information 323G that is included in a second sample of a future time relative to the first time. The method of acquiring each second learning dataset 32G may be selected as appropriate, similarly to the above embodiment. Also, each second learning dataset 32G may be generated similarly to the above embodiment. The related data from which the first sample 321G and the second sample are extracted may be the same as the related data utilized in generation of each first learning dataset 31G. In this variation, the feature information 323G may also relate to the amount of power generation in the power generation facility that is specified from the related data. Also, the feature information 323G may be configured to include a feature amount of the second sample. The feature amount constituting the feature information 323G may also be provided by converting the second sample with the trained encoder 52G. A rarity degree 325G may be set as appropriate for each second learning dataset 32G. When the plurality of second learning datasets 32G have been acquired, the control unit 11 advances the processing to the next step S202.

In step S202, the control unit 11 executes machine learning of the prediction model 55G, using the plurality of second learning datasets 32G. The prediction model 55G may be constituted by a neural network, similarly to the prediction model 55 according to the above embodiment. The control unit 11 trains the prediction model 55G, by machine learning, to output an output value that matches the corresponding feature information 323G when the first sample 321G is input, for each second learning dataset 32G. In machine learning of this prediction model 55G, the control unit 11 trains more preponderantly on second learning datasets 32G having a higher rarity degree 325G. The method of training preponderantly may be similar to the above embodiment. The control unit 11 is thereby able to build the prediction model 55G trained to output an output value that matches the feature information 323G of the second time when the first sample 321G of the first time is input, for each second learning dataset 32G. When machine learning of the prediction model 55G has been completed, the control unit 11 advances the processing to the next step S203.

In step S203, the control unit 11 determines whether to repeat the processing of machine learning of the prediction model 55G and the discordance predictor 57G. The criterion for repeating machine learning may be similar to the above embodiment. If it is determined to repeat the processing of machine learning, the control unit 11 advances the processing to the next step S204. On the other hand, if it is determined to end the processing of machine learning, the control unit 11 advances the processing to the next step S207.

In step S204, the control unit 11 acquires a plurality of third learning datasets 33G each constituted by a combination of the first sample 321G of the first time of the corresponding second learning dataset 32G and a discordance 333G of prediction by the prediction model 55G with respect to the first sample 321G. The method of acquiring each third learning dataset 33G may be similar to the above embodiment. The trained prediction model 55G built in step S202 and the second learning datasets 32G may be utilized in generation of the respective third learning datasets 33G. When the plurality of third learning datasets 33G have been acquired, the control unit 11 advances the processing to the next step S205.

In step S205, the control unit 11 executes machine learning of the discordance predictor 57G, using the plurality of third learning datasets 33G. The control unit 11 trains the discordance predictor 57G, by machine learning, to output an output value that matches the corresponding discordance 333G when the first sample 321G is input, for each third learning dataset 33G. Unlike machine learning of the prediction model 55G, the control unit 11 trains uniformly on each third learning dataset 33G, independently of the rarity degree 325G, in this machine learning of the discordance predictor 57G. The method of training uniformly may be similar to the above embodiment. The control unit 11 is thereby able to build the discordance predictor 57G trained to output an output value that matches the discordance 333G of prediction by the prediction model 55G with respect to the first sample 321G when the first sample 321G of the first time is input, for each third learning dataset 33G. When machine learning of the discordance predictor 57G has been completed, the control unit 11 advances the processing to the next step S206.

In step S206, the control unit 11 sets (updates) the rarity degree 325G of each second learning dataset 32G, utilizing the trained discordance predictor 57G built in step S205. The method of setting the rarity degree 325G may be similar to the above embodiment. When setting of the rarity degree 325G has been completed, the control unit 11 returns the processing to step S202.

In step S207, the control unit 11 generates information indicating the structure and computational parameters of the trained prediction model 55G built by machine learning, as the second learning result data 123G. The control unit 11 then saves the generated second learning result data 123G to a predetermined storage area. The control unit 11 thereby ends the series of processing relating to machine learning of the prediction model 55G and the discordance predictor 57G. Note that, similarly to the above embodiment, the second learning result data 123G may be provided to the power generation amount prediction apparatus 2G at any suitable timing.

Prediction Processing

Figure 27:
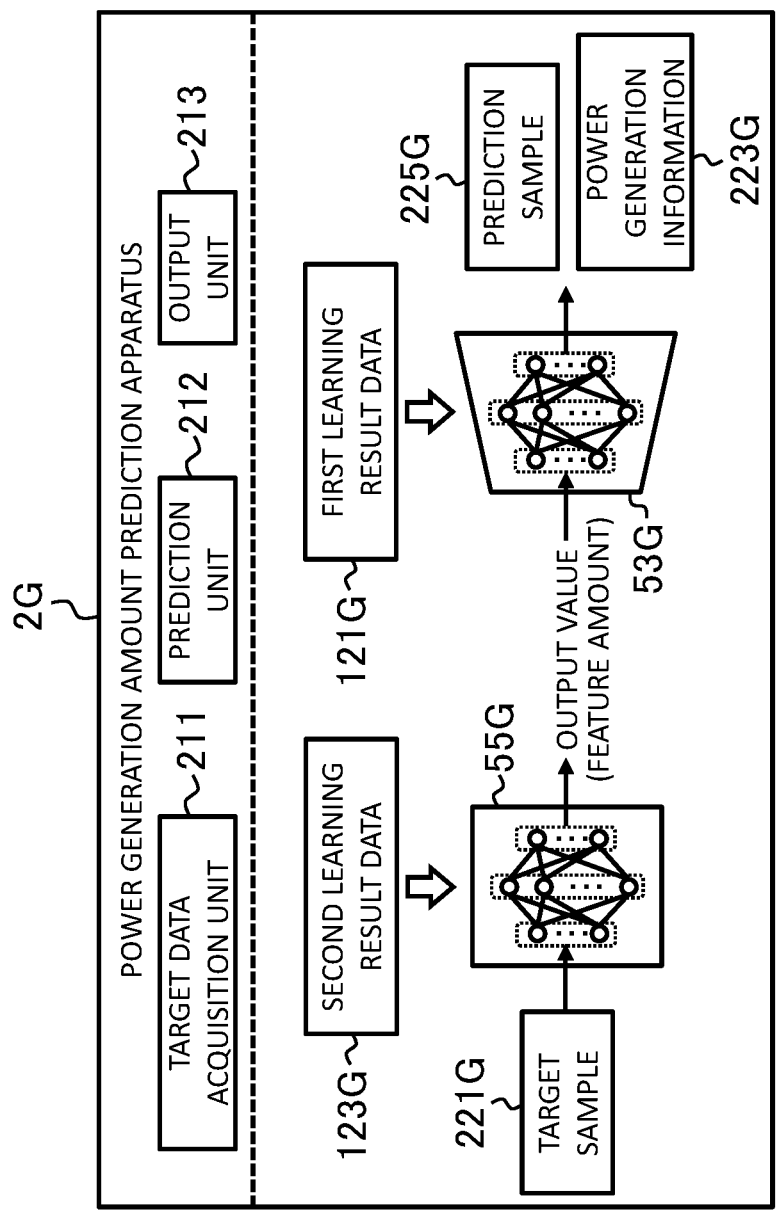
FIG. 27 schematically illustrates an example of the software configuration of the power generation amount prediction apparatus according to the other mode.

Next, an example of prediction processing of the power generation amount prediction apparatus 2G will be described, using FIG. 27. FIG. 27 schematically illustrates an example of the software configuration relating to the prediction processing of the power generation amount prediction apparatus 2G according to this variation. Similarly to the above embodiment, the software configuration relating to the prediction processing of the power generation amount prediction apparatus 2G is realized by execution of the prediction program 82G by the control unit 21. As shown in FIG. 27, the software configuration relating to the prediction processing of the power generation amount prediction apparatus 2G is similar to the software configuration of the above prediction apparatus 2, except for handling related data that is related to power generation of a power generation facility as predetermined data. The power generation amount prediction apparatus 2G thereby executes the series of processing relating to the prediction processing, similarly to the above prediction apparatus 2.

That is, in step S301, the control unit 21 of the power generation amount prediction apparatus 2G acquires a target sample 221G of related data as appropriate. The method of acquiring related data is not particularly limited, and may be selected as appropriate according to the embodiment. In the case of handling meteorological data as related data, for example, the control unit 21 may acquire the target sample 221G from a known meteorological data server. When the target sample 221G has been acquired, the control unit 21 advances the processing to the next step S302.

In step S302, the control unit 21 configures the settings of the trained prediction model 55G, with reference to the second learning result data 123G. Also, the control unit 21 configures the settings of the decoder 53G of the trained estimator 51G, with reference to the first learning result data 121G. Next, the control unit 21 inputs the acquired target sample 221G to the prediction model 55G, and executes computational processing of the prediction model 55G. As a result of this computational processing, the control unit 21 predicts feature information (feature amount) of related data of a future time from the target sample 221G. Furthermore, the control unit 21 inputs the output value of the prediction model 55G to the decoder 53G, and executes computational processing of the decoder 53G. The control unit 21 thereby restores a prediction sample 225G from the feature amount predicted by the prediction model 55G, and acquires an output value corresponding to the result of predicting a feature that will appear in the related data of a future time from the decoder 53G. In this variation, the feature that is predicted can include power generation information 223G indicating the amount of power generation in the power generation facility RG that is specified from the related data. When prediction of a future feature from the target sample 221G has been completed, the control unit 21 advances the processing to the next step S303.

In step S303, the control unit 21 outputs information relating to the prediction result (power generation information 223G and prediction sample 225G). The output destination and the contents of the information that is output may be determined as appropriate according to the embodiment. For example, the control unit 21 may also output the power generation information 223G and prediction sample 225G that were obtained directly to the output device 25. For example, the control unit 21 may also execute information processing of some sort, based on the prediction result. The control unit 21 may then also output the result of executing that information processing as information relating to the prediction result.

As an example of the information processing, the control unit 21 may compare the amount of power generation that is predicted in the power generation facility RG shown by the power generation information 223G with a threshold value. The threshold value may be set as appropriate. The control unit 21 may then output a message prompting power generation by another power generation facility to the output device 25, in the case where the power generation that is predicted is less than or equal to the threshold value.

According to this variation, a prediction model 55G can be built that, in a scenario where the amount of power generation in the power generation facility RG is predicted, is capable of accurately predicting rare events. Through machine learning that utilizes the above rarity degree 325G, for example, the prediction model 55G is built to be capable of predicting events that can occur irregularly such as the amount of power generation in the power generation facility RG changing suddenly due to a rapid change in the weather, with an accuracy comparable to events that can have regularity such as the amount of power generation changing gradually. Thus, the power generation amount prediction apparatus 2G is able to accurately predict changes in the amount of power generation in the power generation facility RG such as the above that can occur irregularly, by utilizing this prediction model 55G. The amount of power generation can thereby be managed appropriately.

4.2

In the above embodiment, the prediction model 55 is built to predict the feature information 323 of the second sample 322 from the first sample 321. Also, the feature information 323 is constituted by a feature amount that is obtained by converting the second sample 322 with the trained encoder 52. However, the respective configurations of the prediction model 55 and the feature information 323 is not limited to such an example, and may be selected as appropriate according to the embodiment. The feature amount constituting the feature information 323 need not originate from the encoder 52. The feature information 323 may be provided in a format other than a feature amount. For example, the feature information 323 may also be constituted to directly show a feature that appears in the second sample 322, similarly to the correct answer data 313. In this case, the estimator 51 need not be divided into an encoder and a decoder, and restoration of samples may be omitted in the estimator 51. In other words, in the above step S102, the estimator 51 may be trained to output an output value that matches the correct answer data 313 when the sample 311 is input, for each first learning dataset 31. The feature information 323 may also be provided through input by the operator. Alternatively, the feature information 323 may also be provided by the result of estimating the second sample 322. For example, the feature information 323 may also be constituted by an output value (estimation result) that is output from the trained estimator 51, by inputting the second sample 322 to the trained estimator 51. Also, the prediction apparatus 2 may derive the feature 223 directly with the prediction model 55, without utilizing the decoder 53. In other words, in the above step S302, the control unit 21 may also acquire the output value that is output from the prediction model 55 as the prediction result, by inputting the target sample 221 to the prediction model 55. In the above step S303, the control unit 21 may then also output this prediction result directly to the output device 25. Alternatively, in the above step S303, the control unit 21 may also execute information processing of some sort, based on this prediction result, and output the result of executing that information processing as information relating to the prediction result.

Also, the prediction model 55 may also be built to predict the second sample 322 from the first sample 321. In this case, each second learning dataset 32 may also include the second sample 322 as teaching data together with the feature information 323 or instead of the feature information 323. That is, the model generation apparatus 1 according to the above embodiment may also acquire a plurality of learning datasets each constituted by a combination of the first sample 321 of the first time and at least one of the second sample 322 of the second time and the feature information 323 included in the second sample 322. The model generation apparatus 1 may then build, by machine learning, a prediction model trained to predict, from the first sample 321, at least one of the corresponding second sample 322 and feature information 323, for each learning dataset. These modifications may also be similarly applied to each of the prediction systems 100A to 100G according to the above variations.

Figure 28:
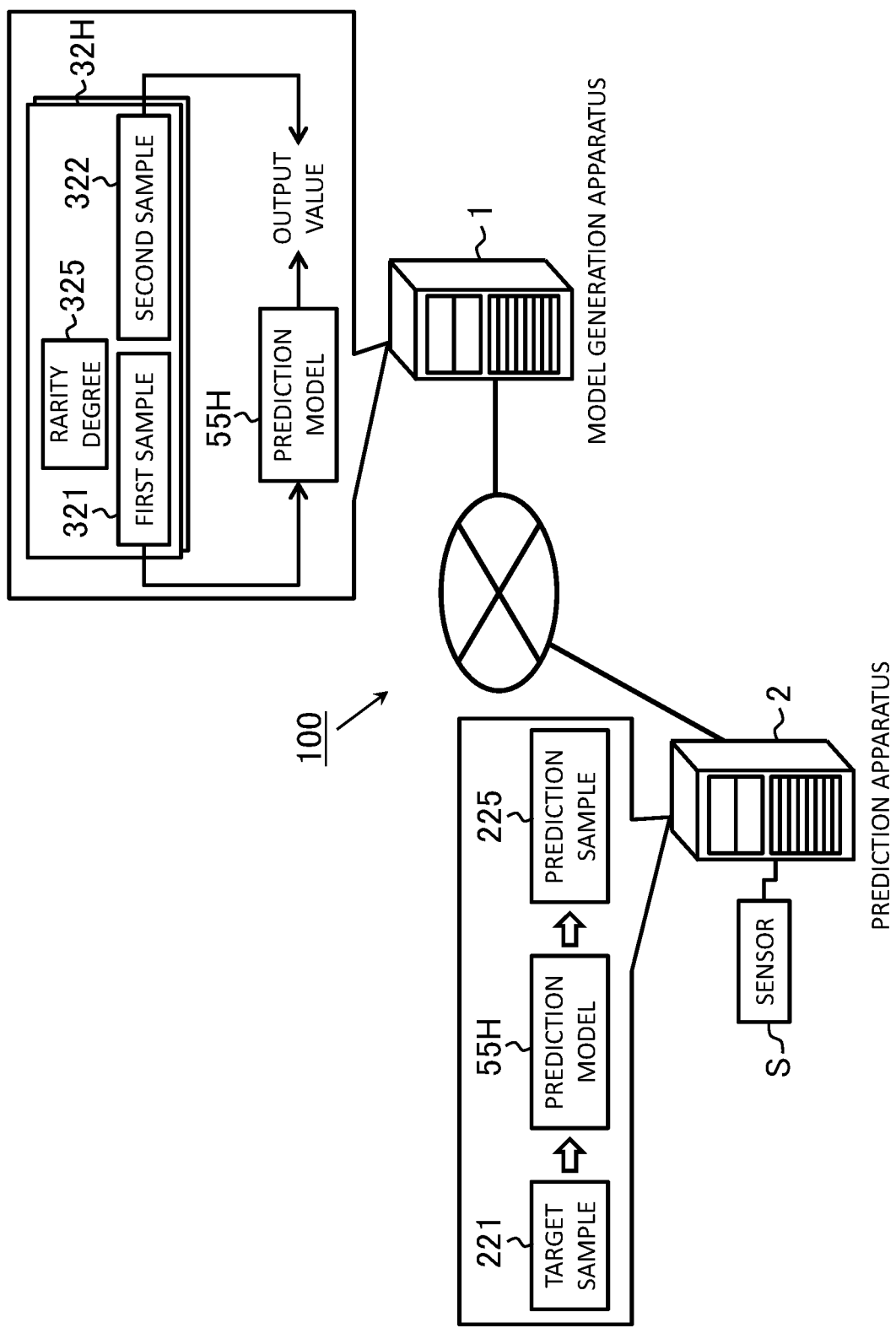
FIG. 28 schematically illustrates an example of another scenario in which the present invention is applied.

FIG. 28 schematically shows a variation in which the feature information 323 is replaced by the second sample 322. In this variation, the model generation apparatus 1, in the above step S201, acquires a plurality of learning datasets 32H each constituted by a combination of the first sample 321 and the second sample 322. The learning datasets 32H correspond to the second learning datasets 32 according to the above embodiment. In step S202, the model generation apparatus 1 trains the prediction model 55H, by machine learning, to output an output value that matches the corresponding second sample 322 when the first sample 321 is input, for each learning dataset 32H. The prediction model 55H may be constituted by a neural network, similarly to the prediction model 55 according to the above embodiment. In this case, the prediction apparatus 2, in the above step S302, predicts the prediction sample 225 from the target sample 221, utilizing the trained prediction model 55H. The prediction apparatus 2 may also estimate a future event, utilizing this prediction sample 225.

4.3

In the above embodiment, the processing of the respective machine learning of the estimator 51, the prediction model 55 and the discordance predictor 57 is executed by the same computer. However, the processing at least of one of the respective machine learning of the estimator 51, the prediction model 55 and the discordance predictor 57 may also be executed by a different computer to the processing of other machine learning. In this case, the computer that executes the machine learning of the prediction model 55 may be referred to as a "model generation apparatus". This modification may also be similarly applied to each of the prediction systems 100A to 100G according to the above variations.

4.4

In the above embodiment, the discordance predictor 57 is utilized in setting the rarity degree 325 of each second learning dataset 32. The rarity degree 325 is thereby set according to the extent of irregularity with which the feature information 323 appears in the predetermined data. However, the method of setting the rarity degree 325 is not limited to such an example. The rarity degree 325 may also be set without utilizing the discordance predictor 57. For example, the rarity degree 325 may be manually set by the operator or the like, or may be automatically set based on an indicator of some sort.

In the case of manually setting the rarity degree 325, the control unit 11 may receive input of the rarity degree 325 that is set for each second learning dataset 32 at any suitable timing, after acquiring each first sample 321. The operator may also determine the value of each rarity degree 325, based on the discordance between the output value of the prediction model 55 of step S202 and the feature information 323. Alternatively, the operator may determine the value of each rarity degree 325, according to a feature that appears in the second sample 322. A known input method such as a character input or audio input may be used to input the rarity degree 325. The input device 14 may be constituted by a microphone or a keyboard, for example.

In the case of automatically setting the rarity degree 325, the control unit 11 may determine the value of the rarity degree 325 that is set for each second learning dataset 32, based on an indicator of some sort, at any suitable timing, after acquiring each first sample 321. As an example of a method of automatic setting based on an indicator, the rarity degree 325 may be set depending on the frequency of appearance, the probability of appearance or the like of a feature or the feature information 323 that appears in the second sample 322. For example, the control unit 11 may also calculate the frequency of appearance or the probability of appearance of a feature or the feature information 323 that appears in the second sample 322, based on the obtained plurality of second learning datasets 32. The control unit 11 may then also set the value of each rarity degree 325, according to the calculated frequency of appearance or probability of appearance. That is, the control unit 11 may set the rarity degree 325 to a higher value as the calculated frequency of appearance or probability of appearance decreases, and set the rarity degree 325 to a lower value as the calculated frequency of appearance or appearance probability increases. Alternatively, the control unit 11 may also estimate, according to a feature or the feature information 323 that appears in each second sample 322, the extent of irregularity thereof, and set the value of each rarity degree 325, based on the estimation result. As an example, a scenario is envisaged in which the feature that appears in each second sample 322 is the reaction of a person such as his or her facial expression, voice or movement, for example. In this scenario, in the case where a person behaves in manner that rapidly changes such as looking surprised, shouting out or suddenly starting to run, for example, the extent of irregularity of that feature can be estimated to be high. On the other hand, in the case where there is little change in the behavior of the person, the extent of irregularity of that feature can be estimated to be low. In view of this, the control unit 11 may also measure the reaction of a person with a sensor such as an image sensor or a sound sensor, and measure the transition of the reaction of the person such as the degree of change in facial expression or the intonation of voice, for example, from the obtained measurement data. A known method such as facial expression estimation through image analysis or affect estimation through voice analysis, for example, may also be adopted as the method of measuring the transition of the reaction of a person. The control unit 11 may then also estimate the extent of irregularity of that feature, based on the result of measurement, and determine the value of the rarity degree 325 set for each second sample 322, based on the estimation result. With these methods, the rarity degree 325 can be set according to the extent of irregularity with which a feature or the feature information 323 appears in the predetermined data. This modification may be similarly applied to each of the prediction systems 100A to 100G according to the above variations.

4.5

The estimator 51 (encoder 52 and the decoder 53), the prediction model 55 and the discordance predictor 57 are each constituted by a fully connected neural network having a multilayer structure. However, the structure and type of the neural network constituting each of the estimator 51, the prediction model 55 and the discordance predictor 57 is not limited to such an example, and may be selected as appropriate according to the embodiment. For example, the estimator 51, the prediction model 55 and the discordance predictor 57 may each be constituted by a convolutional neural network provided with a convolutional layer, a pooling layer and a fully connected layer. Also, for example, the estimator 51, the prediction model 55 and the discordance predictor 57 may each be constituted by the recurrent neural network. Also, a learning model other than a neural network may be utilized for at least one of the estimator 51, the prediction model 55 and the discordance predictor 57.

Also, at least one of the estimator 51 and the discordance predictor 57 may be omitted. In the case where the feature information 323 directly shows a feature that appears in the second sample 322, as in the above variation, for example, the estimator 51 may be omitted. In the case where the estimator 51 is omitted, the first data acquisition unit 111, the first learning processing unit 112 and the first save processing unit 113 may also be omitted from the software configuration of the model generation apparatus 1. Also, in the case of setting the rarity degree 325 without utilizing the discordance predictor 57, as the above variation, for example, the discordance predictor 57 may be omitted. In the case where the discordance predictor 57 is omitted, the third data acquisition unit 117 and the third learning processing unit 118 may also be omitted from the software configuration of the model generation apparatus 1. In this case, the rarity degree setting unit 119 may also set the rarity degree 325 of each second learning dataset 32 with the above method that does not utilize the discordance predictor 57. Also, in the case where the rarity degree 325 of each second learning dataset 32 is set in advance, the rarity degree setting unit 119 may also be omitted from the software configuration of the model generation apparatus 1. These modifications may be similarly applied to each of the prediction systems 100A to 100G according to the above variations.

REFERENCE SIGNS LIST

1 Model generation apparatus
11 Control unit
12 Storage unit
13 Communication interface
14 Input device
15 Output device
16 Drive
111 First data acquisition unit
112 First learning processing unit
113 First save processing unit
114 Second data acquisition unit
115 Second learning processing unit
116 Second save processing unit
117 Third data acquisition unit
118 Third learning processing unit
119 Rarity degree setting unit
121 First learning result data
123 Second learning result data
81 Model generation program
91 Storage medium
2 Prediction apparatus
21 Control unit
22 Storage unit
23 Communication interface
24 Input device
25 Output device
26 Drive
27 External interface
211 Target data collection unit
212 Prediction unit
213 Output unit
221 Target sample
223 Feature
225 Prediction sample
82 prediction program
92 Storage medium
S Sensor
31 First learning dataset
311 Sample
313 Correct answer data
32 Second learning dataset
321 First sample
322 Second sample
323 Feature information
325 Rarity degree
33 Third learning dataset
333 Discordance
51 Estimator
52 Encoder
521 Input layer
522 Middle (hidden) layer
523 Output layer
53 Decoder
531 Input layer
532 Middle (hidden) layer
533 Output layer
55 Prediction model
551 Input layer
552 Middle (hidden) layer
553 Output layer
57 Discordance predictor
571 Input layer
572 Middle (hidden) layer
573 Output layer

The invention claimed is:

1. A model generation apparatus comprising:
a data acquisition unit configured to acquire a plurality of learning datasets each constituted by a first sample of a first time of predetermined data obtained in time series and feature information included in a second sample of the predetermined data of a future second time relative to the first time, with a rarity degree indicating a degree of rarity of the learning dataset being set for each of the learning dataset;
a learning processing unit configured to build, by machine learning, a prediction model trained to predict, from the first sample of the first time, the corresponding feature information of the second time, for each of the learning datasets, wherein learning datasets having a higher rarity degree are trained on more preponderantly in the machine learning; and
a rarity degree setting unit configured to set the rarity degree of each of the learning datasets, wherein
the rarity degree setting unit includes a discordance predictor configured to predict a discordance of the prediction by the prediction model from the first sample of the first time, for each of the learning datasets,
the rarity degree setting unit sets the rarity degree of each of the learning datasets, according to a result of predicting the discordance of the prediction by the prediction model with the discordance predictor,
the model generation apparatus further comprising:
a discordance data acquisition unit configured to acquire a plurality of discordance learning datasets each constituted by a combination of the first sample of the corresponding learning dataset and the discordance of the prediction by the prediction model; and
a discordance learning processing unit configured to build, by machine learning, the discordance predictor trained to predict, from the first sample of the first time, the corresponding discordance of the prediction by the prediction model, for each discordance learning dataset,
training of the prediction model by the learning processing unit and training of the discordance predictor by the discordance learning processing unit are executed alternately, the rarity degree setting unit sets the rarity degree of each of the learning datasets to a higher value as the discordance of the prediction by the prediction model, predicted by the discordance predictor for each of the learning datasets, increase, and training more preponderantly comprises using the learning datasets in the machine learning such that learning datasets having a higher rarity degree affect a predictive capability that the prediction model is provided with to a greater extent than learning datasets having a lower rarity degree.

2. The model generation apparatus according to claim 1, wherein the learning processing unit trains more preponderantly on the learning datasets having a higher rarity degree, by increasing a sampling frequency, in the machine learning, of the learning datasets having a higher rarity degree.

3. The model generation apparatus according to claim 1, wherein the learning processing unit trains more preponderantly on learning datasets having a higher rarity degree, by increasing weighting, in the machine learning, of the learning datasets having a higher rarity degree.

4. The model generation apparatus according to claim 1, wherein the rarity degree of each of the learning datasets is set according to an extent of irregularity with which the feature information appears in the predetermined data.

5. The model generation apparatus according to claim 1, wherein, in the machine learning of the discordance predictor, the discordance learning processing unit trains uniformly on each discordance learning dataset regardless of the rarity degree.

6. The model generation apparatus according to claim 1, wherein the feature information includes a feature amount of the second sample.

7. The model generation apparatus according to claim 6, wherein the model generation apparatus holds an estimator provided with an encoder configured to convert a third sample of the predetermined data into a feature amount and a decoder configured to restore the third sample from the feature amount and to estimate a feature included in the third sample, and the feature amount of the feature information is provided by converting the second sample with the encoder of the estimator.

8. The model generation apparatus according to claim 1, wherein the predetermined data is image data obtained by a camera disposed to monitor a situation outside a vehicle, and the feature information relates to an attribute of an object that appears in the image data.

9. The model generation apparatus according to claim 1, wherein the predetermined data is sensing data obtained by a sensor that monitors a state of a machine constituting a production line, and the feature information relates to the state of the machine.

10. The model generation apparatus according to claim 1, wherein the predetermined data is at least one of vital sign data of a subject and image data in which the subject appears, and the feature information relates to a state of the subject.

11. The model generation apparatus according to claim 1, wherein the predetermined data is people flow data related to a flow of people, and the feature information relates to an amount of the flow of people.

12. A prediction apparatus comprising:

a target data acquisition unit configured to acquire a target sample of the predetermined data;

a prediction unit configured to predict, from the acquired target sample, a feature that will appear in the predetermined data at a future time relative to a time at which the target sample is acquired, using the prediction model built by the model generation apparatus according to claim 1; and an output unit configured to output information relating to a result of predicting the feature.

13. A model generation method in which a computer is configured to perform operations comprising:

acquiring a plurality of learning datasets each constituted by a first sample of a first time of predetermined data obtained in time series and feature information included in a second sample of the predetermined data of a future second time relative to the first time, with a rarity degree indicating a degree of rarity of the learning dataset being set for each of the learning dataset;

building, by machine learning, a prediction model trained to predict, from the first sample of the first time, the corresponding feature information of the second time, for each learning dataset, with learning datasets having a higher rarity degree being trained on more preponderantly in the machine learning; and setting the rarity degree of each of the learning datasets, wherein setting the rarity degree of each of the learning datasets sets the rarity degree of each of the learning datasets, according to a result of predicting a discordance of the prediction by the prediction model with a discordance predictor, the discordance predictor is configured to predict the discordance of the prediction by the prediction model from the first sample of the first time, for each of the learning datasets, in the model generation method, the computer is further configured to perform operations further comprising:

acquiring a plurality of discordance learning datasets each constituted by a combination of the first sample of the corresponding learning dataset and the discordance of the prediction by the prediction model; and building, by machine learning, the discordance predictor trained to predict, from the first sample of the first time, the corresponding discordance of the prediction by the prediction model, for each discordance learning dataset, wherein training of the prediction model in building the prediction model and training of the discordance predictor building the discordance predictor are executed alternately, setting the rarity degree of each of the learning datasets sets the rarity degree of each of the learning datasets to a higher value as the discordance of the prediction by the prediction model, predicted by the discordance predictor for each of the learning datasets, increase, and training more preponderantly comprises using the learning datasets in the machine learning such that learning datasets having a higher rarity degree affect a predictive capability that the prediction model is provided with to a greater extent than learning datasets having a lower rarity degree.

14. A non-transitory computer readable medium storing a model generation program, the model generation program configured to cause a computer to perform operations comprising:
acquiring a plurality of learning datasets each constituted by a first sample of a first time of predetermined data obtained in time series and feature information included in a second sample of the predetermined data of a future second time relative to the first time, with a rarity degree indicating a degree of rarity of the learning dataset being set for each of the learning dataset;
building, by machine learning, a prediction model trained to predict, from the first sample of the first time, the corresponding feature information of the second time, for each learning dataset, with learning datasets having a higher rarity degree being trained on more preponderantly in the machine learning; and
setting the rarity degree of each of the learning datasets, wherein
setting the rarity degree of each of the learning datasets sets the rarity degree of each of the learning datasets, according to a result of predicting a discordance of the prediction by the prediction model with a discordance predictor,
the discordance predictor is configured to predict the discordance of the prediction by the prediction model from the first sample of the first time, for each of the learning datasets,
the model generation program is further configured to cause the computer to execute:
acquiring a plurality of discordance learning datasets each constituted by a combination of the first sample of the corresponding learning dataset and the discordance of the prediction by the prediction model; and
building, by machine learning, the discordance predictor trained to predict, from the first sample of the first time, the corresponding discordance of the prediction by the prediction model, for each discordance learning dataset,
training of the prediction model in building the prediction model and training of the discordance predictor in building the discordance predictor are executed alternately,
setting the rarity degree of each of the learning datasets sets the rarity degree of each of the learning datasets to a higher value as the discordance of the prediction by the prediction model, predicted by the discordance predictor for each of the learning datasets, increase, and
training more preponderantly comprises using the learning datasets in the machine learning such that learning datasets having a higher rarity degree affect a predictive capability that the prediction model is provided with to a greater extent than learning datasets having a lower rarity degree.

* * * * *